(12) United States Patent
Tagomori et al.

(10) Patent No.: US 6,529,247 B2
(45) Date of Patent: Mar. 4, 2003

(54) AUTOMATIC WHITE BALANCE ADJUSTING CIRCUIT IN COLOR IMAGE DISPLAY

(75) Inventors: Reiji Tagomori, Fujisawa (JP); Kenji Hara, Yokohama (JP); Hajime Sumiyoshi, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/160,088

(22) Filed: Jun. 4, 2002

(65) Prior Publication Data

US 2002/0149701 A1 Oct. 17, 2002

Related U.S. Application Data

(62) Division of application No. 09/442,092, filed on Nov. 17, 1999, now Pat. No. 6,437,833.

(30) Foreign Application Priority Data

Nov. 18, 1998 (JP) ............................................. 10-328064
Feb. 24, 1999 (JP) ............................................. 11-046384

(51) Int. Cl.[7] ................................................. H04N 9/73
(52) U.S. Cl. ....................................... 348/657; 348/656
(58) Field of Search ................................. 348/655, 658, 348/223.1, 377, 380, 808, 813; H04N 9/73

(56) References Cited

U.S. PATENT DOCUMENTS

| | | | | |
|---|---|---|---|---|
| 4,679,065 A | * | 7/1987 | Umezawa | 348/657 |
| 4,723,158 A | * | 2/1988 | White | 348/657 |
| 4,748,497 A | * | 5/1988 | Sengoku | 348/657 |
| 5,036,387 A | * | 7/1991 | Umezawa | 348/657 |
| 5,258,828 A | | 11/1993 | Sano et al. | 348/658 |
| 5,504,538 A | | 4/1996 | Tsujihara et al. | 348/673 |
| 5,589,883 A | | 12/1996 | Ogino et al. | 348/379 |
| 5,808,699 A | | 9/1998 | Tsujihara et al. | 348/673 |
| 6,069,660 A | | 5/2000 | Sato | 348/379 |
| 6,097,445 A | | 8/2000 | Goto et al. | 348/655 |

FOREIGN PATENT DOCUMENTS

| | | | | |
|---|---|---|---|---|
| GB | 2219169 | * | 11/1989 | H04N/9/73 |
| JP | 62-72289 | | 4/1987 | |
| JP | 5-236502 | | 9/1993 | |
| JP | 7-4020 | | 1/1995 | |
| JP | 7-123436 | | 5/1995 | |

* cited by examiner

*Primary Examiner*—Victor R. Kostak
(74) *Attorney, Agent, or Firm*—Oblon, Spivak, McClelland, Maier & Neustadt, P.C.

(57) ABSTRACT

A detector circuit detects a voltage corresponding to the leakage current that flows through the cathode electrode of a color display during a vertical blanking period of a video signal. The voltage detected is held in a first sample-and-hold circuit. Meanwhile, a reference signal corresponding to the reference black level is input during a part of the vertical blanking period of the video signal. A voltage corresponding to the leakage current that flows through the cathode electrode of the color display during the part of the vertical blanking period is detected by the detector circuit and then held in a second sample-and-hold circuit. The voltage held in the first sample-and-hold is subtracted from the voltage held in the second sample-and-hold circuit. A comparator circuit compares the difference between these voltages with a reference voltage. The result of the comparison controls a cutoff adjustment circuit for adjusting a DC level of the video signal.

9 Claims, 35 Drawing Sheets

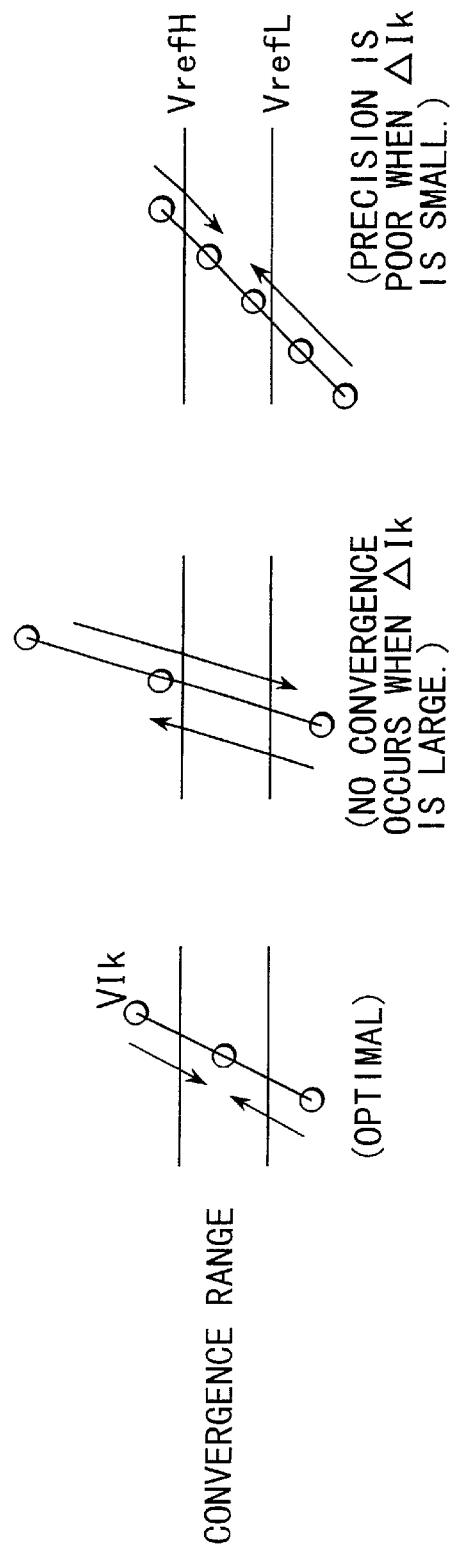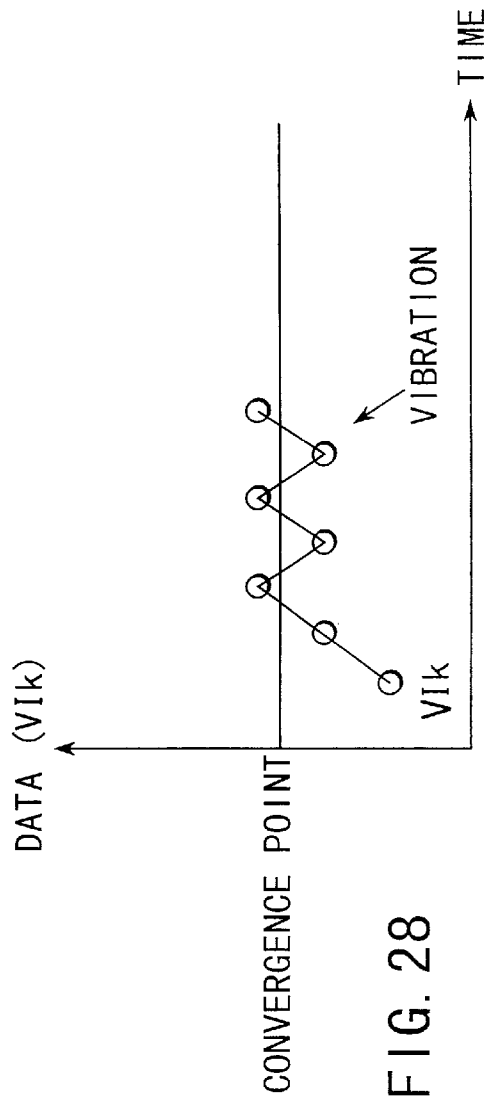

AUTOMATIC WHITE BALANCE ADJUSTING CIRCUIT IN COLOR IMAGE DISPLAY

CROSS-REFERENCE TO RELATED APPLICATIONS

This application is a divisional application of, and claims priority to, Ser. No. 09/442,092 now U.S. Pat. No. 6,437,833 filed Nov. 17, 1999 and claims priority to Japanese Patent No. 10-328064, filed Nov. 18, 1998, and Japanese Patent No. 11-046384, filed Feb. 24, 1999. The entire contents of the parent application and the Japanese application are incorporated herein by reference.

BACKGROUND OF THE INVENTION

The present invention relates to an automatic white balance adjusting circuit for automatically adjusting a white balance in a television receiver or a monitor apparatus.

In a television receiver or a monitor apparatus, when a white color reference signal is inputted, a predetermined color temperature must be reproduced at a cathode-ray tube (hereinafter, referred to as CRT). In general, the rate of each of output lights R (red), G (green), and B (blue) of the CRT is determined depending on the rate of each cathode current. However, characteristics of the cathode current to a cathode voltage differs with the CRT. Therefore, in order to reproduce a predetermined color temperature, it is required to adjust the rate of the cathode current among R, G, and B, by the CRT.

Conventionally, the CRT screen has been monitored on a television camera or the like to detect a white balance state, the detected value has been fed back to a computer system or service personnel for process adjustment to compare it with a predetermined reference value, and the DC voltage level and gain of each of the outputs R, G, and B has been adjusted according to the comparison results. In addition, during this adjustment, variable resistors provided at a DC voltage level adjusting circuit and a gain adjusting circuit has been manually adjusted or adjustment data stored in a storage circuit has been rewritten through a data bus.

However, in the above mentioned conventional method, an industrial television camera, a computer system for process adjustment, or service personnel is required at an adjustment site. Therefore, there is a problem that the white balance characteristics cannot be self-adjusted following an change of CRT with an elapse of time after shipment of the television receiver or monitor apparatus.

In recent years, an Automatic Kine Bias (AKB) circuit for automatically perform such adjustment is available in use. In this circuit, a reference signal is inputted during a vertical blanking period of a video signal, a cathode current of the CRT at this time is detected, and a white balance is automatically adjusted using the detected value.

FIG. 1 shows an example of a conventional circuit of such AKB circuit. A while balance is adjusted by setting a drive gain (AC amplitude) and a cutoff level (DC voltage level) on each of the R, G, and B axes. Specifically, during a certain period, the cutoff level is adjusted using a reference signal 1 (black level) substituted for a video signal, and similarly, during a period free of being superimposed on the reference signal 1, the drive gain is adjusted using a reference signal 2 (white level) substituted for the video signal. These two black and white levels are adjusted, thereby equally setting a ratio of the respective input signal and cathode current of each of the R, G, and B axes.

Now, the AKB circuit of FIG. 1 will be specifically described.

Switch circuits 1, 2, 3 each select and output respective one among R, G, and B signals and the reference signal 1 (black level) and the reference signal 2 (white level). A period for selecting the reference signals 1 and 2 is a period that is a vertical blanking period, but is not a vertical feedback period, i.e., a part of a period that is generally over-scanned and not visualized by a user. The level of the reference signal 1 corresponding to a reference black level is about 3 to 5 IRE, for example (a peak of the white signal is 100IRE), and the level of the reference signal 2 corresponding to a reference white level is about 30 to 50 IRE, for example.

In addition, the above R, G, and B signals are primary color signals of each of the R, G, and B axes in a three-primary color drive, and the brightness, tint or the like of these primary signals are controlled in advance.

Drive gain adjusting circuits 4, 5, and 6 respectively consisting of gain control amplifiers perform adjustment of drive gain to signals outputted respectively from switch circuits 1, 2, and 3, i.e., adjustment of an AC amplitude. In addition, cutoff adjusting circuits 7, 8, 9 respectively consisting of clamp circuits, for example, performs adjustment (for example, clamping) of the DC level of signals output respectively from the drive gain adjusting circuits 4, 5, and 6. Outputs of the cutoff adjusting circuits 7, 8, and 9 are supplied to bases of output transistors (PNP transistors) 13, 14, and 15 each via respective one of drive circuits 10, 11, and 12. Emitters of these transistors 13, 14, and 15 are connected respectively to the cathode electrodes of the R, G, and B axes of the CRT 16. These transistors 13, 14, and 15 are driven by outputs from the drive circuits 10, 11, and 12, whereby a current flow the cathode electrode of each of the R, G, and B axes of CRT 16, and CRT 16 are driven to be displayed.

To collectors of the above transistors 13, 14, and 15 each, resistors 17, 18, and 19 for converting the current flowing through each cathode electrode into a voltage are connected. Drop voltages in these resistors 17, 18, and 19 are sampled respectively at a sample hold circuit (S/H) 20, 21 and 22. These sample hold circuits 20, 21, and 22 samples voltages proportional to a cathode current during a certain period, for example 1H (1 horizontal period). The sampled voltages are held by capacitors 23, 24, and 25 for holding a black level respectively and by capacitors 26, 27, and 28 for holding a white level.

The voltages held by the above capacitors 23, 24, and 25 are compared respectively with a reference voltage corresponding to the reference black level in comparator circuits 29, 30, and 31. The reference voltage is outputted from a reference voltage source 32. The comparison results of these comparator circuits 29, 30, and 31 are supplied respectively to the cutoff adjusting circuits 7, 8, and 9, and the DC level is adjusted by each of the R, G, and B axes.

The voltages held by the above capacitors 26, 27, and 28 are compared respectively with a reference voltage corresponding to the reference white level in the comparator circuits 33, 34 and 35. The reference voltage is outputted from a reference voltage source 36. The comparison results of these comparator circuits 33, 34, and 35 are supplied respectively to drive gain adjusting circuits 4, 5, and 6, and the AC amplitude is adjusted by each of the R, G, and B axes.

In the AKB circuit shown in FIG. 1, by each of the R, G, and B axes, adjusting operation of an AC amplitude and an adjusting operation of a DC level are controlled respectively by each negative feedback loop consisting of drive gain adjusting circuits 4, 5 and 6; cutoff adjusting circuits 7, 8 and 9; drive circuits 10, 11, and 12; transistors 13, 14, and 15; sample hold circuits 20, 21, and 22; and comparator circuits 29 to 35. At a time when voltages of both input terminals of each of comparator circuits 29 to 31 and 33 to 35 are equal to each other, the above operation of each negative feedback loop becomes stable. At a time when operation of each feedback loop becomes stable, a rate of the cathode current among each of the R, G, and B axes to a reference signal is set to be equal.

In the meantime, in the conventional AKB circuit shown in FIG. 1, in order to hold a voltage obtained by converting a cathode current during a keyline period, sample hold circuits 20 to 22 require capacitors 23 to 28. Since this keyline period is b 1V (1 vertical period, about 17 mS), these capacitors require a relatively large capacitance, and use about several μF to 10 μF.

As a result, an integrated AKB circuit can not incorporate these capacitors in an integrated circuit, and is required to be provided outside of the integrated circuit. In addition, the integrated circuit is required to provide a dedicated external terminal for providing these capacitors outside the circuit, and large sizing of the integrated circuit is unavoidable.

In the meantime, in the CRT, even if a cathode voltage is not supplied, and the display screen is placed in a completely black state, a leak current may flow a cathode electrode. Therefore, at this time, a voltage to be obtained by converting the cathode current is not 0V, and the voltage with this leak current is added to hold voltages of capacitors 23 to 28 of the sample hold circuits 20 to 22.

FIG. 2 is an extracted circuit diagram showing a resistor 17 for detecting a cathode current in R axis and converting the detected current into a voltage and a comparator circuit 29 for comparing the converted voltage by the resistor 17 with a reference voltage corresponding to a reference black level.

During reference signal input, a leak current I leak flows a cathode electrode in addition to a cathode current Ik corresponding to this reference signal. Therefore, a drop voltage of, VIk=R×(Ik+I leak) (R is a resistance value of resistor 17) is generated at a resistor 17 for current detection.

That is, a drop voltage with a leak current is generated at the resistor 17, and thus, an optimal cutoff or drive gain cannot be sometimes obtained.

In addition, if a value of a leak current differs among three axes, R, G, and B, there occurs a problem that a correct white balance cannot be obtained.

As a measure for solving such problem that a white balance is displaced due to a leak current, a circuit as shown in FIG. 3 is designed conventionally. For this circuit, a clamp circuit 41 for clamping a cathode current Ik during a vertical blanking period is added to the circuit shown in FIG. 2.

This clamp circuit 41 is composed of a clamping capacitor 42, a clamping voltage source 43, and a switch circuit (SW) 44.

In this circuit, where a leak current exists in a cathode electrode, a drop voltage corresponding to this current is generated between both ends of the resistor 17 during vertical blanking period. In addition, the switch circuit 44 is turned. ON during a period of a vertical blanking period, and a voltage of connection node N1 between the comparator circuit 29 and the capacitor 42 is set to be substantially equal to that of the clamping voltage source 43.

On the other hand, another period of the vertical blanking period, the drop voltage corresponding to a current in addition between a current corresponding to the reference signal and the leak current is generated between both ends of the resistor 17. At this time, the switch circuit 44 is turned OFF, and a drop voltage due to a current corresponding to only the reference signal is generated at connection node N1 between the comparator circuit 29 and a capacitor 42. That is, a voltage due to a leak current component is offset. Then, this voltage of node N1 is compared with a reference voltage of the reference voltage source 32 by means of the comparator circuit 29.

However, in the circuit of FIG. 3, a clamping capacitor 42 is further required.

In this manner, in the conventional AKB circuit, there is a need for providing a number of capacitor having its large capacitance. As a result, a number of parts are required to be externally provided, and thus, there is a disadvantage that manufacturing cost during integrated circuiting becomes high.

In addition, in the conventional AKB circuit, there is a disadvantage that an optimal cutoff or drive gain cannot be obtained by the influence of a leak current flowing through a cathode electrode. Further, there occurs a problem that many more capacitors are required to eliminate the influence of this leak current.

BRIEF SUMMARY OF THE INVENTION

It is a first object of the present invention to provide an automatic white balance adjusting circuit capable of eliminating the influence of a leak current of a cathode using a smaller number of capacitors and optimally adjusting cutoff or drive gain.

It is a second object of the present invention to provide an automatic white balance adjusting circuit capable of being inexpensively manufactured without requiring an external capacitor during integration.

It is a third object of the present invention to provide an automatic white balance adjusting circuit capable of, even if a DC level of a video signal has changed rapidly by variation of a high voltage supplied to a cathode-ray tube, returning variation of this DC level to an original value rapidly, and then, maintaining it to a certain value.

It is a fourth object of the present invention to provide an automatic white balance adjusting circuit capable of, even if discrete data is employed when a DC level of a video signal is adjusted using data, converging the DC level at one point.

According to the present invention, there is provided an automatic white balance adjusting circuit for automatically adjusting a white balance of a color image display tube having at least one cathode electrode comprises: a selector circuit for receiving a color video signal having a vertical blanking period and at least one reference signal, selecting the color video signal, and selecting and outputting the at least one reference signal during a partial period of the vertical blanking period; an adjusting circuit for receiving a signal outputted from the selector circuit, adjusting at least one of a DC level and an AC amplitude of the signal in accordance with a control signal, and outputting the signal thus adjusted; a drive circuit for receiving the output signal of the adjusting circuit and outputting a driving signal to be supplied to the at least one cathode electrode of the color image display tube according to the output signal; a detector circuit connected to the color image display tube and detecting a voltage according to a current flowing through the cathode electrode of the color image display tube; a first voltage hold circuit for receiving a voltage detected by the detector circuit and holding the voltage; an arithmetic circuit for receiving a voltage detected by the detector circuit during a period in which the reference signal is selected by the selector circuit and a voltage held by the first voltage hold circuit during a period in which neither of the color video signal and reference signal are selected, and obtaining a voltage in difference between these voltages; and a comparator circuit for, receiving a voltage in difference obtained by the arithmetic circuit, comparing the voltage in difference with a reference voltage, and generating the control signal to control an operation of the adjusting circuit according to the comparison result.

According to the present invention, there is provided an automatic white balance adjusting circuit for automatically adjusting a white balance of a color image display tube having at least one cathode electrode, comprises: a selector circuit for receiving a color video signal having a vertical blanking period and at least one reference signal, selecting the color video signal, and selecting and outputting the at least one reference signal during a partial period of the vertical blanking period; an adjusting circuit for receiving a signal outputted from the selector circuit, adjusting at least one of a DC level and an AC amplitude of the signal in accordance with a control signal, and outputting the signal thus adjusted; a drive circuit for receiving the output signal of the adjusting circuit, and outputting a driving signal to be supplied to the at least one cathode electrode of the color image display tube according to the output signal; a detector circuit connected to the color image display tube and detecting a voltage according to a current flowing through the at least one cathode electrode of the color image display tube; a voltage hold circuit for receiving a voltage detected by the detector circuit during a period in which neither of the color video signal and the at least one reference signal are selected, and holding the voltage; a comparator circuit having a pair of input nodes, the voltage detected by the detector circuit being supplied to one input node during a period in which the at least one reference signal is selected by the selector circuit, a reference voltage being supplied to the other input node, the comparator circuit comparing these two voltages supplied to the pair of input nodes, and generating the control signal for controlling an operation of the adjusting circuit according to the comparison result; and a reference voltage generator circuit for generating the reference voltage, receiving a voltage held by the voltage hold circuit, and changing a value of the reference voltage according to the voltage.

According to the present invention, there is provided an automatic white balance adjusting circuit for automatically adjusting a white balance of a color image display tube having at least one cathode electrode, comprises: a selector circuit for receiving a color video signal having a vertical blanking period and at least one reference signal, selecting the color video signal, and selecting and outputting the at least one reference signal during a partial period of the vertical blanking period; an adjusting circuit for receiving a signal outputted from the selector circuit, adjusting at least one of a DC level and an AC amplitude of the signal in accordance with a control signal, and outputting the signal thus adjusted; a drive circuit for receiving the output signal of the adjusting circuit and outputting a driving signal to be supplied to the at least one cathode electrode of the color image display tube according to the output signal; a first detector circuit connected to the color image display tube and detecting a voltage according to a current flowing through the cathode electrode of the color image display tube; a first comparator circuit for receiving a voltage detected by the first detector circuit during a period in which the at least one reference signal is selected by the selector circuit, and comparing the voltage with a first reference voltage; a memory circuit for storing data for controlling an operation of the adjusting circuit; an update circuit for receiving the comparison result of the first comparator circuit and data stored in the memory circuit, updating the data based on the comparison result of the first comparator circuit, and supplying the updated data to the memory circuit, the updated data being stored again in the memory circuit; and a D/A converter for receiving data stored in the memory circuit, converting the data into an analog signal, and output the converted signal to the adjusting circuit as the control signal.

According to the present invention, there is provided an image display apparatus comprises: an adjusting circuit for adjusting a DC level and an AC amplitude of a color image signal and outputting the color image signal thus adjusted, the color image signal representing even-numbered field and odd-numbered field alternately repeated, each field having a vertical blanking period; a color image display tube to be applied with a high voltage, having at least one cathode electrode; a drive circuit for receiving an output signal of the adjusting circuit and outputting a drive signal to the cathode electrode of the color image display tube in accordance with the output signal; a high-voltage fluctuation detecting circuit for detecting fluctuation of the high voltage applied to the color image display tube; and a control circuit for controlling the adjusting circuit, causing the adjusting circuit to adjust the DC level preferentially when the fluctuation of the high voltage is detected by the high-voltage fluctuation detecting circuit and causing the adjusting circuit to adjust the DC level and the AC amplitude alternately for any adjacent two fields which are an even-numbered one and odd-numbered one when the fluctuation of the high voltage is not detected by the high-voltage fluctuation detecting circuit.

According to the present invention, there is provided an image display apparatus comprises: a control voltage generator circuit for generating a control voltage such that a predetermined cathode current flows through a cathode electrode of an image display tube during an adjustment period of at least one of a DC level and an AC amplitude of a video signal; a data change circuit for receiving the control voltage, and changing data in a direction in which a value of an analog voltage obtained by analog-converting the data is close to the control voltage; and a detector circuit for receiving the control voltage and analog voltage, and detecting data in which an absolute value indicative of a difference between the analog voltage obtained by analog-converting data before and after the,change and the control voltage is smaller, wherein the at least one of a DC level and an AC amplitude of the video signal is adjusted by using an analog voltage obtained by analog-converting the detected data as data whose absolute value indicative of a difference between the analog data and the control voltage is smaller in the detector circuit.

According to the present invention, there is provided an image display apparatus comprises: a first detector circuit for updating data during an adjustment period of at least one of a DC level and an AC amplitude of a video signal, and detecting cathode currents flowing through a cathode electrode of an image display tube before and after the update, respectively; and a second detector circuit for receiving the detected result of the first detector circuit, and detecting data in which an absolute value indicative of a difference between a value of the cathode current detected and a predetermined reference value is smaller, wherein the at least one of a DC level and an AC amplitude of a video signal is adjusted by using an analog voltage obtained by analog-converting the detected data in the second detector circuit.

According to the present invention, there is provided an image display apparatus comprises: a detector circuit for changing data during an adjustment period of at least one of a DC level and an AC amplitude of a video signal, and detecting cathode currents flowing through a cathode electrode of an image display tube before and after the change; a judging circuit for receiving the detected result of the detector circuit, and when values of the detected cathode currents change across a predetermined convergence value, judging that the data has converged; and a data fixing circuit for receiving the judgment result of the judging circuit, and when convergence of the data is judged, fixing to data corresponding to any of a time when a value of the cathode current changes across the convergence value or a time before a value of the cathode current changes across the convergence value, wherein the at least one of a DC level and an AC amplitude of a video signal is adjusted by using the fixed data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 27A, 27B and 27C are views showing various convergence states of detected currents in a current detector circuit associated with the embodied circuit of FIG. 26;

FIG. 28 is a view showing a state in which memory data vibrates without convergence;

DETAILED DESCRIPTION OF THE INVENTION

Hereinafter, the present invention will be described by way of showing embodiments with reference to the accompanying drawings.

Figure 1:
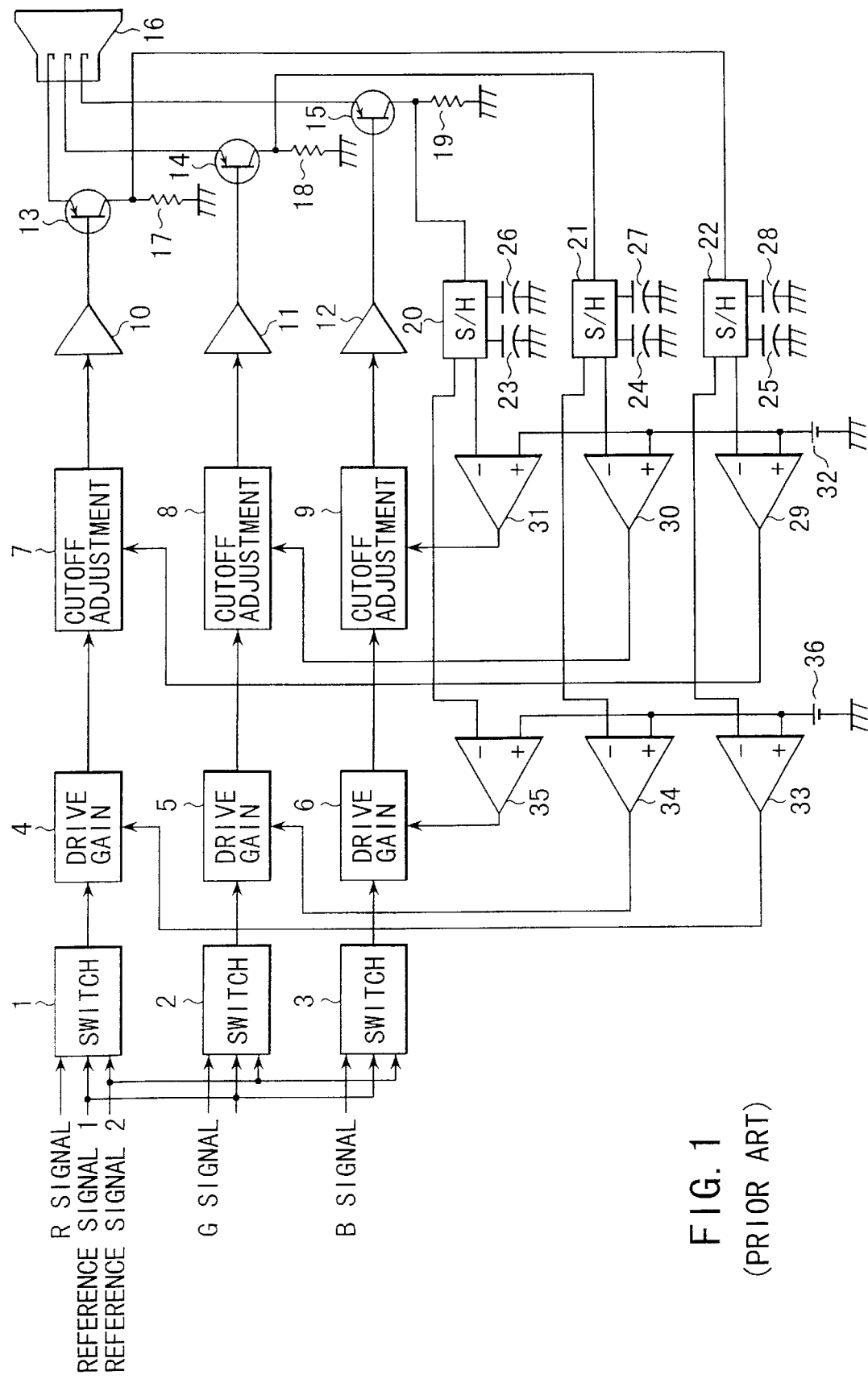
FIG. 1 is a block diagram showing an example of a conventional AKB circuit.
Figure 2:
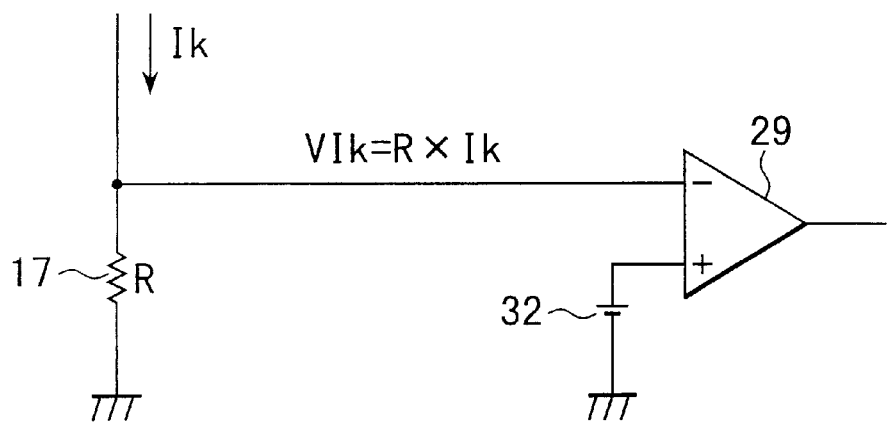
FIG. 2 is an extracted circuit diagram showing a circuit associated with comparison between a detected cathode current and a reference voltage in the conventional AKB circuit shown in FIG. 1.
Figure 3:
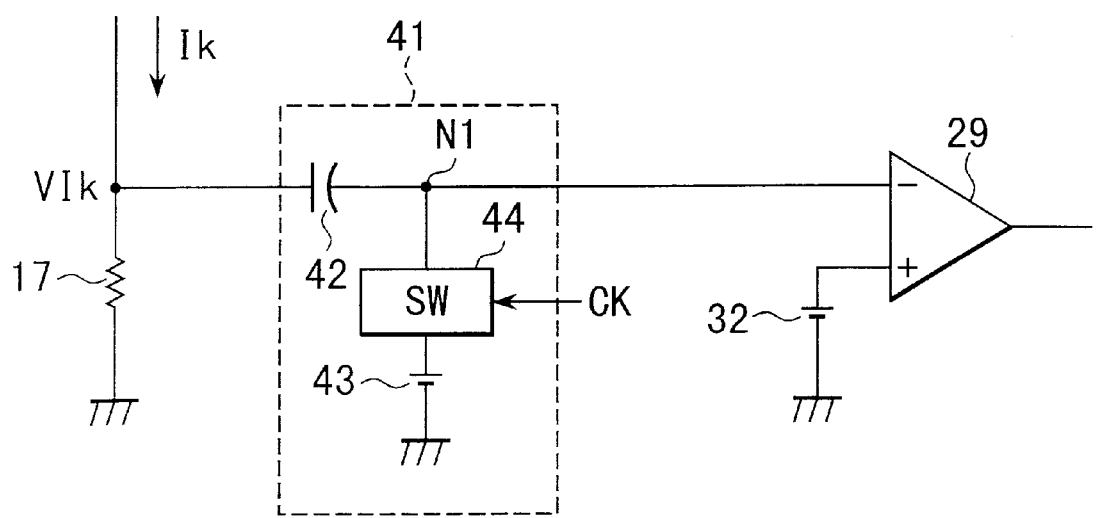
FIG. 3 is an extracted circuit diagram showing a circuit associated with comparison between a detected cathode current and a reference voltage in a conventional AKB circuit different from that shown in FIG. 1.
Figure 4:
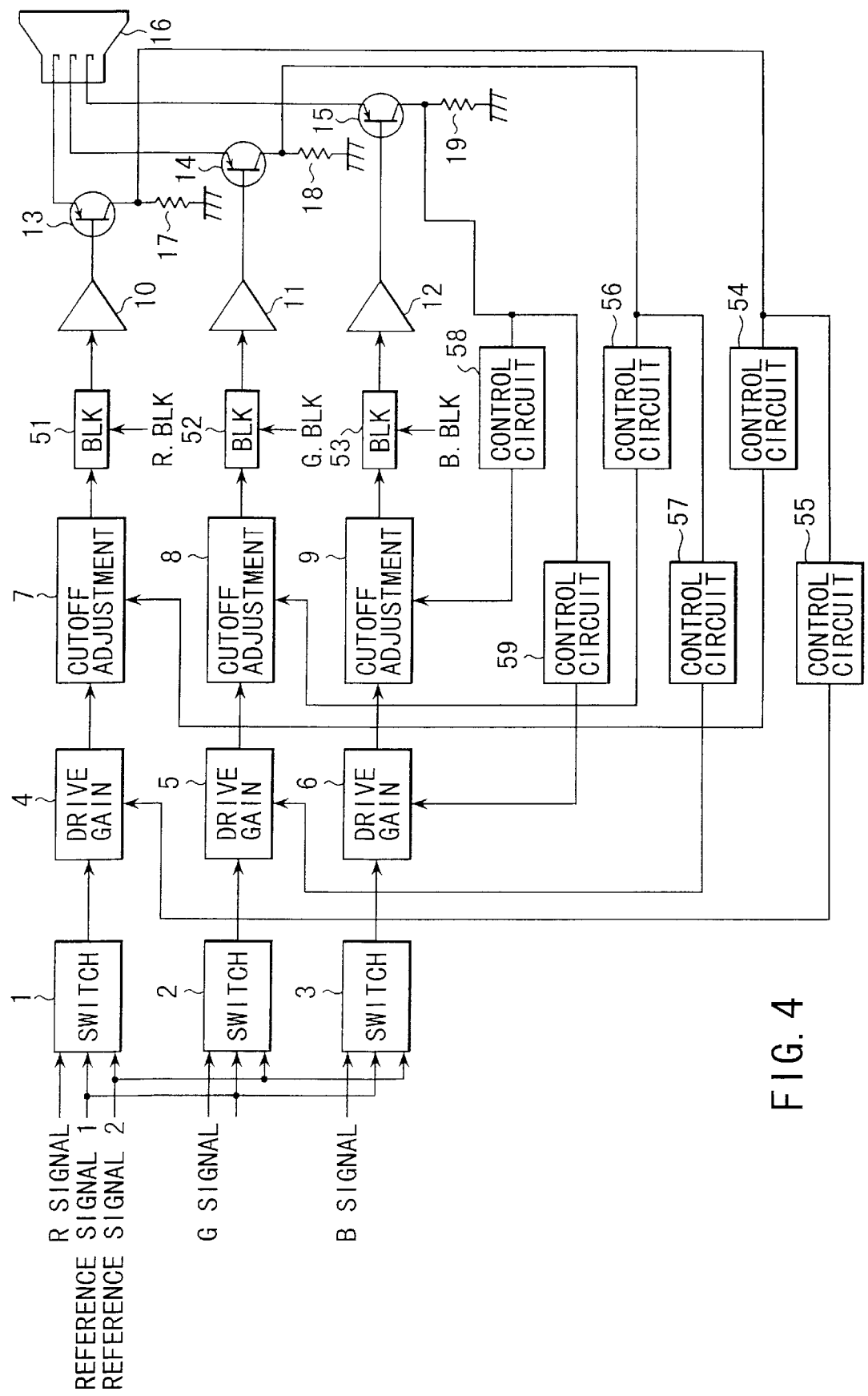
FIG. 4 is a block diagram showing an entire structure of an AKB circuit according to a first embodiment of the present invention.

FIG. 4 is a block diagram showing an entire structure of an AKB circuit according to a first embodiment of the present invention. Like elements corresponding to those of the conventional circuit of FIG. 1 is designated by like reference numerals, and will be described.

Respective one of R, G, and R signals, a reference signal 1 (black level) and a reference signal 2 (white level) are inputted to switch circuits 1, 2, and 3. In these switch circuits 1, 2, and 3, one signal of the respective R, G, and B signals, and one of the respective reference signal 1 and reference signal 2 are selected and outputted based on a control signal (not shown). A period when the reference signals 1 and 2 are outputted is a vertical blanking period, but is not a vertical feedback period, i.e., part of a period that is generally over-scanned, and that is not viewed by a user. A level of the reference signal 1 corresponding to a reference black level is about 3 to 5 IRE, for example, and a level of the reference signal 2 corresponding to a reference white level is about 30 to 50 IRE, for example.

The above R, G, and B signals are primary color signals of respective R, G, and B axes in a three-primary color drive, and the brightness, tint or the like of these primary color signals are controlled.

In drive gain adjusting circuits 4, 5, and 6 each consisting of gain control amplifiers, drive gain, i.e., adjustment of an AC amplitude is performed on signals respectively outputted the switch circuits 1, 2 and 3. In addition, for example, in cutoff adjusting circuits 7, 8, and 9 consisting of clamp circuits, respectively, adjustment (clamping) of DC levels of signals respectively outputted, from the drive gain adjusting circuits 4, 5 and 6 are performed. Outputs from the cutoff adjusting circuits 7, 8, and 9 are supplied to bases of output transistors (PNP transistors) 13, 14, and 15 via blanking circuits 51, 52, and 53, respectively, and drive circuits 10, 11, and 12, respectively. Emitters of these transistors 13, 14, and 15 are connected to cathode electrodes of the R, G, and B axes of CRT 16, these transistors 13, 14, and 15 are driven by outputs from the drive circuits 10, 11, and 12, whereby currents flow the cathode electrodes of the R, G, and B axes of CRT 16, and the CRT 16 is driven to be displayed.

The above blanking circuits 51, 52, and 53 each set a no-signal state to the corresponding cathode electrode of CRT 16 based on blanking signals, R. BLK. G. BLK. B. BLK. respectively.

Current detection resistors 17, 18, and 19 for converting the current flowing through each cathode electrode are respectively connected to collectors of the transistors 13, 14, and 15 each. The converted voltage by the resistor 17 is supplied to two control circuits 54 and 55 in parallel. The control circuit 54 controls cutoff adjusting operation in the cutoff adjusting circuit 7 of the R axis based on the converted voltage by the resistor 17. The control circuit 55 controls drive gain adjusting operation in the drive gain adjusting circuit 4 of the R axis based on the converted voltage by the resistor 17. Similarly, the converted voltage by the resistor 18 is supplied to two control circuits 56 and 57 in parallel. The control circuit 56 controls cutoff adjusting operation in the cutoff adjusting circuit 8 of the G axis based on the converted voltage by the resistor 18. The control circuit 57 controls drive gain adjusting operation in the drive gain adjusting circuit 5 of the G axis based on the converted voltage by the resistor 18. Similarly, the converted voltage by the resistor 19 is supplied to control circuits 58 and 59 in parallel. The control circuit 58 controls cutoff adjusting operation in the cutoff adjusting circuit 9 of the B axis based on the converted voltage by the resistor 19. The control circuit 59 controls drive gain adjusting operation in the drive gain adjusting circuit 6 of the B axis based on the converted voltage by the resistor 19.

Figure 5:
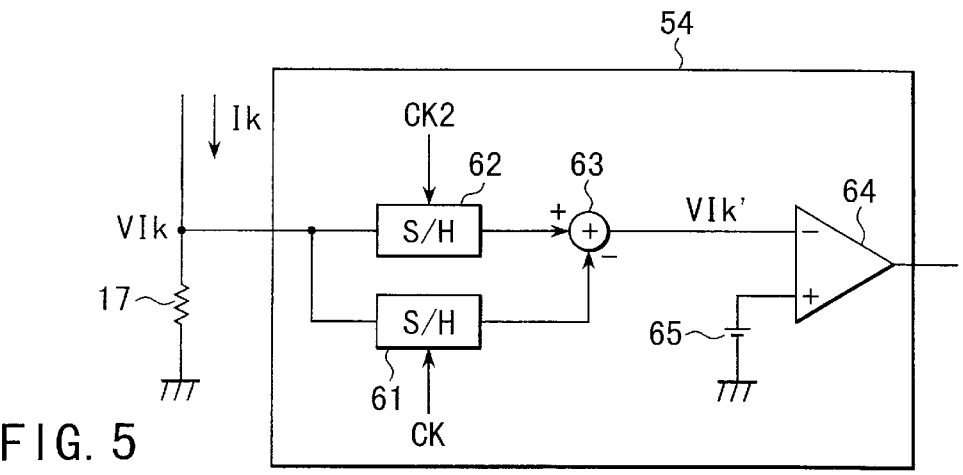
FIG. 5 is a circuit diagram showing an internal structure of one control circuit for controlling operation of a cutoff adjusting circuit of R axis of a plurality of control circuits, together with a resistor for current detection.

FIG. 5 shows an internal structure of the control circuit for controlling operation of the cutoff adjusting circuit 7 of the R axis of six control circuits 54 to 59 in FIG. 4. The internal structures of all the circuit circuits 54 to 59 are similar, and thus, the description will be given by way of showing an example of the control circuit 54.

In the control circuit 54, two sample hold circuits (S/H) 61 and 62 and a subtract circuit 63 are provided to cancel a voltage drop of the resistor 17 due to a leak current. That is, input terminals of these two sample hold circuits 61 and 62 are connected to one end of the resistor 17 in common.

The sample hold circuit 61 samples and holds a drop voltage generated at the resistor 17 when a clock signal CK inputted is active ("H" level). The sample hold circuit 62 samples and holds a drop voltage generated at the resistor 17 when a clock signal CK inputted is active ("H" level). A hold voltage of the sample hold circuit 61 is subtracted from a hold voltage of the sample hold circuit 62 by means of the subtract circuit 63, and a voltage Vlk' obtained as the subtraction results is supplied to one input terminal (−) of a comparator circuit 64. A reference voltage corresponding to a reference black level generated at a reference voltage source 65 is supplied to the other input terminal (+) of the comparator circuit 64. Comparison between an output voltage and a reference voltage from the subtract circuit 63 is performed by means of the comparator circuit 64, and the comparison results are supplied to the cutoff adjusting circuit 7.

A reference voltage corresponding to a reference black level is generated at the reference voltage source 65 in other control circuits 56 and 58 each in FIG. 4, and a reference voltage corresponding to a reference white level is generated at the reference voltage source 65 in the control circuits 55, 57, and 59 each.

Now, operation of the circuit structured above will be described with reference to a timing chart of FIG. 6.

First, the switch circuits 1, 2, and 3 are switched during a vertical blanking period, the reference signal 1 or the reference signal 2 is selected, respectively, instead of the R, G, and B signals, so that AKB operation using the reference signal 1 or the reference signal 2 is performed, but prior to such AKB operation, a blanking pulse is inputted to an AKB circuit.

This blanking pulse sets a no-signal state to the cathode electrode of CRT 16, and the blanking pulse is supplied to blanking circuits 51, 52, and 53. During an active period of this blanking pulse, a clock signal CK is made active. During this blanking period, in general, a cathode current does not flow, and thus, the drop voltage Vlk in the resistor 17 in FIG. 5, for example should be ideally 0V. However, when a leak current Ileak is generated, a voltage drop expressed by Vlk=R×Ileak is generated at the resistor 17, wherein, R designates a resistance value of the resistor 17. When the clock signal CK is active, this drop voltage is sampled and held by the sample hold circuit 61. Next, for example, the switch circuit 1 is switched, and a reference signal (reference signal 1 or reference signal 2) is selected. During this selection period, the clock signal CK2 is made active, and the drop voltage in the resistor 17 is sampled and held by the sample hold circuit 62. Thereafter, the held voltage by the sample hold circuit 61 is subtracted from the held voltage by the sample hold circuit 62 by means of the subtract circuit 63.

The voltage held by the sample hold circuit 62 is a voltage in which a current in addition between a current corresponding to a reference signal flowing through a cathode electrode and a leak current when the reference signal is inputted has been converted. Therefore, a converted voltage corresponding to a cathode current of only the reference signal, which does not include a converted voltage based on a leak current is outputted from the subtract circuit 63. A voltage outputted from the subtract circuit 63 is compared with a reference voltage by the comparator circuit 64. The comparison results at this time are inputted to the cutoff adjusting circuit 7, and a black level adjustment is performed by the cutoff adjusting circuit 7.

When the reference signal 1 is selected at the switch circuits 1, 2, and 3, a black level adjusting operation is controlled by the cutoff adjusting circuits 7, 8, and 9, respectively. When the reference signal 2 is selected at the switch circuits 1, 2, and 3, respectively, a white level adjusting operation is controlled by the drive gain adjusting circuits 4, 5, and 6, respectively.

In this manner, the AKB circuit according to the first embodiment can influence a leak current flowing through a cathode electrode, thereby making it possible to perform optimal cutoff adjustment and drive gain adjustment.

Figure 6:
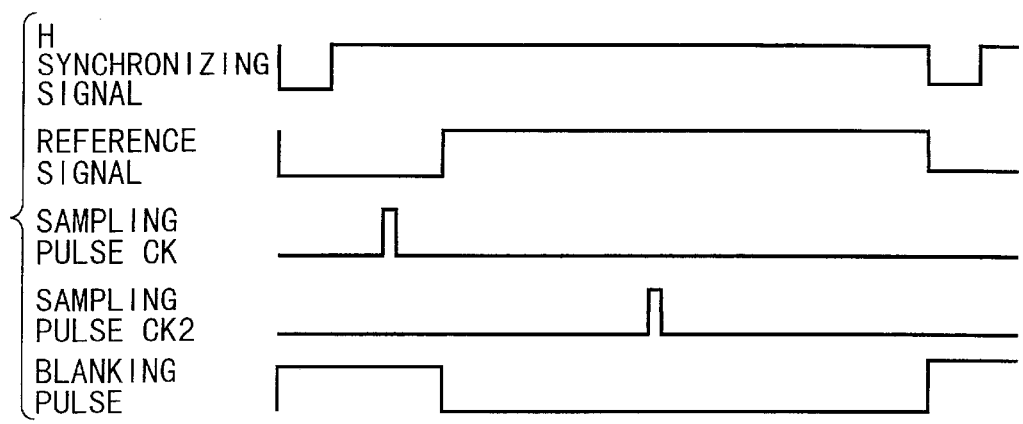
FIG. 6 is a timing chart showing operation of the embodied circuit of the embodiment of FIG. 4.

In addition, in the sample hold circuits 61 and 62, although sampling operation is controlled by sampling pulses CK and CK2, cycles of these sampling pulses CK and CK2 are single horizontal periods, respectively, as shown in FIG. 6. Since a typical frequency of a horizontal synchronizing signal is 15 KHz, one cycle is about 64 μs. In the sample hold circuits 61 and 62, a capacitance of a capacitor used for holding a sampled voltage may be about some tens of pF. Such capacitor having a capacitance value can be easily formed in an integrated circuit. Therefore, there is no need for providing a capacitor outside of the integrated circuit, the number of external terminals in the integrated circuit can be decreased, and the integrated circuit can be manufactured inexpensively.

Figure 7:
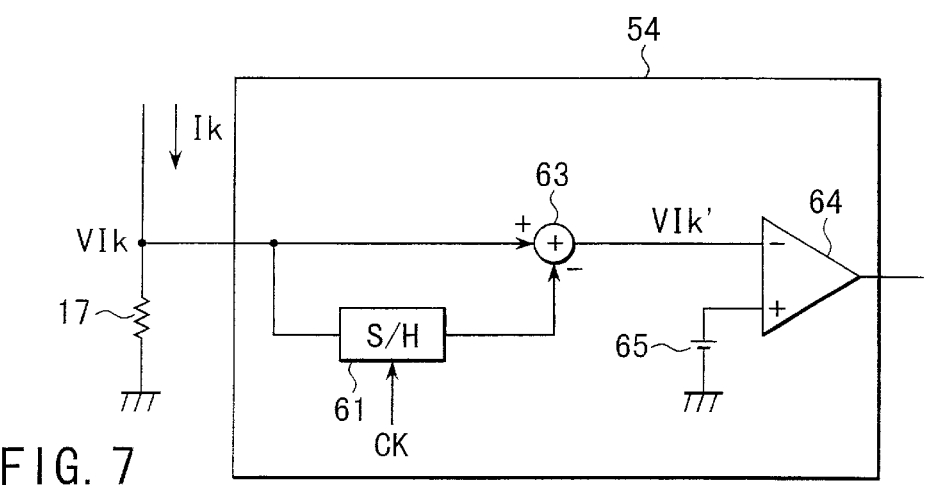
FIG. 7 is a circuit diagram showing a structure of a main portion of an AKB circuit according to a second embodiment of the present invention.

Now, a second embodiment of the present invention will be described. FIG. 7 shows an internal structure of a control circuit 54 for controlling operation, of the cutoff adjusting circuit 7 of the R axis of the control circuits 54 to 59 in FIG. 4, together with the current detection resistor 17. The internal structures of the control circuits 54 to 59 are similar, and thus, the description will be given by way of showing an example of the control circuit 54.

The control circuit of FIG. 7 is different from that of FIG. 5 in that the sample hold circuit 62 in FIG. 5 is removed, and the drop voltage in the resistor 17 is directly inputted to one input terminal (+) of the subtract circuit 63.

In this embodiment, a blanking pulse is inputted to a blanking circuit 51, and during this blanking period, a clock signal CK is made active. When a leak current Ileak is generated, the drop voltage expressed by Vlk=R×Ileak is generated at the resistor 17. When a clock signal CK is active, this drop voltage is sampled and held by the sample hold circuit 61.

Next, the switch circuit 1 is switched, and the reference signal (reference signal 1 or reference signal 2) is selected. During this selection period, the drop voltage in the resistor 17 is directed inputted to one input terminal (+) of the subtract circuit 63. The held voltage by the sample hold circuit 61 is subtracted from the detected voltage by the resistor 41 by the subtract circuit 63. As a result, like the first embodiment, a conversion voltage Vlk' corresponding to only a reference signal, which does not include a conversion voltage based on a leak current, is outputted from the subtract circuit 63.

In this case, only a conversion voltage is sampled by the sample hold circuit based on the leak current. That is, a conversion voltage in the resistor 17 is sampled when a reference signal is inputted, and is inputted to the subtract circuit 63.

Where a circuit at the next stage including the comparator circuit 64 is composed of an analog processor circuit, as shown in the embodiment of FIG. 5, if a conversion voltage in the resistor 17 is sampled when a reference signal is inputted, a control loop is interrupted during this sampling period. However, in this embodiment, such interruption does not occur.

Therefore, the control circuit in this embodiment is preferable where the circuit at the next stage including the comparator circuit 64 is composed of the analog processor circuit. In this case, the comparator circuit 64 is composed of an operational amplifier instead of a comparator.

Figure 8:
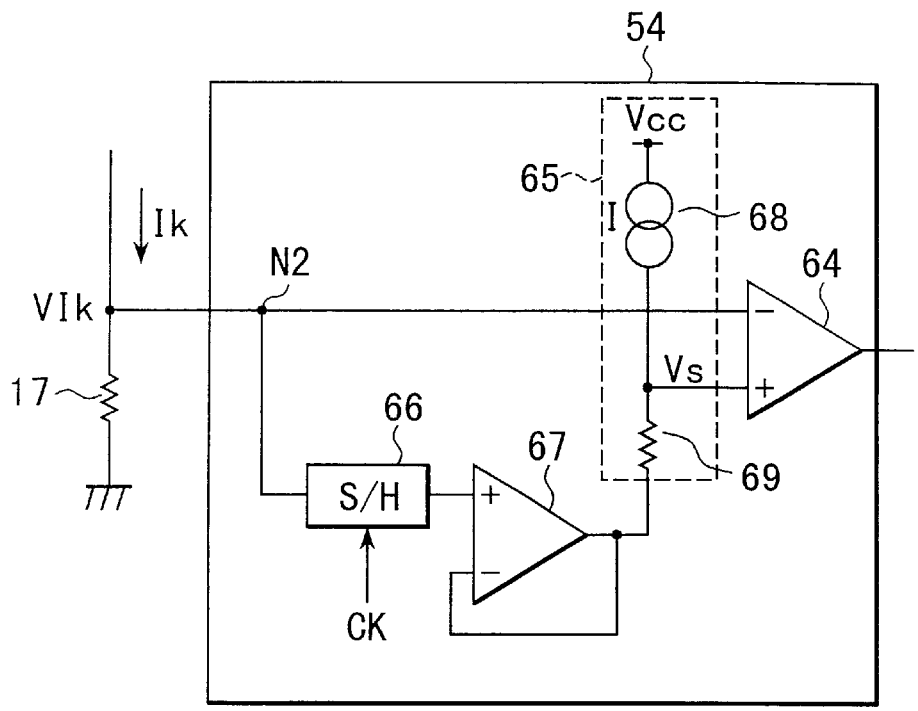
FIG. 8 is a circuit diagram showing a structure of a main portion of an AKB circuit according to a third embodiment of the present invention.

Now, a third embodiment of the present invention will be described. FIG. 8 shows an internal structure of the control circuit 54 for controlling operation of the cutoff adjusting circuit 7 of the R axis of the control circuits 54 to 59 in FIG. 4, together with the current detection resistor 17. The internal structures of the control circuits 54 to 59 are similar, and thus, the description will be given by way of showing an example of the control circuit 54.

In the control circuit of FIG. 8, a sample hold circuit (S/H) 66 and an operational amplifier circuit 67 are provided to cancel a drop voltage in the resistor 17 due to a leak current. That is, an input terminal of the above sample hold circuit 66 is connected to one end of the resistor 17. This sample hold circuit 66 samples and holds a drop voltage in the resistor 17 when the clock signal CK is active ("H" level).

In the above operational amplifier circuit 67, an inverting input terminal (−) is connected to an output terminal to configure a voltage follower circuit. An output of the above sample hold circuit 66 is inputted to a non-inverting input terminal (+) of the operational amplifier circuit 67. An output terminal of the operational amplifier circuit 67 is connected to the non-inverting input terminal (+) of the comparator circuit 64 by the constant voltage source 65.

In this case, the above constant voltage source 65 is composed of a constant current source 68 at one end connected to a supply node of a power voltage Vcc, and a resistor 69 connected between the other end of the constant current source 68 and the non-inverting input terminal (+) of the comparator circuit 64.

In addition, the inverting input terminal (−) of the comparator circuit 64 is connected to a connection node N2 between the resistor 17 and the sample hold circuit 66.

In this embodiment, a clock signal CK is made active during a blanking pulse input period. During this period, if a leak current Ileak is generated, a voltage drop expressed by VIk=R×Ileak is generated at the resistor 17. When the clock signal CK is active, this drop voltage is sampled and held by the sample hold circuit 66. The held voltage by the sample hold circuit 66 is applied to the other end of the resistor 69 in a constant voltage source 65 as a voltage Vleak via the operational amplifier circuit 67.

On the other hand, since a constant current I with a constant current source 68 flows a resistor 69, assuming that an output voltage Vleak of the operational amplifier circuit 67 is 0V, if a resistance value of the resistor 69 is 'r', a connection node between a constant current source 68 and the resistor 69, i.e., a voltage Vs in the non-inverting input terminal (+) of the comparator circuit 64 is expressed as Vs=r×I. This voltage Vs is a voltage corresponding to the foregoing reference voltage. Where the voltage Vleak is not 0V, the voltage Vs is expressed as Vleak+r×I.

Next, a reference signal (reference signal 1 or reference signal 2) is selected by the switch circuit 1. During a selection period of this reference signal, the drop voltage in the resistor 17 is inputted to the inverting input terminal (−) of the comparison circuit 64. At this time, the drop voltage in the resistor 17 is an addition between the cathode current conversion voltage and the leak current conversion voltage using a reference signal. Therefore, in the comparator circuit 64, since two voltages including voltages having a leak current converted are compared, a leak current conversion voltage is offset.

That is, in the case of this embodiment, influence of the leak current flowing through the cathode electrode can be eliminated, thereby making it possible to optimally control cutoff adjustment or drive gain adjustment.

In addition, in the sample hold circuit 66, although sampling operation is controlled by the sampling pulse CK, a cycle of this sampling pulse CK is 1 horizontal period as shown in FIG. 6. Therefore, in this case, the capacitance of a capacitor used to hold the sampled voltage in a sample hold circuit 66 may be about some tens of pF. Such capacitor having a capacitance value can be easily formed in the integrated circuit.

Figure 9:
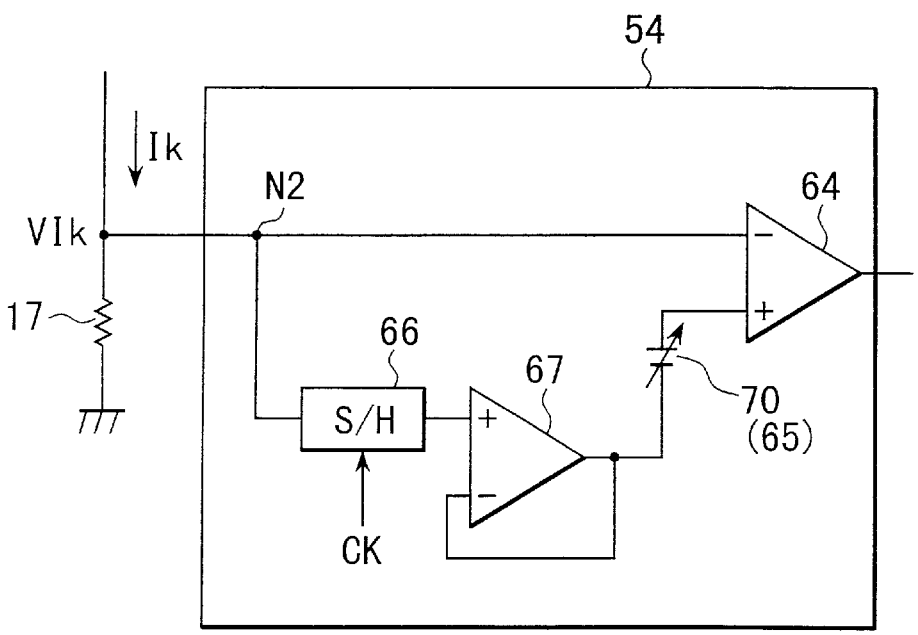
FIG. 9 is a circuit diagram showing a structure of a main portion of an AKB circuit according to a fourth embodiment of the present invention.

Now, a fourth embodiment of the present invention will be described. FIG. 9 shows an internal structure of the control circuit 54 for controlling operation of the cutoff adjusting circuit 7 of the R axis of the control circuits 54 to 59 in FIG. 4, together with the current detection resistor 17. The internal structures of the control circuits 54 to 59 are similar, and the description will be given by way of showing an example of the control circuit 54.

The control circuit of FIG. 9 is different from that of FIG. 8 in the points raised below. That is, in FIG. 8, the constant voltage source 65 is composed of the constant current source 68 and the resistor 69. However, in the case of FIG. 9, the constant voltage source 65 is a constant voltage source 70 connected between the non-inverting input terminal (+) and an output terminal of the operational amplifier circuit 67.

In the case of this embodiment, the reference voltage generated at the constant voltage source 70 and the voltage Vleak outputted from the operational amplifier circuit 67 are inputted to the non-inverting input terminal (+) of the comparator circuit 64, thus making it possible to eliminate influence of a leak current flowing through the CRT cathode electrode, as is the case with the third embodiment, and thereby making it possible to optimally perform cutoff adjustment and drive gain adjustment.

Figure 10:
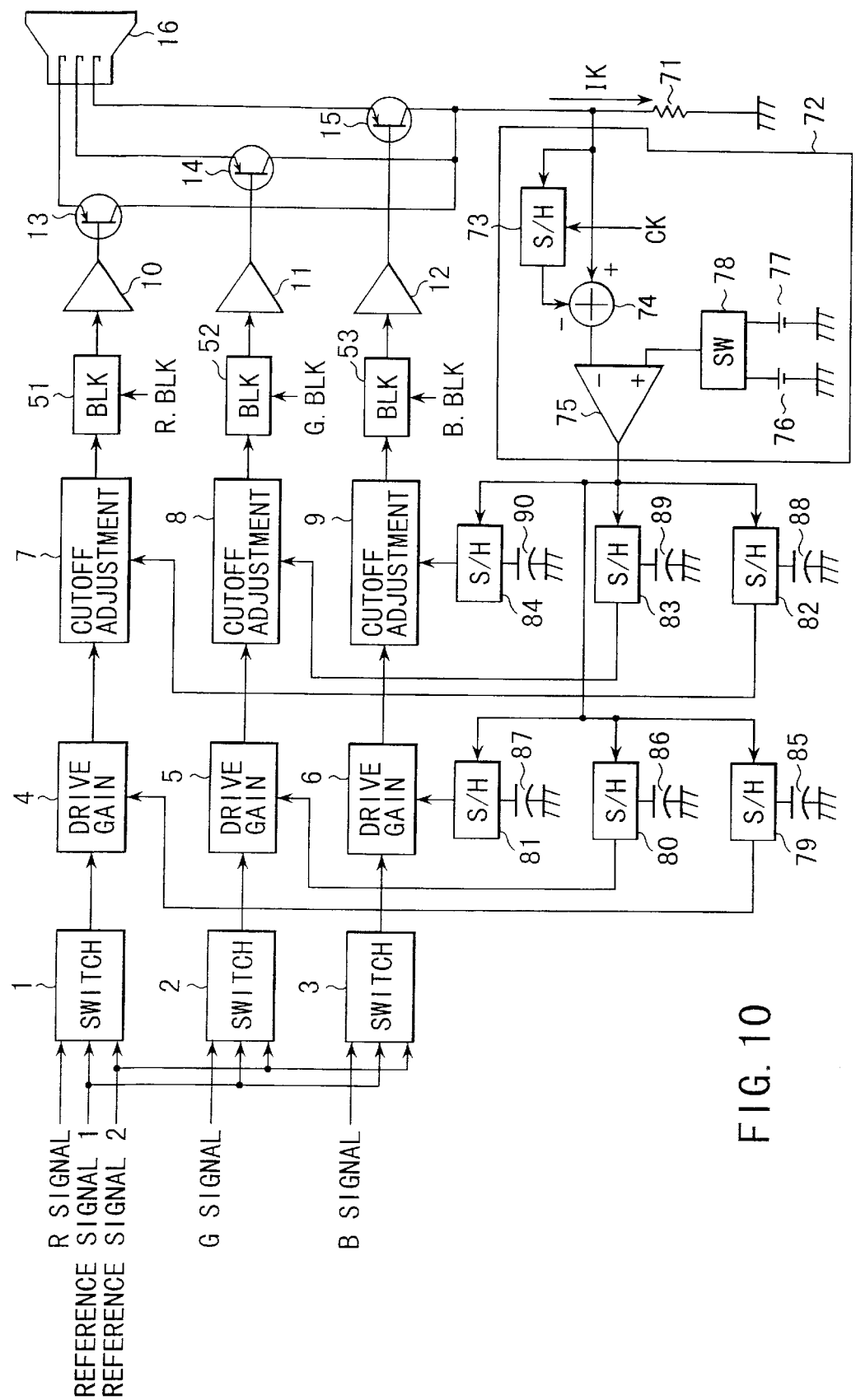
FIG. 10 is a block circuit diagram showing an entire structure of an AKB circuit according to a fifth embodiment of the present invention.

FIG. 10 is a block diagram showing an entire structure of an AKB circuit according to a fifth embodiment of the present invention. In the AKB circuits according the first to fourth embodiments, there has been provided the control circuits 54 to 59 independently by each of the R, G, and B axes, by each drive gain adjustment and by each cutoff adjustment (by each reference signal).

However, with such structure, there is a need for providing circuits such as a sample hold circuit, a subtract circuit, or an operational amplifier circuit by each axis and each reference signal, and a circuit structure becomes complicated.

In the AKB circuit of FIG. 10, for example, one control circuit having a substantially similar structure to the control circuit as shown in FIG. 7 is provided, and this single control circuit is used in common on all the R, G, and B axes and with both of the reference signals 1 and 2, thereby preventing a whole circuit scale from being enlarged.

In the AKB circuit shown in FIG. 10, like elements corresponding to those shown in FIG. 4 are designated by like reference numerals, and a duplicate description thereof is emitted. A description of only differences from those shown in FIG. 4 will be given here.

Collectors of the respective transistors 13, 14, and 15 are connected in common. Between this collector common connection node and a ground potential node, one current detection resistor 71 for converting the current flowing through each of the three cathode electrodes of CRT 16 into a voltage is connected. A drop voltage in this resistor 71 is supplied to a control circuit 72. In this control circuit 72, there are provided a sample hold circuit 73 corresponding to the sample hold circuit 61; a subtract circuit 74 corresponding to the subtract circuit 63; and a comparator circuit 75 corresponding to the comparator circuit 64. Further, there are provided a constant voltage source 76 for generating a reference voltage imparting a reference black level for comparison by the comparator circuit 75 and a constant voltage source 77 for generating a reference voltage for imparting a reference white level; and a switch circuit (SW) 78 for selecting these reference voltages and outputting them to a non-inverting input terminal (+) of a comparator circuit 75.

A drop voltage generated at the resistor 71 is sampled at a sample hold circuit 73. This sample hold circuit 73 samples a voltage in proportional to a cathode current during a certain period, for example, 1 H (1 horizontal period). The sampled voltage is supplied to the inverting input terminal (−) of the subtract circuit 74. In addition, the drop voltage in the resistor 71 is supplied to the non-inverting input terminal (+) of the subtract circuit 74.

An output terminal of the subtract circuit 74 is connected to an inverting input terminal (−) of the comparator circuit 75. To a non-inverting input terminal (+) of this comparator circuit 75, there is inputted an output voltage from the constant voltage source 76 for generating a black level reference voltage selected by a switch circuit 78 or an output voltage of the constant voltage source 77 for generating a white level reference voltage.

In this embodiment, there is further provided a sample hold circuit (S/H) and a voltage holding capacitor independently for each of the R, G, and B axes and for each of the drive gain adjustment and cutoff adjustment. The comparison results in the comparator circuit 75 are inputted to a drive gain adjusting sample hold circuit 79 on the R axis, a drive gain adjusting sample hold circuit 80 on the G axis, a drive gain adjusting sample hold circuit 81 on the B axis, a drive gain adjusting sample hold circuit 82 on the R axis, a cutoff adjusting sample hold circuit 83 on the G axis, and a cutoff adjusting sample hold circuit 84 on the B axis. Reference numerals 85 to 90 are voltage holding capacitors for holding the sampled voltages by respective sample hold circuits.

These voltages sampled by the respective sample hold circuits 79 to 84 and held by the respective capacitors 85 to 90 are supplied to the corresponding circuits of the drive gain adjusting circuits 4, 5, and 6 and the cutoff adjusting circuits 7, 8, and 9, and adjustment of an AC amplitude by each of the R, G, and B axes and adjustment of a DC level are performed.

Figure 11:
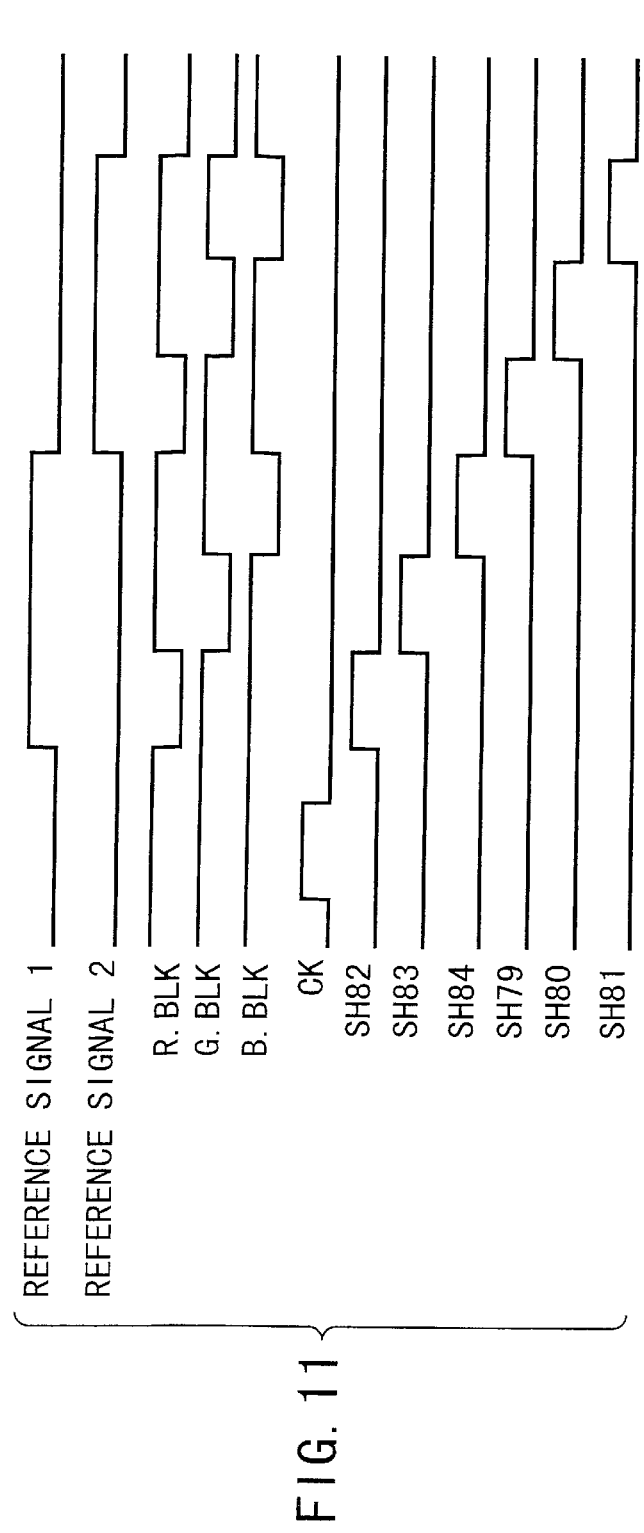
FIG. 11 is a timing chart showing an operation of the circuit of the embodiment of FIG. 10.

Now, operation of a circuit structured as shown in FIG. 10 will be described with reference to a timing chart of FIG. 11.

First, the switch circuits 1, 2, and 3 are switched, and all blanking signals R. BLK. G. BLK. B. BLK are set to "H" level before a reference signal 1 (black level) or a reference signal 2 (white level) is selected instead of the R, G, and B signals. In this manner, blanking circuits 51, 52, and 53 prevent outputs from the corresponding cutoff adjusting circuits 7, 8, and 9 to the corresponding drive circuits 10, 11, and 12. During this blanking period, the clock signal CK is set to "H" level; and the drop voltage of the resistor 71 due to a leak current is inputted to the control circuit 72, and is sampled and held by the sample hold circuit 73.

Next, the switch circuits 1, 2, and 3 are switched, and the reference signal 1 is selected instead of the R, G, and B signals. During a period when this reference signal 1 is selected, these signals R. BLK. G. BLK. and B. BLK are set to a predetermined period "L" level in order. Periods in which these signals R. BLK. G. BLK. and B. BLK are set to "L" level are not superimposed on one another.

During a period when the blanking signals R. BLK is set to "L" level, an output from the cutoff adjusting circuit 7 in the R axis is inputted to a base of the transistor 13 connected to a cathode of the R axis via the blanking circuit 51 and the drive circuit 10, and a current flows the R-axis cathode electrode of CRT 16. The cathode current at this time is converted to a voltage by the resistor 71, and the converted voltage is inputted to a non-inverting input terminal (+) of the subtract circuit 74 in the control circuit 72. If a voltage component based on a leak current is included in this converted voltage, subtraction is performed by the subtract circuit 74 between the voltages sampled and held by the sample hold circuit 73, thereby the voltage based on a leak current is canceled.

In addition, during a period when the reference signal 1 is inputted, a reference voltage from the constant voltage source 76 corresponding to a black reference level is selected in the switch circuit 78; and a voltage in which a voltage component has been canceled by the subtract circuit 74 based on a leak current and this reference voltage are compared with each other by means of the comparator circuit 75. The comparison results in this comparator circuit 75 is then sampled by the sample hold circuit 82 for cutoff adjustment on the R axis based on a sample hold circuit control signal 82 generated by a circuit (not shown), and is held by a corresponding capacitor 88. The held voltage is supplied to the cutoff adjusting circuit 7 on the R axis as a control signal, and a DC level of the R axis is adjusted based on this control signal. This adjusting operation is performed during a period when blanking signals R and BLK are set to "L" level, and the sample hold control signal SH82 are set to "H" level, and finally, a clamp level in the cutoff adjusting circuit 7 is adjusted so that both input voltages of the inverting input terminal and non-inverting input terminal of the comparator circuit 75 match with each other.

Thereafter, the blanking signals G. BLK. and B. BLK are sequentially set to "L" level during a predetermined period, and the sample hold control signals SH83 and SH84 generated by a circuit (not shown) are sequentially set to "H" level, whereby the respective DC levels are adjusted for the G and B axes, similarly.

Next, the switch circuits 1, 2, and 3 are switched, and the reference signal 2 is selected and outputted instead of the R, G, and B signals. Even during a period when this reference signal 2 is selected, the blanking signals R. BLK. G. BLK. and B. BLK are sequentially set to "L" level during a predetermined period.

During a period when the blanking signals R and BLK are set to "L" level, an output from the cutoff adjusting circuit 7 on the R axis is inputted to a base of a transistor 13 connected to a cathode electrode on the R axis, and a current flows the cathode electrode on the R axis of CRT 16. The cathode current at this time is converted into a voltage by the resistor 71, and is inputted to the non-inverting input terminal (+) of the subtract circuit 74. If a voltage component is included in the converted voltage based on a leak current, subtraction is performed by the subtract circuit 74 between the voltages that have been sampled by the sample hold circuit 73, thereby the voltage based on a leak current is canceled.

In addition, during a period when a reference signal 2 is selected, a reference voltage from the constant voltage source 77 corresponding to a white reference level is selected in the switch circuit 78; and a voltage in which the voltage component is canceled based on a leak current and this reference voltage are compared with each other by the comparator circuit 75. The comparison results in this comparator circuit 75 is then sampled by the sample hold circuit 79 for drive gain adjustment in the R axis based on a sample hold control signal SH79 generated by a circuit (not shown), and is held by a corresponding capacitor 85. The held voltage is supplied as a control signal to the drive gain adjusting circuit 4 on the R axis, and an AC amplitude is adjusted on the R axis based on this control signal. This adjusting operation is performed during a period when the blanking signals R and BLK are set to "H" level, and a sample hold control signal SH79 is set to "H" level, and finally, an AC amplitude in the drive gain adjusting circuit 4 is adjusted so that both input voltages of the inverting input terminal and non-inverting input terminal of the comparator circuit 75 match each other.

Thereafter, the blanking signals G. BLK. and B. BLK are sequentially set to "L" level during a predetermined period, and the sample hold control signals S80 and SH81 generated by a circuit (not shown) are sequentially set to "H" level during a predetermined period, thereby the respective AC amplitudes are adjusted for the G and B axes, similarly.

In this manner, according to this embodiment, a circuit portion for canceling a voltage based on a leak current flowing through a cathode electrode is used in common on all the three R, G, and B axes and with the reference signals 1 and 2. Thus, there is achieved an effect that the influence of a leak current flowing through a cathode electrode can be eliminated, and cutoff adjustment or drive gain adjustment is optimally performed. Further, there is another effect that a circuit scale is prevented from being enlarged.

In this embodiment, there was described a case when a control circuit whose structure is substantially similar to that of the circuit as shown in FIG. 7 is employed to cancel a voltage based on a leak current flowing through a cathode electrode. However, in addition to such control circuit whose structure is substantially similar to that of the circuit as shown in FIG. 7, there can be employed for the control circuits as shown in FIGS. 5, 8, and 9, respectively, a control circuit in which a circuit consisting of two constant voltage sources 76 and 77 and a switch circuit 78 has been added, as is the case with the control circuit 72 in FIG. 10.

In the first to fifth embodiments, although there was described a case when both of the cutoff (black level) and drive gain (white level) are adjusted, a circuit may be changed so as to adjust either one of them.

As has been described above, in the AKB circuit according to each embodiment, the influence of a leak current of a cathode electrode has been eliminated using a smaller number of capacitors and subtract circuits to obtain optimal cutoff characteristics or drive gain characteristics. Now, various embodiments of the AKB circuits capable of being manufactured inexpensively without requiring any capacitor will be described.

Figure 12:
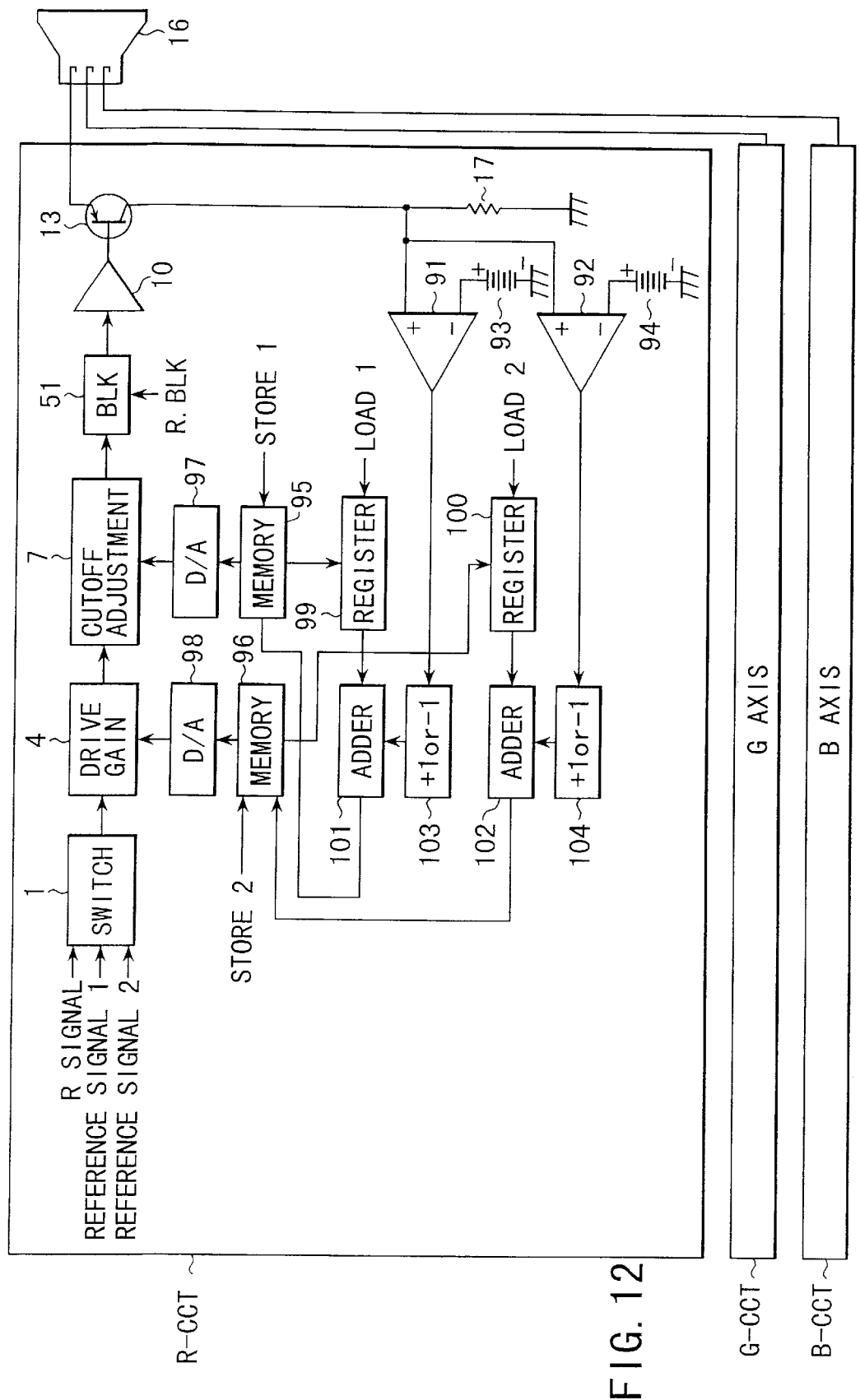
FIG. 12 is a block circuit diagram showing an entire structure of an AKB circuit according to a sixth embodiment of the present invention.

FIG. 12 is a block diagram showing an entire structure of an AKB circuit without requiring any capacitor according to a sixth embodiment of the present invention. In the circuit of FIG. 12, there is specifically shown only a circuit structure of an R-axis related circuit R-CCT associated with the R axis of the R, G, and B axes. The structures of the G-axis related circuit G-CCT and B-axis related circuit B-CCT associated with the remaining two axes (G and B axes) are similar to the R-axis related circuit, and thus, a description of these two circuits is omitted here.

In FIG. 12, the switch circuit 1 in the R-axis related circuit R-CCT selects and outputs one signal from among the video signal (R signal), the reference signal 1 (black level) and the reference signal 2 (white level). An output of this switch circuit 1 is inputted to the drive gain adjusting circuit 4. The drive gain adjusting circuit 4 performs adjustment of an AC amplitude of the output from the switch circuit 1. The cutoff adjusting circuit 7 performs adjustment (clamping) of a DC level of a signal to be outputted from the drive gain adjusting circuit 4. An output of this cutoff adjusting circuit is supplied to a base of the transistor 13 via the blanking circuit 51 and the drive circuit 10.

An emitter of the transistor 13 is connected to a cathode electrode of the R axis of the three cathode electrodes of the CRT 16. This transistor 13 is driven by the output from the drive circuit 10, thereby a current flows the cathode electrode of the CRT 16, and the CRT 16 is driven to be displayed.

Further, between a connector and a ground potential node of the transistor 13, the current detection resistor 17 for converting the current flowing through the cathode electrode is connected. A drop voltage in this resistor 17 is inputted to the non-inverting input terminal (+) of respective one of two comparator circuits (comparison circuits) 91 and 92.

A reference voltage corresponding to a black reference level generated by a constant voltage source 93 is inputted to an inverting input terminal (−) of the comparator circuit 91. A reference voltage corresponding to a white reference level generated by a constant voltage source 94 is inputted to an inverting input terminal (−) of a comparator circuit 92.

In addition, reference numerals 95 and 96 respectively are memory circuits each consisting of a non-volatile memory or the like capable of storing and holding data without supplying power, for example. In the above memory circuits 95 and 96, predetermined digital data is stored in advance to control respective operations of the cutoff adjusting circuit, 7 and the drive gain adjusting circuit 4. The stored data in both of the memory circuits 95 and 96 is read out, is supplied respectively to D/A (digital/analog) converters 97 and 98, is converted into an analog voltage therein, and is inputted as a control signal to the cutoff adjusting circuit 7 and the drive gain adjusting circuit 4.

In addition, the data stored in both of the memory circuits 95 and 96 each is read out in register circuits 99 and 100, respectively. Then, the data in both of the register circuits 99 and 100 is inputted to adders 101 and 102.

To both of the adders 101 and 102, predetermined digital data, for example, outputs of data selector circuits 103 and 104 for selecting and outputting "+1" or "−1", for example, are inputted. Data selecting operations of the above data selector circuits 103 and 104 are performed according to the comparison outputs of the above comparator circuits 91 and 92. The addition results of both of the adders 101 and 102 are inputted to both of the memory circuits 95 and 96, and is stored again, thereby storage data of both of the memory circuits 95 and 96 is updated.

When data is stored or stored again in both of the memory circuits 95 and 96, all storing operations are controlled by store signal store 1 and store 2. When storage data of both of the memory circuits 95 and 96 is loaded on the resistor circuits 99 and 100, all loading operations are controlled by load signal load 1 and load 2.

Now, an operation of the above structured AKB circuit will be described with reference to a timing chart of FIG. 13.

First, the reference signal 1 (black level) is selected by the switch circuit 1 during a period that is a vertical blanking period, but is not a feedback period, instead of the R signal. At this time, initial value data stored in advance in memory circuits 95 and 96 are read out, respectively, is converted into an analog voltage by the D/A converters 97 and 98, respectively, and is inputted as a control signal to a cutoff adjusting circuit 7 and a drive gain adjusting circuit 4. As a result, in the cutoff adjusting circuit 7 and drive gain adjusting circuit 4, respectively, a DC level and a drive gain are adjusted according to the initial value data.

On the other hand, storage data of the memory circuit 85 is fetched by a register circuit 99 at a timing of a signal load 1.

In addition, the cathode current of the CRT 16 when the reference signal 1, is inputted is converted into a voltage by the resistor 17, and is inputted to a non-inverting input terminal (+) of a comparator circuit 91. The above conversion voltage is compared with a reference voltage by the comparator circuit 91, and the "+1" data or "−1" data is selected by the data selector circuit 103 according to the comparison results. Assuming that the comparator circuit 91 is structured so as to output an "H" level signal when a conversion voltage in the resistor 17 is greater than a reference voltage, for example, the data selector circuit 103 selects and output the "−1" data at this time.

Thereafter, the "−1" data to be outputted from the data selector circuit 103 is added to the contents of the resistor circuit 99. That is, in this case, "1" is subtracted from the contents of the resistor circuit 99. The subtracted data is stored again in a memory circuit 95 at a timing of the signal store 1, and initial value data is updated.

That is, the updated storage data of the memory circuit 95 is reduced by "1" compared with the previous data, the updated data is read out again, is converted by the D/A converter 97, and is inputted to a cutoff adjusting circuit 7 as a control signal, thereby the data is controlled in the cutoff adjusting circuit 7 so that the cutoff level is lowered. As a result, a cathode current is reduced more significantly than before.

For convenience, a description has been given such that data update operation of the memory circuit is performed once during one input period of the reference signal 1. However, if there is met a relationship in timing of signal load 1 and signal store 1, i.e., a relationship that data is stored in a memory circuit by signal store 1 after data has been loaded on a register circuit by signal load 1, a plurality of data update operations of the memory circuit may be performed during an input period of the reference signal 1. However, a unit bit length of data to be stored in a memory circuit is about 8 bits, one data update operation during 1V (1 vertical) period will suffice. For example, when a data length is 8 bits, there is possibility that a data value changes from "00" to "FF" in hexadecimal notation. Assuming that 56 data update operations are performed, when one data update operation is performed during a 1V period, the data is set to a final value within about 4.3 seconds.

Similarly, the reference signal 2 is selected by a switch circuit 2, and data update operation of the memory circuit 96 for controlling the drive gain adjusting circuit 4 is performed during this selection period. In this case, after data has been loaded on the register circuit 100 by the signal load 1, the data is stored again in the memory circuit 96 in synchronism with the signal store 2.

Thus, according to this embodiment, after the cathode current of the CRT 16 has been converted into a voltage by the resistor 17, the converted voltage is compared with the reference voltage by these comparator circuits 91 and 92, digital data used to control operation of the drive gain adjusting circuit and cutoff adjusting circuit is updated based on the comparison results, the digital data is converted into an analog voltage by means of D/A conversion; and a control signal is supplied to the drive gain adjusting circuit and cutoff adjusting circuit. That is, in this embodied circuit, a sample hold circuit which a capacitor requires is not employed.

As a result, an external capacitor is not required during integration, and the number of external terminals of an integrated circuit is reduced, thus making it possible to reduce a manufacturing cost.

Figure 14:
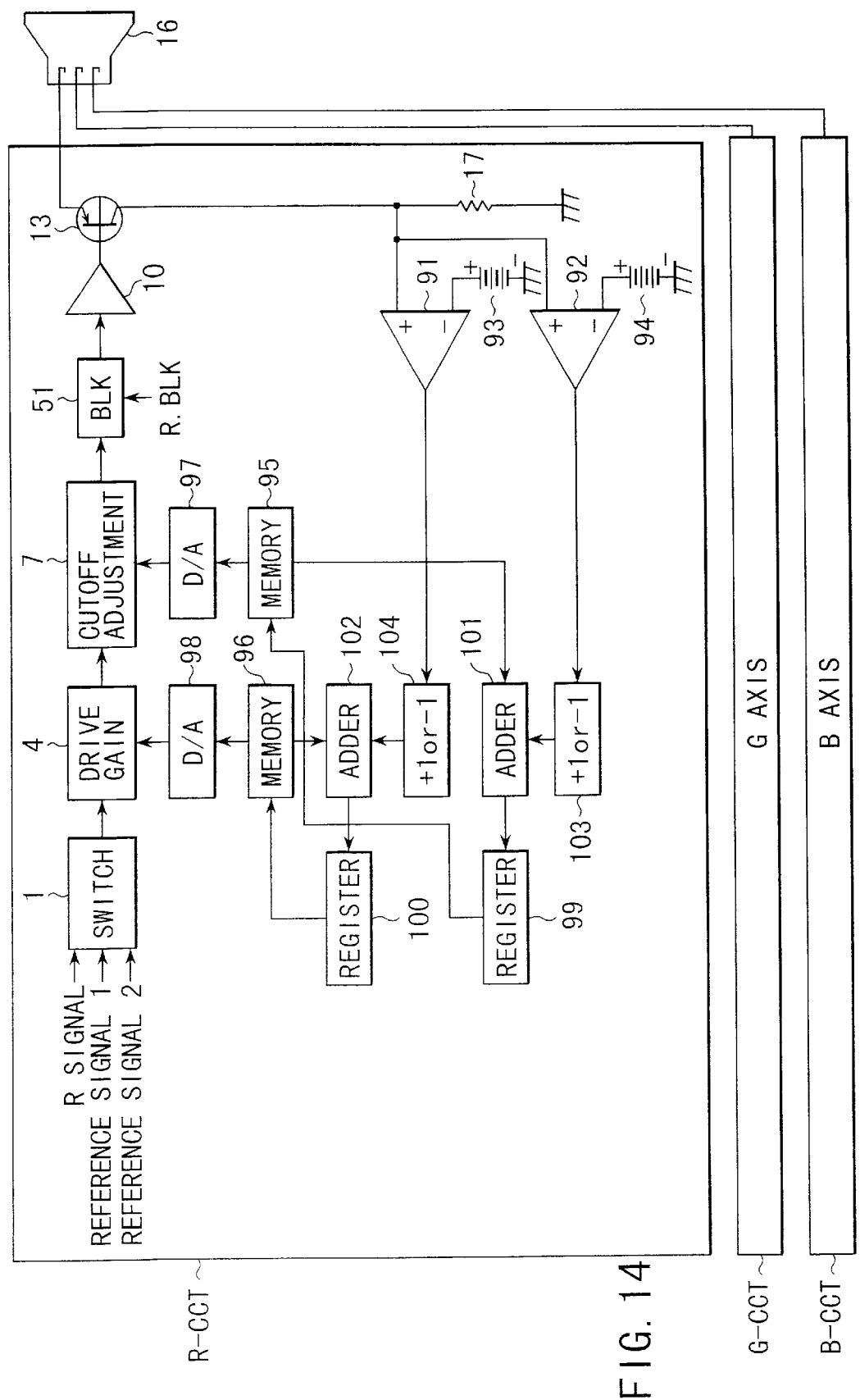
FIG. 14 is a block circuit diagram showing an entire structure of an AKB circuit according to a seventh embodiment of the present invention.

FIG. 14 shows a structure of an AKB circuit without requiring any capacitor according to a seventh embodiment of the present invention. In the circuit of FIG. 14, there is shown only a circuit structure of the R-axis related circuit R-CCT associated with the R axis of the R, G, and B axes. However, the structures of G-axis and B-axis related circuits G-CCT and B-CCT associated with the remaining G and B axes are similar that of the R-axis one, and thus, a description of these two circuits is omitted here.

The AKB circuit of this embodiment is different from that of FIG. 12 in that register circuits 99 and 100 are provided at different positions. That is, in the case of FIG. 12, the register circuits 99 and 100 are provided on input sides of the adders 101 and 102, and however, in this embodiments these circuits are provided on output sides of the adders 101 and 102.

That is, data read out from the memory circuits 95 and 96 are supplied to the adders 101 and 102. In these adders 101 and 102, addition between the data read out from the memory circuits 95 and 96 and data outputted from data selector circuits 103 and 104 is performed, and the data after the addition is loaded on the register circuits 103 and 104. Thereafter, the data in the register circuits 99 and 100 are stored again in the memory circuits 95 and 96.

Figure 13:
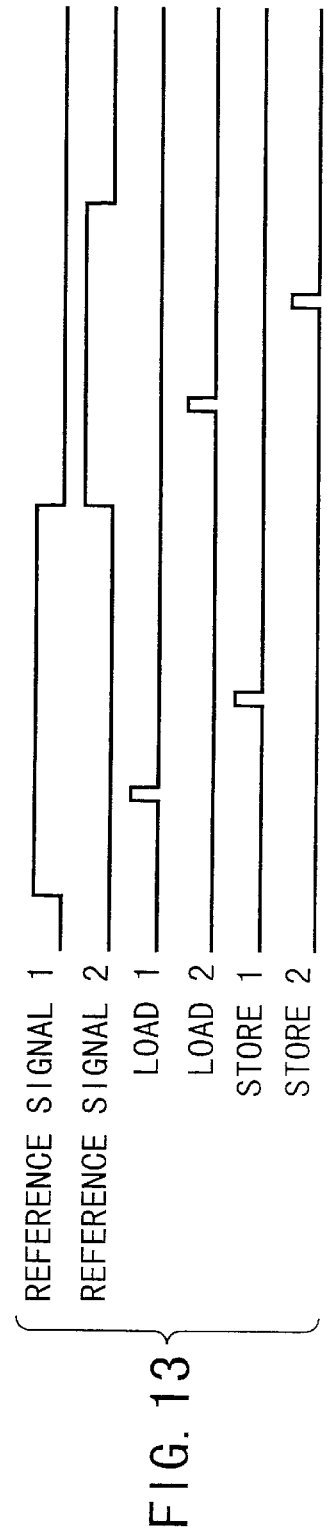
FIG. 13 is a timing chart showing an operation of the circuit of FIG. 12.

A timing of load and store signals in this embodiment may be identical to that as shown in FIG. 13.

Figure 15:
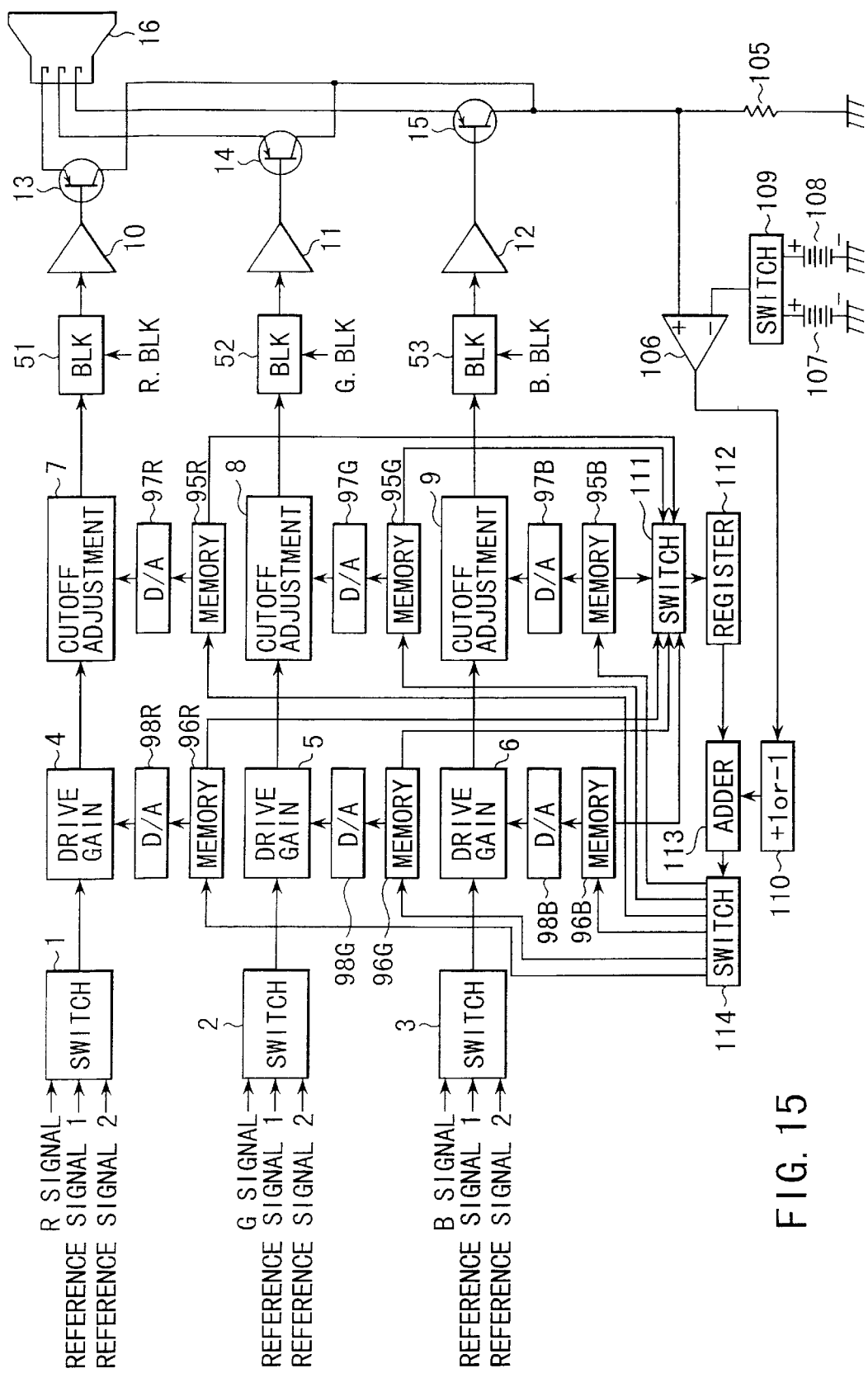
FIG. 15 is a block circuit diagram showing an entire structure of an AKB circuit according to an eighth embodiment of the present invention.
Figure 16:
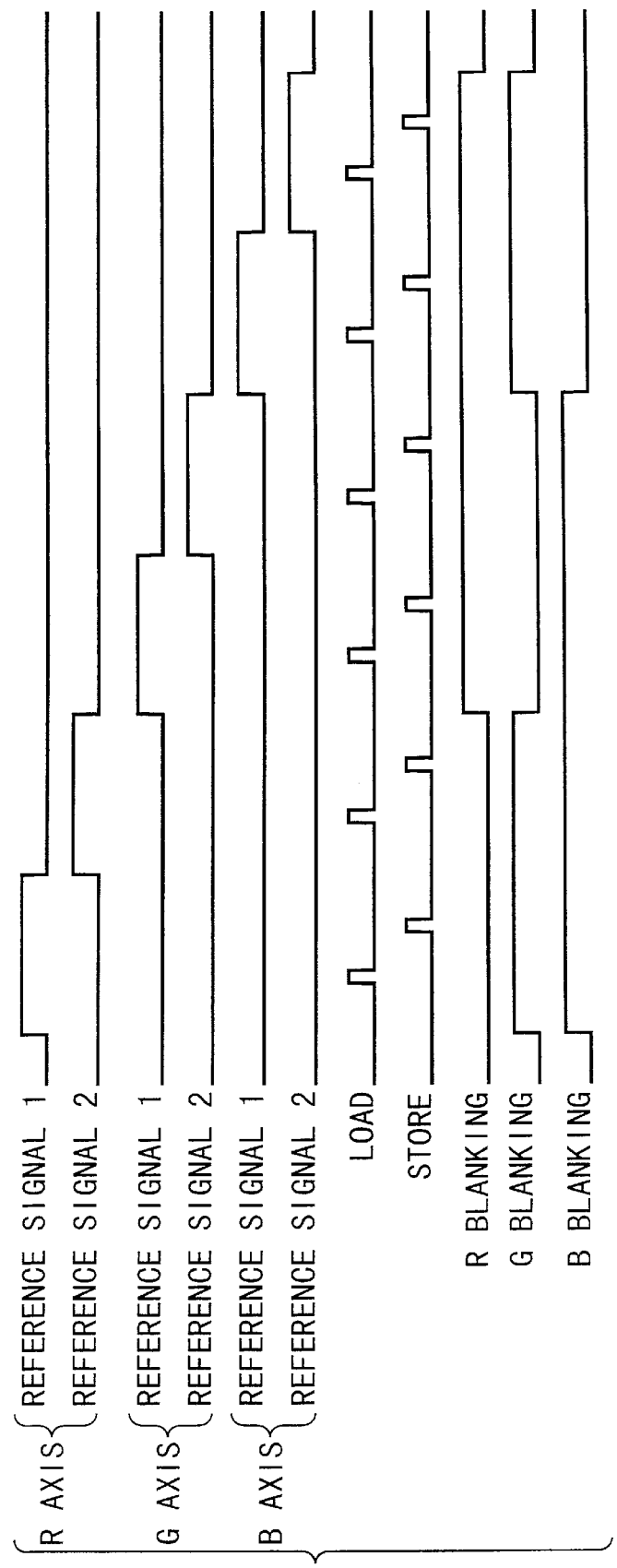
FIG. 16 is a timing chart showing an operation of the circuit of the embodiment of FIG. 15.

FIG. 15 is a block diagram showing an entire structure of an AKB circuit according to an eighth embodiment of the present invention. In the AKB circuit according to the seventh embodiment, there are separately provided comparator circuits 91 and 92, constant voltage sources 93 and 94 imparting reference black and white levels, data selector circuits 103 and 104, and register circuits 99 and 100 by each of the three R, G, and B axes. However, doing this causes the entire circuit structure to be complicated.

In the AKB circuit shown in FIG. 15, circuits commonly available in use are used in common on all of the three R, G, and B axes, thereby prevent a circuit scale from being enlarged. With respect to the memory circuit and the D/A converter in FIG. 15, elements associated with the R axis each are designated by "R" at the end of reference numeral in the figure; elements associated with the G axis each is designated by "G" at the end of reference numeral in the figure; elements associated with the B axis each is designated by "B" at the end of reference numeral in the figure.

In FIG. 15, switch circuits 1, 2, and 3 each selects and output respective one signal is selected from among an R, G, or B signal, reference signal 1 (black level) and reference signal 2 (white level). A period for selecting the above reference signals 1 and 2 is a period that is a vertical blanking period, but is not a vertical feedback period, i.e., part of a period that is generally over-scanned, and cannot be visualized by a user.

Drive gain adjusting circuits 4, 5, and 6 respectively consisting of gain control amplifiers perform drive gain of a signal outputted respectively from switch circuits 1, 2, and 3, i.e., adjustment of an AC amplitude. In addition, cutoff adjusting circuits 7, 8, and 9 respectively consisting of clamp circuits, for example, perform adjustment (clamping) of a DC level of a signal to be outputted respectively from drive gain adjusting circuits 4, 5, and 6. Outputs of the cutoff adjusting circuits 7, 8, and 9 are supplied to bases of output transistors 13, 14, and 15 each.

Emitters of the transistors 13, 14, and 15 are connected to cathode electrodes of the R, G, and B axes each, these transistors 13, 14, and 15 are driven by outputs from the drive circuits 10, 11, and 12, thereby a current flows the cathode electrode of each of the R, G, and B axes of the CRT 16, and the CRT 16 are driven to be driven.

Further, collectors of the transistors 13, 14, and 15 each are connected in common, and a current detection resistor 105 for converting a current flowing through the cathode electrode into a voltage is connected between this collector common connection node and a ground potential node. A drop voltage in this resistor 105 is inputted to a non-inverting input terminal (+) of a comparator circuit 106.

To an inverting input terminal (−) of the comparator circuit 106, a reference voltage outputted from a constant voltage source 107 generating a black level reference voltage or a reference voltage outputted from a constant voltage source 108 generating a white level reference voltage are selectively inputted via a switch circuit 109.

The comparison results in the above comparator circuit 106 are inputted to a data selector circuit 110. This data selector circuit 110 selects and outputs predetermined digital data, i.e., "+1" data or "−1" data according to comparison results of the comparator circuit 106.

In addition, reference numerals 95R, 95G, 95B, 96R, 96G, and 96B are memory circuits each consisting of non-volatile memory, for example. In these memory circuits 95R, 95G, 95B, 96R, 96G, and 96B each, predetermined digital data for controlling respective operations of drive gain adjusting circuits 4, 5, and 6 and cutoff adjusting circuits 7, 8, and 9 on the R, G, and B axes each are stored in advance. Data stored in these memory circuits 95R, 95G, 95B, 96R, 96G, and 96B each is read out, is supplied to D/A converters 97R, 97G, 97B, 98R, 98G, and 98B, respectively, is converted into an analog voltage therein, and further, is supplied as a control signal to a corresponding one of the cutoff adjusting circuits 7, 8, and 9, and the drive gain adjusting circuits 4, 5, and 6.

In addition, data read out from these memory circuits 95R, 95G, 95B, 96R, 96G, and 96B each is selected by a switch circuit 111, and is loaded on a register circuit 112. The data in this register circuit 112 is inputted to an adder 113.

Output data of the above data selector circuit 110 is also added to the above adder 113. The addition results of the adder 113 are selected from and inputted to any of the above memory circuits 95R, 95G, 95B, 96R, 96G, and 96B via a switch circuit 114, and is stored again in that memory circuit, thereby the stored data is updated.

Now, the reference signal 1 (black level) is selected by the switch circuit 1, and is inputted to the drive gain adjusting circuit 4 instead of the R signal. At this time, only the blanking signals B and BLK on the R axis are set to "L" level, and the remaining blanking signals G, BLK, B, and BLK on the G and B axes are set to "H" level together. In this manner, only the blanking circuit 51 supplies an output from the corresponding drive gain adjusting circuit 4 to the drive circuit 10, and blanking circuits 52 and 53 prevent outputs from the corresponding cutoff adjusting circuits 8 and 9 from being supplied to the corresponding drive circuits 11 and 12. At this time, no cathode current substantially flows the G and B axes.

On the other hand, a cathode current flows the R axis according to a reference signal; and this cathode current is converted into a voltage by the resistor 105, and is inputted to the non-inverting input terminal (+) of the comparator circuit 106. At this time, in the switch circuit 109, the reference voltage from the constant voltage source 107 corresponding to a reference black level is selected. Thereafter, a conversion voltage by the resistor 105 is compared with the reference voltage by the comparator circuit 106, and further, the "+1" or "−1" data is selected and outputted by the data selector circuit 110 according to the comparison results. For example, assuming that the comparator circuit 106 is so structured as to output an "H" level signal when the conversion voltage in the resistor 105 is greater than the reference voltage, the data selector circuit 110 selects and outputs the "−1" data.

At this time, the switch circuit 111 selects data read out from the memory circuit 95R, and the selected data is loaded on the register circuit 112 at a timing of a load signal. Thereafter, the "−1" data selected and outputted from the data selector circuit 110 is added to the contents of the register circuit 112 by the adder 113. That is, in this case, "1" is subtracted from the contents of the register circuit 112. The added data is supplied via the switch circuit 114 to an original memory circuit 95R in which data has been read. Then, the memory circuit 95R is stored again at a timing of the store signal, and initial value data is updated.

That is, the updated storage data of the memory circuit 95R is reduced by "1" compared with the previous value, the updated data is read out, is converted by the D/A converter 97R, and is inputted to the cutoff adjusting circuit 7 on the R axis, thereby the cutoff adjusting circuit 7 is controlled so that a cutoff level is lowered. As a result, the cathode current on the R axis is reduced more significantly than before.

In this case also, a description was given so that data update operation of the memory circuit is performed once during one input period of the reference signal 1. However, if there is met a relationship of load and store signals, i.e., a relationship that data is stored again in the memory circuit with the store signal after data has been loaded on the register circuit with the load signal, a plurality of data update operations may be performed during one input period of the reference signal 1.

Next, the reference signal 2 (white level) is selected on the R axis by the switch circuit 2, and data update operation of the memory circuit 96R for controlling the drive gain adjusting circuit 4 is performed during this period in a manner similar to the above. However, in this case, the switch circuit 109 selects a voltage of the reference voltage source 108 corresponding to the reference white level; the switch circuit 111 select data from the memory circuit 96R and outputs the data; and the switch circuit 114 selects the addition results of the adder 113, and outputs the results to the memory circuit 96R.

Next, the reference signal 1 (black level) is selected by the switch circuit 2 instead of the G signal, and is inputted to the drive gain adjusting circuit 3 on the G axis. At this time, only the blanking signals G. BLK on the G axis are set to "L" level, and the remaining blanking signals R. BLK, B. BLK on the R and B axes are set to "H" level together. In this manner, blanking circuits 51 and 53 prevent outputs from the corresponding cutoff adjusting circuits 7 and 9 from being supplied to the corresponding drive circuits 10 and 12. That is, in the CRT 16, a cathode current does not substantially flow the R and B axes.

On the other hand, a cathode current corresponding to a reference signal flows the cathode electrode on the G-axis; and this cathode current is converted into a voltage by the resistor 105, and is inputted to the non-inverting input terminal (−) of the comparator circuit 106. At this time, the switch circuit 109 selects the voltage of the constant voltage source 107 corresponding to the reference black level. Thereafter, the conversion voltage by the resistor 105 is compared with the reference voltage by the comparator circuit 106, and further, the "+1" or "−1" data or "−1" data is selected and outputted by the data selector circuit 110 according to the comparison results.

At this time, the switch circuit 111 selects data read out from the memory circuit 95G, and the selected data is loaded on the register circuit 112 at a timing of a load signal. Thereafter, data outputted from the data selector circuit 110 is added to the contents of the resistor circuit 112 by the adder 113. The added data is supplied to an original memory circuit 95G via the switch circuit 114, and then, is stored again in the memory circuit 95G at a timing of the store signal. Then, initial value data is updated.

In this case also, a plurality of data update operations of the memory circuit may be performed during one input period of the reference signal 1.

Next, the reference signal 2 (white level) is selected by the switch circuit 2, and is inputted to the drive gain adjusting circuit 5 on the G axis. During this period, data update operation of the memory circuit 96G for controlling the drive gain adjusting circuit 5 is performed in a manner similar to the above. However, in this case, the switch circuit 109 selects the voltage of the reference voltage source 108 corresponding to the reference white level; the switch circuit 111 outputs data from the memory circuit 96G to the register circuit 112; and the switch circuit 114 outputs the addition results of the adder 113 to the memory circuit 96G.

Hereinafter, similarly, adjusting operation in the cutoff adjusting circuit 9 and drive gain adjusting circuit 6 on the B axis is performed.

In this embodiment also, since a sample hold circuit is not employed, there is achieved an effect that an external capacitor is eliminated during circuit integration, and the number of external terminals of an integrated circuit is reduced, thus making it possible to reduce a manufacturing cost. Further, the cathode current detector circuit and the comparator circuit for comparing between the detected voltage by this detector circuit and the reference voltage are used in common on the R, G, and B axes and with the reference signals 1 and 2, there is achieved an effect that a circuit scale is not enlarged.

In this embodiment also, the position of the register circuit 112 may be changed to the output side of the adder 113 in a manner similar to that of the embodiment of FIG. 14.

Figure 17:
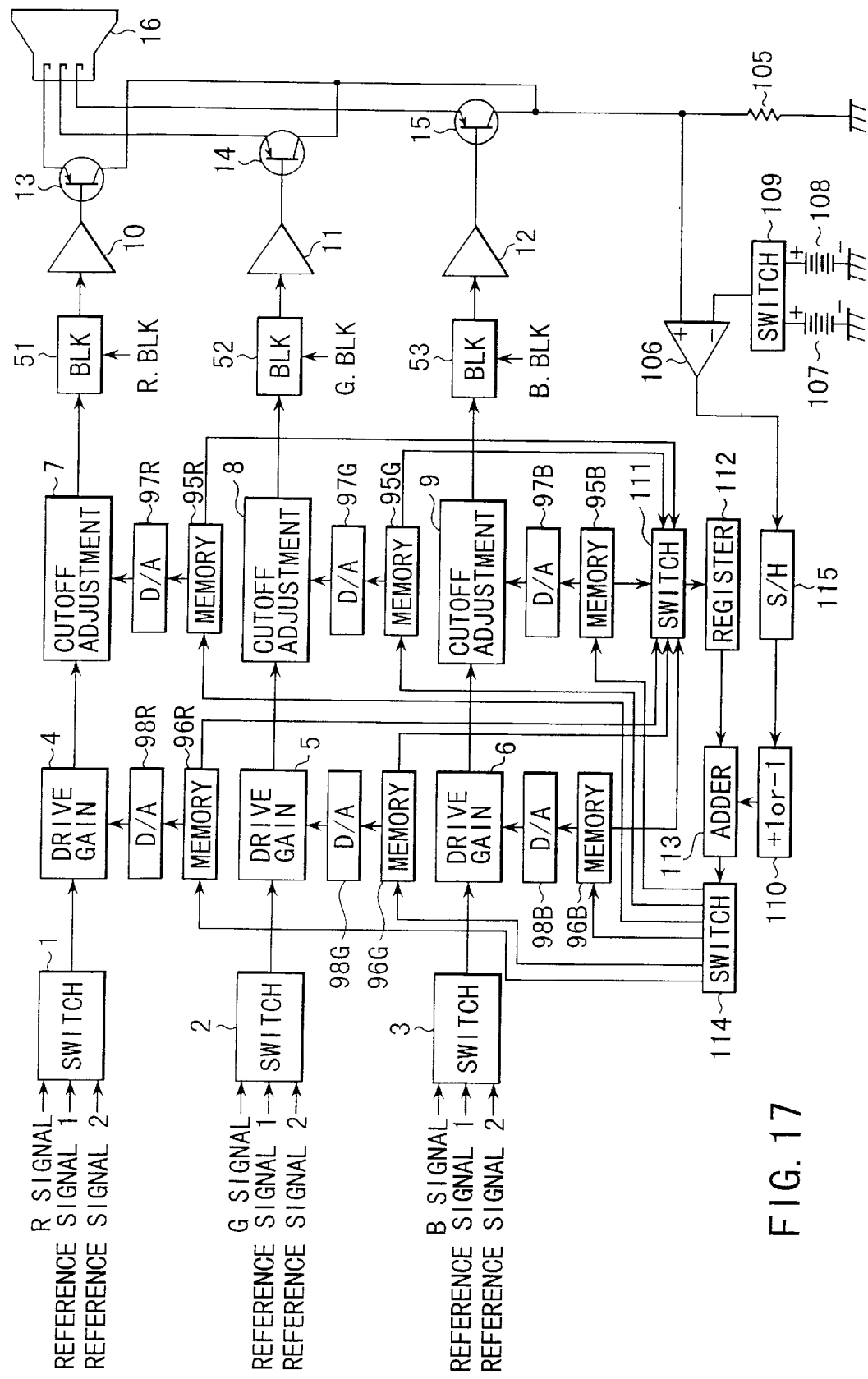
FIG. 17 is a block circuit diagram showing an entire structure of an AKB circuit according to a ninth embodiment of the present invention.

FIG. 17 is a block diagram showing an entire structure of an AKB circuit according to a ninth embodiment of the present invention. The AKB circuit according to this embodiment inserts a sample hold circuit 115 between the comparator circuit 106 and the data selector circuit 110 of the AKB circuit of FIG. 15, thereby making it possible to temporarily save the comparison results of the comparator 106.

With such structure, high-speed operation is ensured. Namely, it takes a certain time until the comparison results of the comparator 106 have been obtained after reference signal input. When the previous comparison results of the comparator circuit 106 is saved in the sample hold circuit 115, even if the reference signal is changed, the subsequent processing is not influenced. Therefore, for example, a timing of inputting the reference signal for adjusting operation on the next axis can be fastened, thereby making it possible to endure speedy operation.

In this case, the sample hold circuit 115 is provided, thus requiring a voltage holding capacitor. However, since only one comparator circuit 115 will suffice, only one terminal is increased, and a manufacturing cost is not so high.

Figure 18:
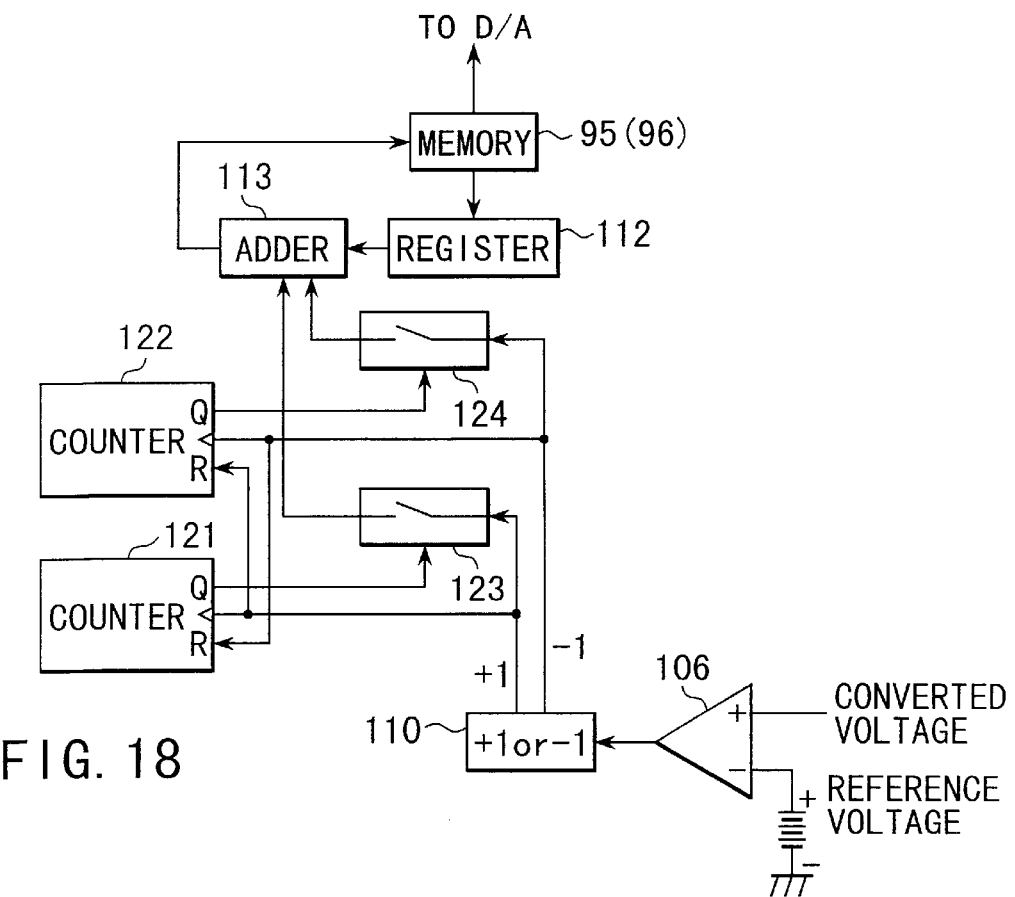
FIG. 18 is a circuit diagram showing an entire structure of a main portion of an AKB circuit according to a tenth embodiment of the present invention.

FIG. 18 is a block diagram showing a partial, schematic structure of an AKB circuit according to a tenth embodiment of the present invention. The AKB circuit according to this embodiment is different from the AKB circuit of FIG. 15 in that respective two counter circuits 121 and 122 and gate circuits 123 and 124 are added. Only when the same data is continuously outputted from the data selector circuit 110 in plurality, the data in the register circuit 112 and the data from the data selector circuit 110 are added by the adder 113.

These two counter circuits 121 and 122 each comprises a clock input terminal, a reset terminal (R), and a count output terminal (Q). In addition these two gate circuits 123 and 124 each comprises an input terminal, an output terminal, and a control terminal.

In addition, the data selector circuit 110 comprises a "+1" data output terminal and a "−1" data output terminal.

An input terminal of a gate circuit 123 is connected to the output terminal of the "+1" data of the data selector circuit 110, and the output terminal of this gate circuit 123 is connected to the adder 113. The input terminal of the gate circuit 124 is connected to the "−1" data output terminal of the data selector circuit 110, and the output terminal of this gate circuit 124 is connected to the adder 113.

Further, a clock input terminal of the counter circuit 121 is connected to the output terminal of the "+1" data of the data selector circuit 110; the reset terminal is connected to the output terminal of the −1data of the data selector circuit 110, and the count output terminal is connected to the control terminal of the gate circuit 123. A clock input terminal of the counter circuit 122 is connected to the output terminal of the "−1" data of the data selector circuit 110, the reset terminal is connected to the output terminal of the "+1" data of the data selector circuit 110; and the count output terminal is connected to the control terminal of a gate circuit 124.

In the figure, although the switch circuits, 111 and 114 or the like are not shown, of course, they are provided in a manner similar to that shown in FIG. 15.

In the AKB circuit having such structure, when the converted voltage to be inputted to the comparator circuit 106 is greater than the reference voltage, the output of the comparator circuit 106 is set to "H" level, and the data selector circuit 110 selects and outputs the "−1" data. The "−1" data is outputted, thereby the counter circuit 122 counts up, and at the same time, the counter circuit 121 is reset.

Thereafter, every time the data selector circuit 110 outputs the "−1" data, the counter circuit 121 continues counting up. When the counts of the counter circuit 122 is set to a predetermined number, the output signal from the count output terminal is inverted, the gate counter 124 opens, and the "−1" data is outputted to the adder 113. Therefore, in the adder 113, after addition between the data read out from the memory circuit 95 (or 96) in advance and the "−1" data has been Performed, the addition is stored again in the original memory circuit 95 (or 96).

In contrast, when the converted voltage to be inputted to the comparator circuit 106 is smaller than the reference voltage, the output of the comparator circuit 106 is set to "L" level, and the data selector circuit 110 selects and outputs the "+1" data. The "+1" data is outputted, thereby the counter circuit 121 counts up, and at the same time, the counter circuit 122 is reset. Thereafter, every time the data selector circuit 110 outputs the "+1" data, the counter circuit 121 continues counting up. When the counts of the counter circuit 121 is set to a predetermined number, the output signal from the count output terminal is inverted, the gate circuit 123 opens, and the "+1" data is outputted to the adder 113. Therefore, in the adder 113, after addition between the data read out from the memory circuit 95 (or 96) in advance and the "+1" data has been performed, the addition is stored again to the original memory circuit 95 (or 96).

That is, the AKB circuit according to this embodiment is made so that addition is performed by the adder 113 only when the certain count of the same data has been continuously outputted from the data selector circuit 110, thus making it possible to prevent addition from being performed by the adder 113 when the output of the comparator circuit 106 is temporarily inverted due to noise or the like.

Figure 19:
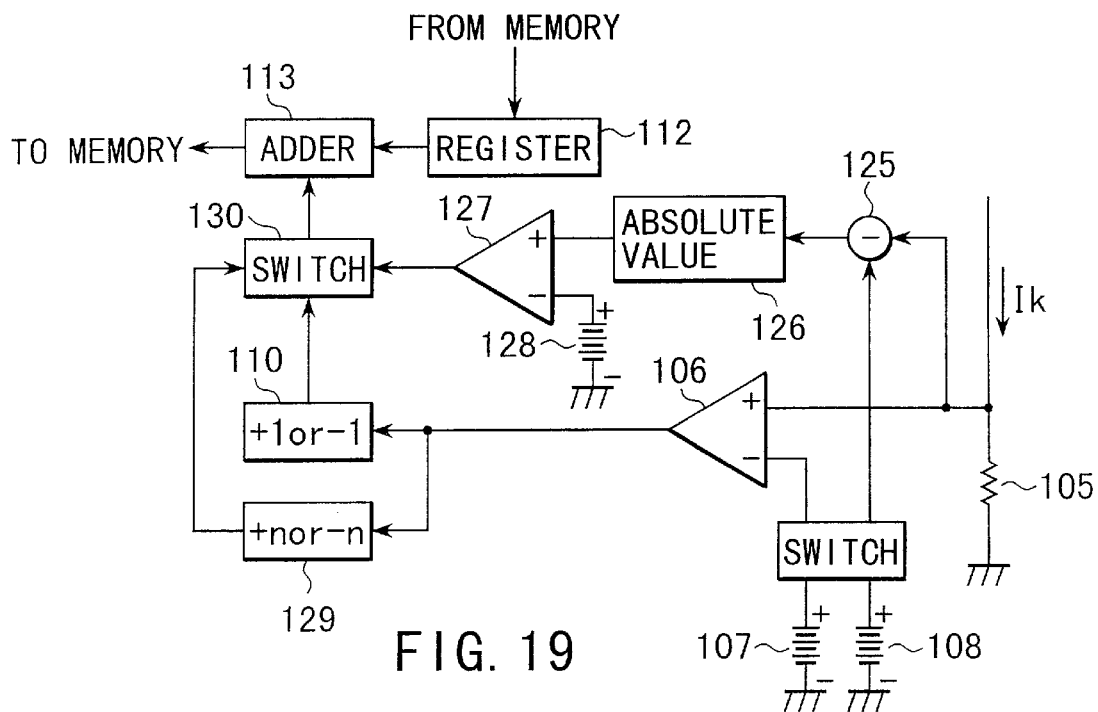
FIG. 19 is a circuit diagram showing an entire structure of a main portion of an AKB circuit according to an eleventh embodiment of the present invention.

FIG. 19 is a block diagram showing a partial, schematic structure of an AKB circuit according to an eleventh embodiment of the present invention. The AKB circuit according to this embodiment performs addition between the contents of the register circuit 112 and "−n" data or "+n" data ("n" designates a positive integer 2 or more), thereby reducing a conversion time of a closed loop system instead of performing addition between the contents of the register circuit 112 and the "−1" data and "−1" data by the adder 113 in the case where there is a considerably large difference between two input voltages of the comparator circuit 106 in the AKB circuit of FIG. 15.

The AKB circuit of FIG. 19 is different from the AKB circuit FIG. 15 in that a subtractor 125, an absolute value detector circuit 126, a comparator circuit 127, a constant voltage source 128, a data selector circuit 129, and a switch circuit 130 are newly added.

The above subtractor 125 performs subtraction between a converted voltage with the resistor 105 and a reference voltage corresponding to a white or black reference level to be selected by the switch circuit 109. An output of this subtractor 125 is supplied to a non-inverting input terminal of the comparator circuit 127 after an absolute value has been fetched by the absolute value detector circuit 126. A reference voltage generated by the constant voltage source 128 is supplied to an inverting input terminal of this comparator circuit 127. Outputs of the comparator 106 are supplied to the data selector circuits 110 and 129. Outputs of the data selector circuit 110 and 129 are supplied to the switch circuit 130.

With such structure, when an output from the absolute value detector circuit 126 to be supplied to the non-inverting input terminal of the comparator circuit 127 is smaller than a reference voltage generated by the constant voltage source 128, an output of the data selector circuit 110 is selected by the switch circuit 130. Therefore, in this case, addition between the contents of the register circuit 112 and the "−1" data or "+1" data outputted from the data selector circuit 110 is performed by the adder 113 in a manner similar to that described previously.

On the other hand, when an output from the absolute value detector circuit 126 supplied to the non-inverting input terminal of the comparator circuit 127 is greater than the reference voltage of the constant voltage source 128, the output of the data selector circuit 129 is selected by the switch circuit 130.

Therefore, in this case, addition between the contents of the register circuit 112 and the "−n" or "+n" data outputted from the selector circuit 129 is performed by the adder 113, and the addition results of the adder 113 result in discrete values, thus making it possible to reduce a conversion time of a closed loop system.

In the sixth to eleventh embodiments each, although a case when both of cutoff (black level) and drive gain (white level) are adjusted has been described, a circuit may be changed so as to adjust either one of them.

In the meantime, in the AKB circuits of digital system according to the sixth to eleventh embodiments each, there has been described a case when a reference signal is inputted during a vertical blanking period; a cathode current at this time is detected, and is converted into a voltage; and the converted voltage is compared with one reference voltage by a comparator circuit. However, in general, in the case of a digital system, when a voltage is compared with the comparator circuit, two reference voltages VrefH and VrefL on high and low level sides are used as reference voltages, respectively.

That is, in the case of the digital system, since a drop voltage in the resistor 17 or 105 result in discrete values, two reference voltages are used. For example, if only one reference voltage is used, the drop voltage fluctuates so as to encompass the reference voltage without converging at one point unlike an analog system. Therefore, in the digital system, two reference voltages are provided to create a "voltage window". When a converted voltage is placed within this window, an attempt is made to create a stable point at which data is not changed.

In addition, the values of above two reference voltages VrefH and VrefL must be set to be a potential difference (difference between VrefH and Vref) wider than a variation quantity per step of the fall voltage during drive gain adjustment and cutoff adjusting which depend on precision of the D/A converter.

Figure 20A:
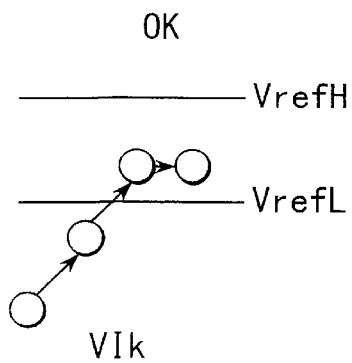
FIGS. 20A and 20B are views showing a relationship among a conversion voltage VIk and two reference voltages VrefH and VrefL in a current detector circuit.
Figure 20B:
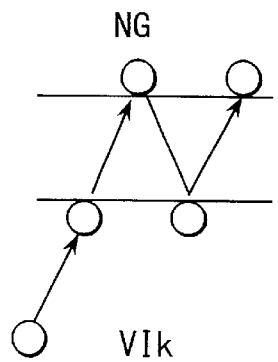

This is because if a potential difference of the two reference voltages VrefH and VrefL is smaller than a variation quantity per step, as shown in "NG" of FIG. 20B, the converted voltage VIk jumps the two reference voltages VrefH and VrefL, and a stable point cannot be found. In "OK" of FIG. 20A, there is shown a case when a potential difference between the two reference voltages VrefH and VrefL is greater than a variation quantity per step, and a stable point of the converted voltage Vlk exists.

Figure 21:
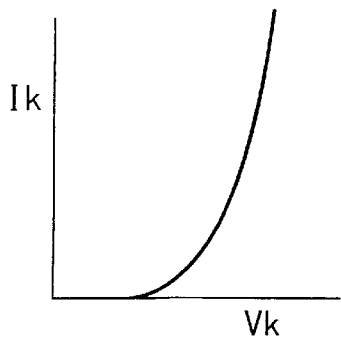
FIG. 21 is a characteristic view showing a relationship between a CRT cathode voltage and a cathode current.

However, a relationship between the cathode voltage (Vk) and cathode current (Ik) of CRT is not linear, as shown in FIG. 21, and therefore, a variation quantity of the converted voltage VIk per step depends on Ik.

In addition, since a unit difference depending on CRT is great, it is required to set this voltage width wider than necessary in order to reliably set a voltage width (potential difference) broader than a variation quantity per step.

However, doing this causes a stable point to include a large amount of error.

An AKB circuit of digital system according to a twelfth embodiment of the present invention which prevents such inconvenience will be described below.

Figure 22:
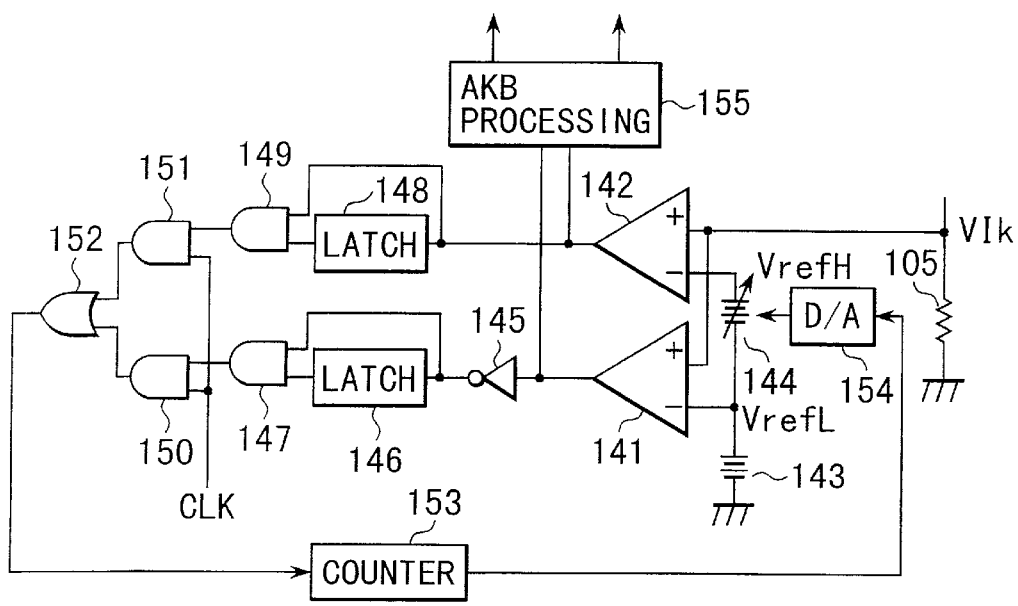
FIG. 22 is a circuit diagram showing a structure of a main portion of an AKB circuit according to a twelfth embodiment of the present invention.

FIG. 22 shows a structure of a main portion of the circuit.

The drop voltage in the current detection resistor 105 for converting a CRT cathode current to a voltage are inputted to the non-inverting input terminal (+) of respective one of two converter circuits 141 and 142.

A reference voltage VrefL on the low level side generated by the constant voltage source is supplied to the inverting input terminal of the comparator circuit 143. A reference voltage VrefH on the high level side generated by the constant voltage source 144 is superimposed on the reference voltage Vref on the low level side, and is supplied to the inverting input terminal (−) of the comparator circuit 142.

An output of the comparator 141 is supplied to an inverter 145; an output of this inverter 145 is supplied to an input terminal of a latch circuit 146, and is supplied to one input terminal of a two-input AND gate 147. In addition, an output of this latch circuit 146 is supplied to the other input terminal of the AND gate 147.

An output of the comparator circuit 142 is supplied to an input terminal of a latch circuit 148, and is supplied to one input terminal of a two-input AND gate 149. In addition, an output of this latch circuit 148 is supplied to the other terminal end of the AND gate 149.

The outputs of the AND gates 147 and 149 are supplied to one input terminal of respective one of the two-input AND gates 150 and 151. Clock signals CLK are supplied to the other input terminal of respective one of the AND gates 150 and 151. Outputs of the AND gate 150 and 151 are supplied to a two-input OR gate 152. An output of this OR gate 152 is counted by a counter circuit 153, and a count output is supplied to a D/A converter 154. An output of this D/A converter 154 is supplied to the constant voltage source 144 for generating a reference voltage VrefH on the high level side as a control signal for changing a value of a reference voltage.

In addition, outputs of these converter circuits 141 and 142 are supplied to an AKB processor circuit 155 composed of a register circuit 100 and adders 101 and 102 shown in FIG. 12, for example.

In the AKB circuit having such structure, the comparison results of the comparator circuits 141 and 142 compared with each other between two continuous fields, and the counter circuit 153 is counted up based on the comparison results. Further, the count output of the counter 153 is D/A converted by the D/A converter 154, and a value of the reference voltage VrefH on the high level side generated by the constant voltage source 144 is changed according to the D/A converted output value.

Figure 23:
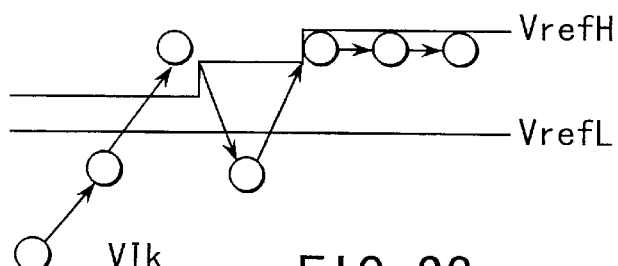
FIG. 23 is a view showing a relationship among a conversion voltage VIk and two reference voltages VrefH and VrefL in the embodied circuit of FIG. 22.

That is, as shown in FIG. 23, during a initial state, a value of the reference voltage VrefH on the high level side is set to a minimum value. When the drop voltage VIk in the resistor 105 changes jumping a potential difference between VrefL and VrefH, either one of these two AND gates 147 and 149 is set to "H" level, thereby the counter circuit 153 counts up by one clock, and is controlled so that the value of the reference voltage VrefH on the high level side generated by the constant voltage source 144 is increased according to the D/A converted output value of the D/A converter 154. Such controlling is performed until the drop voltage VIk does not jump a potential difference between the reference voltages VrefL and VrefH.

According to the AKB circuit of this embodiment, the converted voltage VIk by the resistor 105 converges to the optimal value within the limit of precision of the D/A converter 154. Therefore, cutoff adjustment and drive gain adjustment are performed with high precision.

Figure 24:
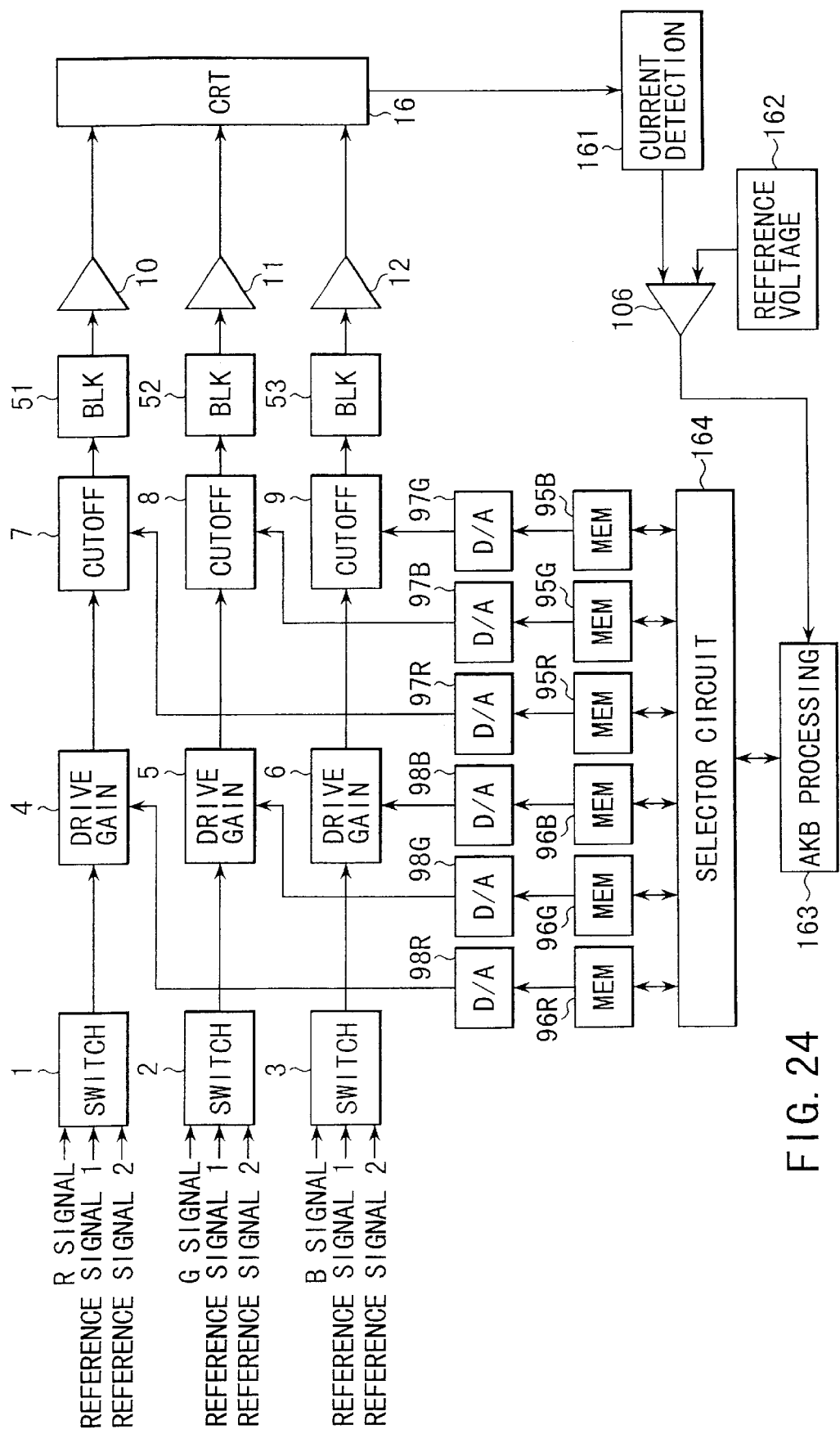
FIG. 24 is a block diagram of which an AKB circuit according to the eighth embodiment shown in FIG. 15 is schematically rewritten.

FIG. 24 schematically rewrites the AKB circuit shown in FIG. 15. The current detector circuit 161 in the figure corresponds to the register 105 for current detection in FIG. 15. The reference voltage circuit 162 in the figure corresponds to the constant voltage sources 107 and 108 and the switch circuit 109 in FIG. 15. The AKB processor circuit 113 in the figure corresponds to the data selector circuit 110, register circuit 112, and adder 113 in FIG. 15. Further, the selector circuit 164 corresponds to the switch circuits 111 and 114 in FIG. 14. In FIG. 24, transistors for driving cathode electrodes or the like are not shown.

In the AKB circuit of FIG. 24, drive gain of signals selected and outputted from the switch circuits 1, 2, and 3, i.e., adjustment of an AC amplitude is performed in the drive gain adjusting circuits 4, 5, and 6. During this period, digital data stored in the memory circuits (MEM) 96R, 96G, and 96B in advance is read out by each of the R, G. and B axes, After these digital data have been D/A converted by the D/A converters (D/A) 98R, 98G, and 98B by each of the R, G, and B axes, the converted analog data is supplied as a control signal to the corresponding drive gain adjusting circuits 4, 5, and 6.

In addition, in the cutoff adjusting circuits 7, 8, and 9, a DC level of a signal outputted from the switch circuits 1, 2, and 3 each is adjusted. During this period, digital data stored in advance in the memory circuit (MEM) 97R, 97G, and 97B is read out by each of the R, G, and B axes. After these digital data have been D/A converted by means of D/A converters (D/A) 97R, 97G, and 97B by each of the R, G, and B axes, the converted analog voltage is supplied as a control signal to the corresponding cutoff adjusting circuits 7, 8, and 9.

Outputs from the cutoff adjusting circuits 7, 8, and 9 each are supplied to the cathode electrode of each of the R, G, and B axes of the CRT 16.

In the blanking circuits 51, 52, and 53, in addition to general blanking, an unwanted signal other than an adjusting axis is blanked during a period of an AKB adjusting process. In addition, in the CRT 16, a voltage is applied to each cathode electrode, thereby a cathode electrode flows, and the CRT is driven to be displayed.

In the CRT 16, when the reference signal 1 or the reference signal 2 is supplied, cathode currents flow according to the voltages applied to each cathode electrode. These cathode electrodes each are detected by the current detecting circuit 161, is converted into voltages, and is outputted. The converted voltage outputted from this current detecting circuit 161 is compared with a black level reference voltage or a white level reference voltage outputted from the reference voltage circuit 162.

This output of the comparator circuit 106 is supplied to the AKB processor circuit 163. In this AKB processor circuit, new digital data is produced according to the comparison results of the comparator circuit 106. The produced new digital data is stored again in a corresponding circuit of a plurality of memory circuits 95R, 95G, 95B, 96R, 96G, and 96B, and the data is updated.

By means of a positive feedback loop as shown above, values of the cathode currents at the dark and bright matters are adjusted so as to match a predetermined reference value by each of the R, G, and B axes. As a result, a white balance is automatically adjusted.

In the meantime, in the AKB circuit as shown in FIG. 24, it is required to be increased the detection count of the cathode current in order to ensure stability of a circuit system. Therefore, in general, 1 horizontal period (1H) is allocated as a detection period by each of the adjustment axes.

For example, to simplify a circuit structure, the current detector circuit 161, the reference voltage circuit 162, the comparator circuit 106, the AKB processor circuit 163, and the selector circuit 164 or the like are used in common by each of the R, G, and B axes. When three-axis adjustment is performed by time division processing, as shown in a timing chart of FIG. 25, the adjustment is performed using three continuous horizontal period (3H) in a blanking period.

That is, a black level adjustment consisting of, R-axis cutoff adjustment in a first 1 field, G-axis cutoff adjustment, and B-axis cutoff adjustment is performed; a white level adjustment consisting of R-axis gain adjustment, G-axis gain adjustment, and B-axis gain adjustment in a next 1 field; and subsequently, the black level and white level are finally converged by repeating these adjusting operations.

Figure 25:
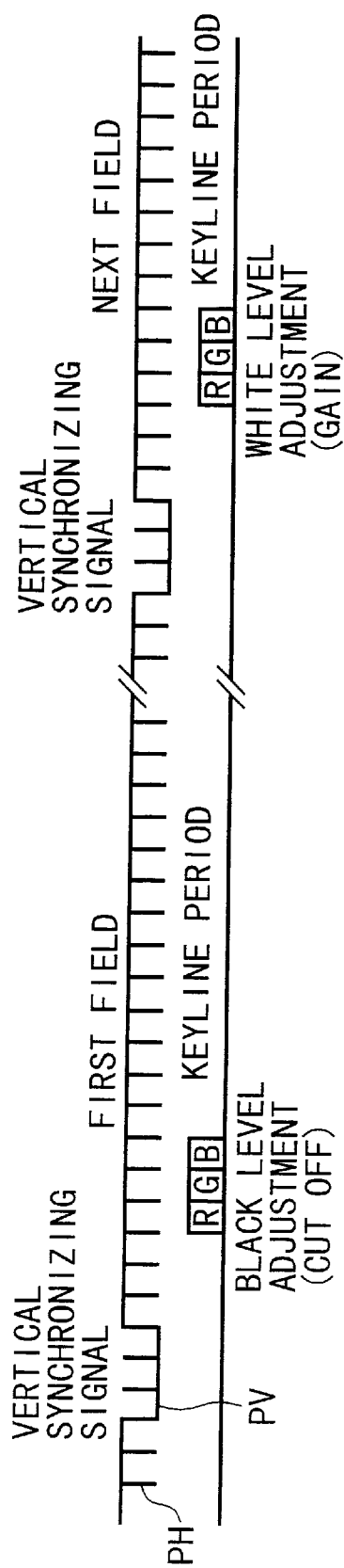
FIG. 25 is a timing chart of signals used in the circuit of FIG. 24.

In FIG. 25, PV designates a vertical synchronizing signal, and PH designates a horizontal synchronizing signal. In addition, general keyline period is started after the end of a blanking period in which black and white levels are adjusted.

In the meantime, during AKB processing, it is, of course, required to keep track with relatively slow changes such as initial adjustment when power is supplied, a change with a temperature drift, and a change with an elapse of time such as degraded CRT characteristics. In addition, it is, of course, required to keep track with an rapid change due to fluctuation or the like of high voltage such as screen voltage applied to CRT (a second grid voltage of CRT).

The CRT anode voltage fluctuates according to the brightness of the display screen (video contents), and further, depends on value of the CRT beam current.

On the other hand, a high voltage such as screen voltage or anode voltage is generated by a high-voltage generator circuit. Generally, a high-voltage generator circuit provided at a television receiver does not have sufficient voltage stability. Therefore, when the above beam current fluctuates, the high voltage generated by the high-voltage generator circuit fluctuates. Such phenomenon is generally called "high-voltage fluctuation".

Also, the CRT screen voltage is influenced by the high-voltage fluctuation, and fluctuates. The CRT cutoff level is influenced by this screen voltage. Therefore, when a high-voltage fluctuation occurs, a cutoff level fluctuates.

Such high-voltage fluctuation frequently occurs. If this high-voltage fluctuation occurs, the cutoff level significantly changes. This change is rapid, a variation quantity is great, and quick response is required. Therefore, as shown in FIG. 25, when an attempt is made to perform AKB processing for each axis once by 2 fields, if a high-voltage fluctuation occurs, it may be impossible to cope with such fluctuation on the aspect of a track speed.

In addition, there will occur a failure that, when many more adjustment periods than 3 horizontal periods per field are provided, a reflection with a CRT tube face becomes conspicuous due to a reference signal inputted to detect a cathode current; and a failure that, when a detection period is less than 1 horizontal period, stability is impaired as has been already described.

Figure 26:
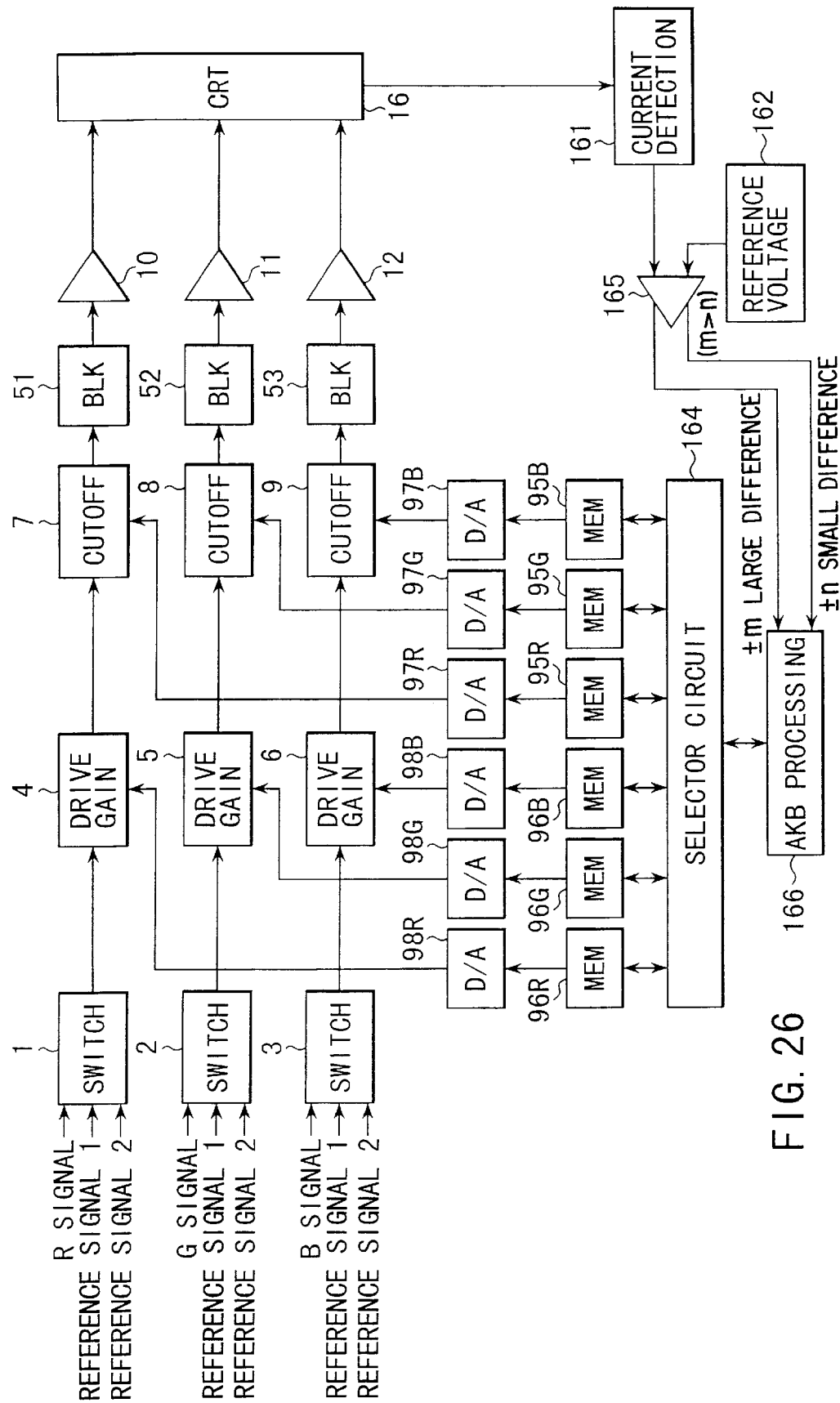
FIG. 26 is a block diagram showing an entire structure of an AKB circuit according to a thirteenth embodiment of the present invention.

As an example of improving a convergence speed of AKB processing during high-voltage fluctuation, there is exemplified a circuit as shown in FIG. 26. FIG. 26 is a block diagram showing an entire structure of an AKB circuit of digital system according to a thirteenth embodiment of the present invention. A description of elements corresponding to those shown in FIG. 24 is omitted, and only points different from FIG. 24 will be described.

In this AKB circuit, the quantity by which the data stored in the memory circuit is updated is set in the same way as in the AKB circuit shown in FIG. 19. That is, a small variation quantity is set to ensure high precision of updating the data if the data is near the convergence point, and a large variation quantity is set to ensure high precision of updating the data if the data is far from the convergence point.

Thus, when the converted voltage from the current detector circuit 161 and the reference voltage generated by the reference voltage circuit 162 are compared with each other by the comparator circuit 165, in the case where a difference between these voltages is great, memory circuit storage data is updated in a coarse variation quantity ($\pm m$) by the AKB processor circuit 166. On the other hand, in the case where the above difference is small, memory circuit storage data is. updated in a fine variation quantity ($\pm n$: $n<n$) by the AKB processor circuit 166.

In this case, a state of data update in discontinuous, a large variation quantity occurs. However, if a noise is produced, this noise is mistakenly judged to be due to high-voltage fluctuation. Although high-voltage fluctuation does not occur actually, the data is updated in large variation quantity, and there is a possibility that screen luminance flickers.

For such inconvenience, there is provided an integration effect due to increasing the cathode current detection count to prevent malfunction. However, this means an increase in processing time, thus making it impossible to keep track with a rapid change such as high-voltage fluctuation.

In general, the voltage-current characteristics in the CRT cathode electrode is not linear, and provide gamma characteristics. Therefore, as described above, when data is discretely updated in variation quantity (in steps), it is difficult to judge whether or not convergence at an adjustment point is obtained.

This is because a variation quantity of the cathode current per step varies depending on a value of the cathode voltage by each CRT or even if it may be the same CRT.

Therefore when a convergence range is determined, if the range is narrowly set to ensure high precision, it is presumed that the cathode current occasionally varies by variation of 1 step over the convergence range, and does not reach the convergence point. In contrast, if the convergence range is broadened to cope with this problem, precision of adjustment is impaired.

FIG. 27A shows a case when a variation quantity $\Delta Ik$ of the cathode current per step is optimally set. When a converted voltage VIk of a cathode current Ik falls from the reference voltage VrefH side being the high level side, and rises from the reference voltage VrefL side being the low level side, the current converges between the reference voltages VrefH and VrefL. FIG. 27B shows a case when a variation quantity $\Delta Ik$ of the cathode current per step is highly set. When the variation quantity VIk falls from the reference voltage VrefH side being the high level side, and rises from the reference voltage VrefL side being the low level side, the voltage jumps between the reference voltages VrefH and VrefL. Thus, the voltage does not converge. In addition, FIG. 27C shows a case when the variation quantity $\Delta Ik$ of the cathode current per step is lowly set. When the variation quantity VIk falls from the reference voltage VrefH side being the high level side, and rises from the reference voltage VrefH side being the high level side, a convergence point will differ from another.

To the contrast, a relationship in terms of scale is compared at one point without setting a convergence range, there cannot be solved a problem that convergence is not obtained as shown in FIG. 27B or that convergence is obtained as shown in FIG. 27C.

However, when discrete data is employed, as shown in FIG. 28, data (VIk) produced by the AKB processor circuit 166 fluctuates based on the cathode current (Ik).

Figure 29:
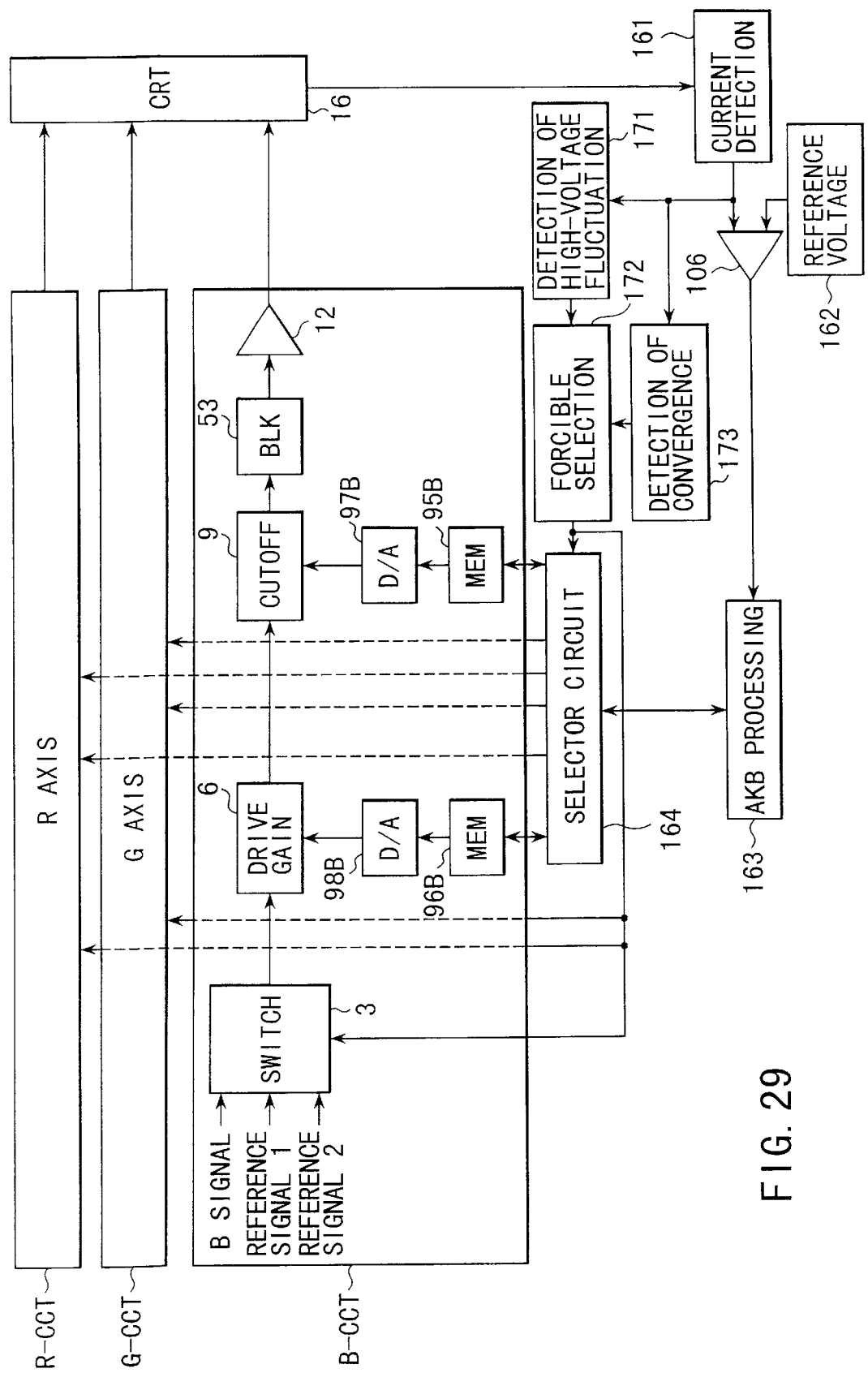
FIG. 29 is a block diagram showing an entire circuit structure of an AKB circuit according to a fourteenth embodiment of the present invention.

FIG. 29 is a block diagram showing an entire circuit structure of an AKB circuit according to the fourth embodiment of the present invention, wherein when a high-voltage fluctuation occurs, and a DC level of a video signal rapidly changes, adjustment is performed keeping track with this DC level change at high speed. In FIG. 29, there is specifically shown only a B-axis related circuit B-CCT associated with the B axis of the R, G, and B axes of three-primary color video signals. However, since the structures of R-axis and G-axis related circuits R-CCT and G-CCT associated with the remaining R and G axes are similar to that of the shown B-axis related circuit, a description of these two circuits is omitted. Like elements, corresponding to those of the embodied circuit of FIG. 24 are designated by like reference numerals, and will be described.

In the CRT 16, a cathode current flows the cathode electrode according to a cathode voltage applied when the reference signal 1 or the reference signal 2 is supplied; and the cathode current is detected by the current detector circuit 161, is converted into a voltage, and is outputted.

The converted voltage outputted from the current detector circuit 161 is compared with the black level reference voltage or the while level reference voltage generated by the reference voltage circuit 162.

An output of the comparator circuit 106 is supplied to the AKB processor circuit 163. In the AKB processor circuit 163, new digital data is produced according to the comparison results of the comparator circuit 106. The produced new digital data is stored again in the memory circuit 95B or 96B via the selector circuit 164, and the data is updated.

In addition, in the circuit of FIG. 29, in addition to the above structure, a high-voltage fluctuation detector circuit 171, a forcible selector circuit 172, and a convergence detector circuit 173 are added.

The high-voltage fluctuation detector circuit is connected to the current detector circuit 161. In the case where the converted voltage outputted from the current detector circuit 161 rapidly fluctuates, the high-voltage fluctuation detector circuit 171 detects this state as an occurrence of fluctuation of high voltage applied to CRT 16. A detection output in the high-voltage fluctuation detector circuit 171 is supplied to the forcible selector circuit 172. When a high-voltage fluctuation occurs at the high-voltage fluctuation detector circuit 171, the forcible selector circuit 172 controls an operation of the selector circuit 164 so that only digital data for black level (dark matter) update produced by the AKB processor circuit 163 is selected.

In addition, the convergence detector circuit 173 is connected to the current detector circuit 161. This convergence detector circuit 173 detects whether or not an actual black level converges to the reference black level according to the converted voltage outputted from the current detector circuit 161. When this convergence is detected, a state of the forcible selector circuit 173 is returned to a state in which both adjusting operations of black level (dark matter) and white level (bright matter) are selected in the selector circuit 164.

Further, an output of the forcible selector circuit 172 is supplied to the switch circuit 3. This switch circuit 3 is controlled so as to select only the reference signal 1 corresponding to a reference black level by each field or so as to alternately select the reference signals 1 and 2 corresponding to the reference black and white levels by each field.

With such structure, in a state when a high-voltage fluctuation does not occur, the switch circuit 3 is controlled so as to alternately select the reference signals 1 and 2 corresponding to the reference white and black levels by each field. Further, the selector circuit 164 is controlled so as to alternately select digital data for black level (dark matter) update and for white level (bright matter) update produced by the AKB processor circuit 163. Therefore, black level adjusting operation in the cutoff adjusting circuit 9 and white level adjusting operation in the drive gain adjusting circuit 6 are performed alternately in each field.

On the other hand, when it is detected that high-voltage fluctuation has occurred at the high-voltage fluctuation detector circuit 117, the switch circuit 3 is controlled so as to select the reference signal 1 corresponding to the reference black level in each field. In addition, by an output from the forcible selector circuit 172, the selector circuit 164 is controlled so as to select only digital data for black level (dark matter) generated by the AKB processor circuit 163. As a result, adjusting operation for only a black level in the cutoff adjusting circuit 9 is performed for each field.

In the convergence detector circuit 173, when it is detected that an actual black level has converged into the reference black level, a state of the forcible selector circuit 172 is returned to a state in which both adjusting operations of the black level (dark matter) and white level (bright matter) are performed. Subsequently, the above state is returned to the general state as described previously, i.e., the state in which adjusting operation of the black level in the cutoff adjusting circuit 9 and adjusting operation of the white level in the drive gain adjusting circuit 6 are alternately performed.

Figure 30:
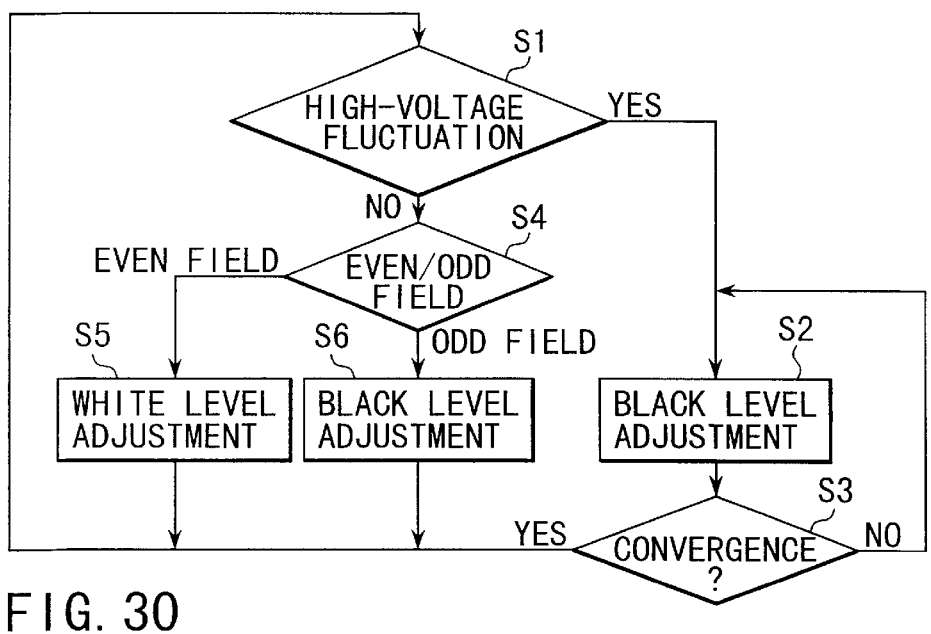
FIG. 30 is a flow chart showing a control example of the circuit according to the fourteenth embodiment.

FIG. 30 shows a control example of the AKB circuit according to a fourteenth embodiment by way of a flow chart. When a high-voltage fluctuation is detected during reference signal selection in step S1, black level adjusting operation is performed in step S2. Then, in step S3, a black level convergence state is detected. If the convergence is not detected, processing returns to step S2, and black level adjusting operation is performed again in the next field.

On the other hand, when a black level convergence is detected, processing returns to step S1, and detection of a high-voltage fluctuation is performed. If a high voltage is not detected, an odd field or even field is detected in step S4. When an odd field is detected, white level adjusting operation is performed in step S5. Then, processing returns to step S1 again, and detection of a high-voltage fluctuation is performed. If a high-voltage fluctuation is not detected, a odd field or an even field is detected. When the odd field is detected, black level adjusting operation is performed in step S6.

In the meantime, in actual high-voltage fluctuation, a black level (cutoff level) greatly changes, but a white level hardly changes. Thus, quick white level adjustment is not required during high-voltage fluctuation. Therefore, the black level which greatly changes during high-voltage fluctuation is adjusted for each field, and thus, the fluctuation can be converged at a speed twice as high as that in the case of the embodiment of FIG. 24.

As a result, even if a DC level of a video signal is rapidly changed due to high-voltage fluctuation, it is possible to perform adjustment at a high speed, keeping track with this change.

The AKB circuit according to this embodiment is always be limited to a circuit structure as shown in FIG. 29 if the circuit includes the function shown in each step as shown in FIG. 30. For example, a circuit using a program controlled CPU may be employed.

Figure 31:
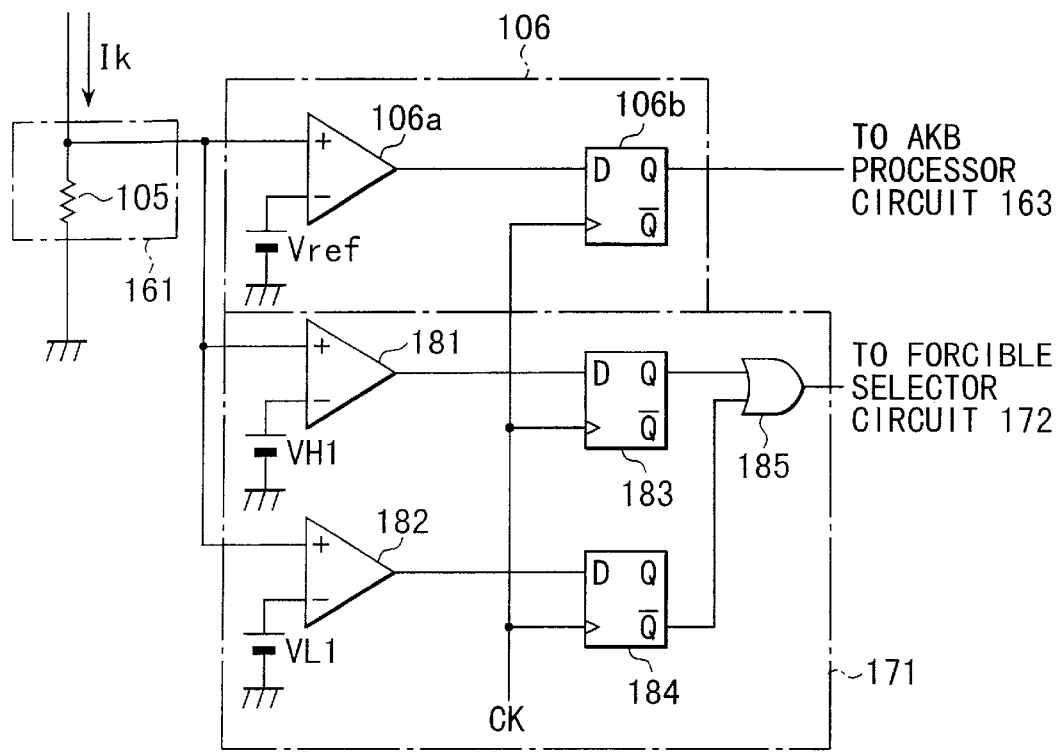
FIG. 31 is a view partially showing a detailed circuit structure of the circuit of FIG. 29.

FIG. 31 shows a specific example of a circuit structure of the current detector circuit 161, the high-voltage fluctuation detector circuit 171, and the comparator circuit 106, respectively in FIG. 29.

The current detector circuit 106 is composed of the resistor 105 for converting a cathode current Ik of the CRT 16 to a voltage.

The comparator circuit 106 is composed of: a comparator 106a for comparing a voltage converted by the current detector circuit 161 and a reference voltage Vref corresponding to a black reference level or a white reference level generated by the reference voltage circuit 162; and a latch circuit 106b in which an output of the comparator 106a is supplied to a data (D) input terminal, and a clock signal CK is supplied to a clock input terminal.

In the comparator circuit 106 having such structure, if a converted voltage is greater than a reference voltage Vref, an output (Q) of the comparator 106a is set to "1" level. In contrast, if the value of the converted voltage is smaller than the reference value Vref, the output (Q) of the comparator (Q) is set to "0" level. The output of the comparator 106a is latched by the latch circuit 106b in synchronism with the clock signal CK, and is supplied to the AKB processor circuit 163.

The high-voltage fluctuation detector circuit 171 is composed of: a comparator 181 for comparing the converted voltage by the current detector circuit 161 and a reference voltage VH1 being a voltage higher than the reference voltage Vref with each other; a comparator 182 for comparing the converted voltage by the current detector circuit 161 and the reference voltage VL1 being a voltage lower than the reference voltage Vref with each other, a latch circuit 183 in which the output of the comparator 181 is supplied to the data (D) input terminal, and the clock signal CK is supplied to the clock input terminal; a latch circuit 184 in which the output of the comparator 182 is supplied to the data (D) input terminal, and the clock signal CK is supplied to the clock input terminal; and an OR circuit 185 in which the output (Q) of the latch circuit 183 and an inverting output (/Q) of the latch circuit 184 are supplied.

If a high-voltage fluctuation occurs, the converted voltage in the current detector circuit 161 may be greater or smaller than the reference voltage Vref.

If a high-voltage fluctuation occurs, when a value of the converted voltage in the current detector circuit 161 is greater than the reference voltage Vref, and further, exceeds a reference voltage VH1 supplied to the comparator 181 in the high-voltage fluctuation detector circuit 171, the output of this comparator 181 is set to "1" level. Then, the output state of the comparator 181 is latched by the latch circuit 183 at a timing at which the clock CK is supplied.

If a high-voltage fluctuation occurs, when the value of the converted voltage in the current detector circuit 161 is smaller than the reference voltage vref, and further, lower than the reference voltage VL1 supplied to the comparator 182 in the high-voltage fluctuation detector circuit 171, the output of this comparator is set to "0" level. Then, the output state of the comparator 182 is latched by the latch circuit 184 at a timing at which the clock signal CK is supplied.

Thus, if a high-voltage fluctuation occurs, either one of the output (Q) of the latch circuit 183 and the inverting output (/Q) of the latch circuit 184 is set to "1" level, a detection signal of this "1" level is supplied to the forcible selector circuit 172 shown in FIG. 29 via the OR circuit 185.

Figure 32:
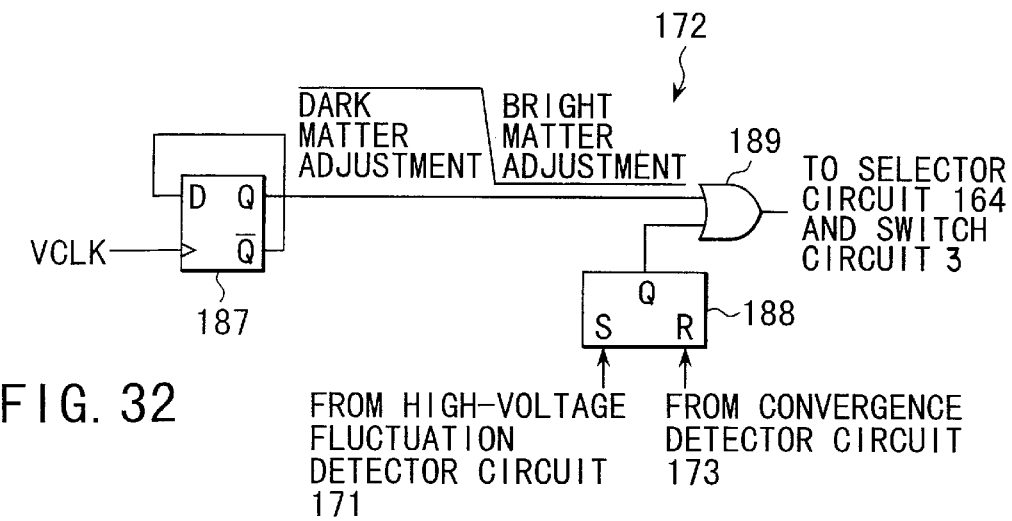
FIG. 32 is a view partially showing a detailed circuit structure of the circuit of FIG. 29.

FIG. 32 shows a specific example of a circuit structure of the forcible selector circuit 172 shown in FIG. 29. This forcible selector circuit 172 is composed of: a flip-flop circuit 187 in which the inverting output (/Q) is returned to the data (D) input terminal, and a clock signal VCLK is supplied to the clock input terminal; a flip-flop circuit 188 set by a detection output from the high-voltage detector circuit 171, and reset by a detection output from the convergence detector circuit 173, an OR circuit 189 to which outputs (Q) of these flip-flop circuits 187 and 188 are inputted.

The above clock signal VCLK is a clock signal synchronized with a vertical synchronizing signal, and is outputted once by each field.

In the forcible selector circuit 172 of FIG. 32, an output of the flip-flop circuit 187 results in a signal such that "1" and "0" levels are alternately repeated by each field. As shown in the figure, for example, the "1" level corresponds to a dark matter adjusting period, and the "0" level corresponds to a bright matter adjusting period, respectively. Therefore, when a high-voltage fluctuation is not detected, the output of this flip-flop circuit 187 is supplied to the selector circuit 164 shown in FIG. 29 via the OR circuit 189. In this manner, when black level adjusting data is outputted from the AKB processor circuit 163, the selector circuit 164 supplies the data to the memory circuit 95B. When white level adjusting data is outputted from the AKB processor circuit 163, the selector circuit 164 supplies the data to the memory circuit 96B.

On the other hand, when a high-voltage fluctuation is detected, and a "1" level detection signal is outputted, the flip-flop circuit 188 is set, and its output (Q) is set to "1" level. At this time, an output of the OR circuit 189 is set to "1" level irrespective of the output of the flip-flop circuit 187. In this manner, the selector circuit 164 supplies the black level adjusting data outputted from the AKB processor circuit 163 to the memory circuit 95B.

An output from the forcible selector circuit 172 is supplied to the switch circuit 3 as described previously. During detection of high-voltage fluctuation, the output from the forcible selector circuit 172 is supplied to the switch circuit 3, whereby the switch circuit 3 is controlled so as to select the reference signal 1 corresponding to the black level of the reference signals 1 and 2 every cycle of vertical synchronizing signal.

Figure 33:
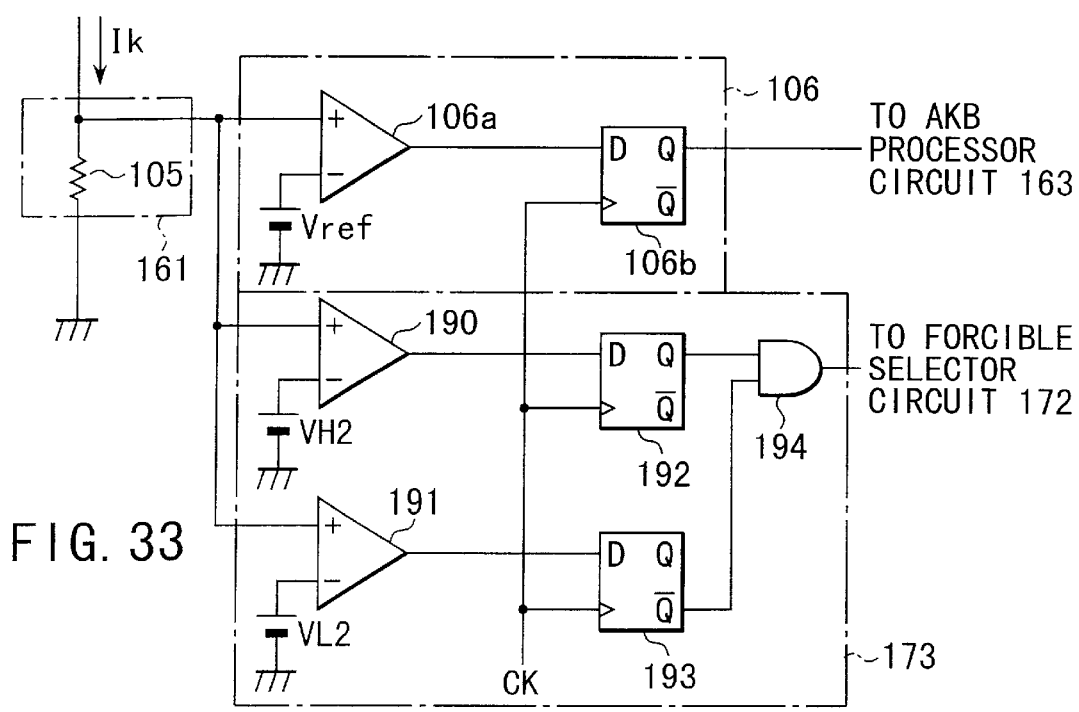
FIG. 33 is a view partially showing a detailed circuit structure of the circuit of FIG. 29.

FIG. 33 shows a specific example of a circuit structure of the current detector circuit 161, the comparator circuit 106, and the convergence detector circuit 173, respectively, shown in FIG. 29.

The current detector circuit 161 and the comparator circuit 106 will not be described here because they have been already described in FIG. 31.

The convergence detector circuit 173 is composed of a comparator 190 for comparing the converted voltage outputted from the current converter circuit 161 and a reference voltage VH2 higher than a reference voltage Vref and lower than a reference voltage VH1 with each other, a comparator 191 for comparing the converted voltage outputted from the current converting circuit 161 and the reference voltage VL2 lower than the reference voltage Vref and higher than the reference voltage VL1 with each other, a latch circuit 192 to which an output of the comparator 190 is supplied to the data (D) input terminal, and a clock signal CK is supplied to the clock input terminal, a latch circuit 193 in which an output of the comparator 191 is supplied to the data (D) input terminal, and the clock signal CK is supplied to the clock input terminal, and an AND circuit 194 to which an inverting output (/Q) of the latch circuit 192 and an output (Q) of the latch circuit 193 are supplied.

Figure 34:
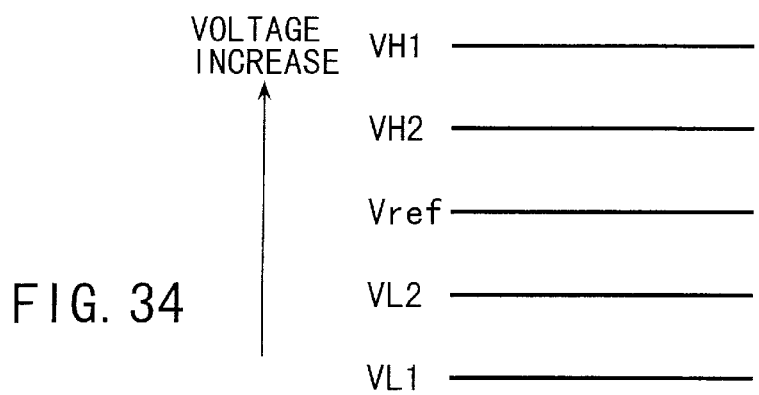
FIG. 34 is a view integrally showing a relationship between reference voltages to be used in the circuits of FIG. 31 and FIG. 33.

A relationship between the circuit in FIG. 31 and each reference voltage used in the circuit in FIG. 33 is integrally shown in FIG. 34. A black level conversion range in which conversion is detected by the convergence detector circuit 173 is between the reference voltages VH2 and VL2 shown in FIG. 34.

In the convergence detector circuit 173, if a high-voltage fluctuation occurs, and a value of the converted voltage in the current detector circuit 161 is lower than the reference voltage VH2 after the value of the converted voltage in the current detector circuit 161 has been greater than the reference value Vref, the output of the comparator 190 is set to "0" level. Then, the output state of the comparator 190 is latched by the latch circuit 192 at a timing at which the clock signal CK is supplied. At this time, the output of the comparator 191 is set to "1" level, and then, the output state of the comparator 191 is latched by the latch circuit 193 at a timing the clock signal CK is supplied. Therefore, the outputs of the latch circuits 192 and 193 after the above latching result in "1" level, and the "1" level signal is supplied from an AND circuit 194 to a reset terminal of a flip-flop circuit 188 in a forcible selector circuit 172. In this manner, the flip-flop circuit 188 is reset, its output "Q" returns to "0", and then, the forcible selector circuit 172 returns to its normal state.

In addition, if a high-voltage fluctuation occurs, and the value of the converted voltage in the current detector circuit 161 exceeds the reference voltage VL2, after the value of the converted voltage in the current detector circuit 161 has been smaller than the reference voltage Vref, the output of the comparator 191 is set to "1" level. Then, the output state of the comparator 191 is latched by the latch circuit 193 at a timing at which the clock signal CK is supplied. At this time, the output of the comparator 190 is set to "0" level, and then, the output state of the comparator 191 is latched by the latch circuit 192.

Therefore, in this case, the outputs of the latch circuits 192 and 193 after the latching is set to "1" level, and the flip-flop circuit 188 in the forcible selector circuit 172 is reset as described previously.

In the meantime, black level fluctuation of a video signal due to high-voltage fluctuation generally shows a similar tendency on the R, B, and G axes. Therefore, in the care where the cathode currents fluctuate similarly during black level adjustment on these three axes, this can be regarded as an occurrence of a high-voltage fluctuation. The similar fluctuation is referred to when a fluctuation quantity and a change are oriented in a same direction. If an occurrence of a high-voltage fluctuation is regarded by checking a tendency of change on the three axes, data is changed drastically or less significantly according to the discreteness from a convergence point. If the discreteness from the convergence point is significant, data is drastically changed, thereby making it possible to cause migration to the convergence point within a short time.

Figure 35:
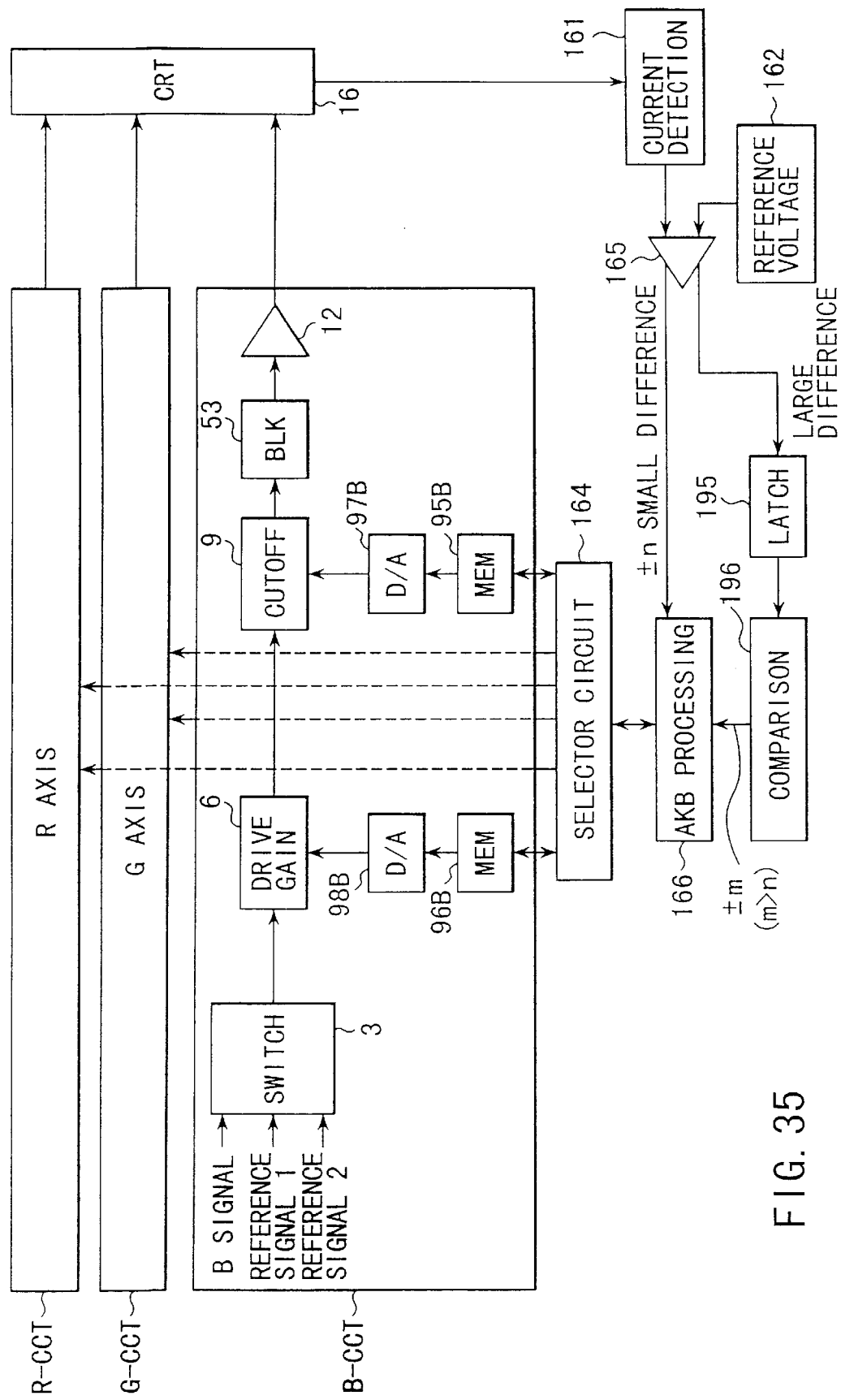
FIG. 35 is a block diagram showing an entire circuit structure of an AKB circuit according to a fifteenth embodiment of the present invention.

FIG. 35 is a block diagram showing an entire circuit structure of an AKB circuit according to a fifteenth embodiment of the present invention, for detecting high-voltage fluctuation based on the principle of operation and performing black level and white level adjustment.

In the circuit according to this embodiment, if a high-voltage fluctuation occurs, and a DC level of a video signal rapidly changes, adjustment is performed keeping track with a change in this DC level.

In the case of FIG. 35, there is specifically shown only the B-axis related circuit B-CCT associated with the B axis of the R, G, and B axes of three-primary color video signals. However, in the case of FIG. 35 also, the structures of the R-axis and G-axis related circuits R-CCT and G-CCT associated with the remaining R and G axes of the video signals of three-primary colors are similar to the shown B axis, and thus, a description of these two circuits is emitted. Further, elements corresponding to the circuit according to the thirteenth embodiment shown in FIG. 26 are designated by like reference numerals, and will be described.

In this embodiment, new digital data is produced in a relatively small variation quantity (±n) according to the comparison results of the comparator circuit 165. The produced new digital data is stored again in the memory circuits 95B and 96B via the selector circuit 164, and the data is updated.

On the other hand, in the case where a difference between the converted voltage from the current detector circuit 161 and a reference voltage is great, the information is latched on the R, G, and B axes each by a latch circuit 195. The values of differences for the R, G, and B axes each latched by the latch circuit 195 are compared with each other by a comparator circuit 196.

In the comparator circuit 196, it is judged as to whether or not tendency of fluctuation is identical among these three axes each, and the judgment results are supplied to the AKB processor circuit 166. In the case where tendency of fluctuation is judged to be identical, new digital data is produced in great fluctuation quantity (±m: m>n) in the AKB processor circuit 166, the produced new digital data is stored again in the memory circuits 95B and 96B via the selector circuit 164, and the data is updated.

On the other hand, in the case where tendency of fluctuation is different among the three axes, i.e., in the case where any one of the R, G, and B axes is a outstanding value, it is regarded as an influence due to noise or surge, and the judgment results are supplied from the comparator circuit 196 to the AKB processor circuit 166. In this case, in the AKB processor circuit 166, new digital data is produced in relatively small variation quantity (±n) or no data is updated.

Thus, when an initial state such as power supply is excluded, there is no need for drastically updating data other than high-voltage fluctuation, and thus, data is not updated in great variation quantity where tendency of fluctuation among the R, G, and B axes is different from each other. On the other hand, if the data of the memory circuits 95B and 96B is not defined during power supply or the like, at least the comparator circuit 196 must not operate. The circuit 196 should operate after convergence to a stable point has been obtained.

In this embodiment, the current detector circuit 161 is used in common on the three R, G, and B axes, and thus, there is provided a latch circuit 195 for latching a value of a difference between the converted voltage from the current detector circuit 161 on the R, G, and B axes each and the reference voltage Vref. However, when the current detector circuits are provided independently on the R, G, and B axes, thereby performing current detection independently on these three axes, this latch circuit 195 is not required.

Figure 36:
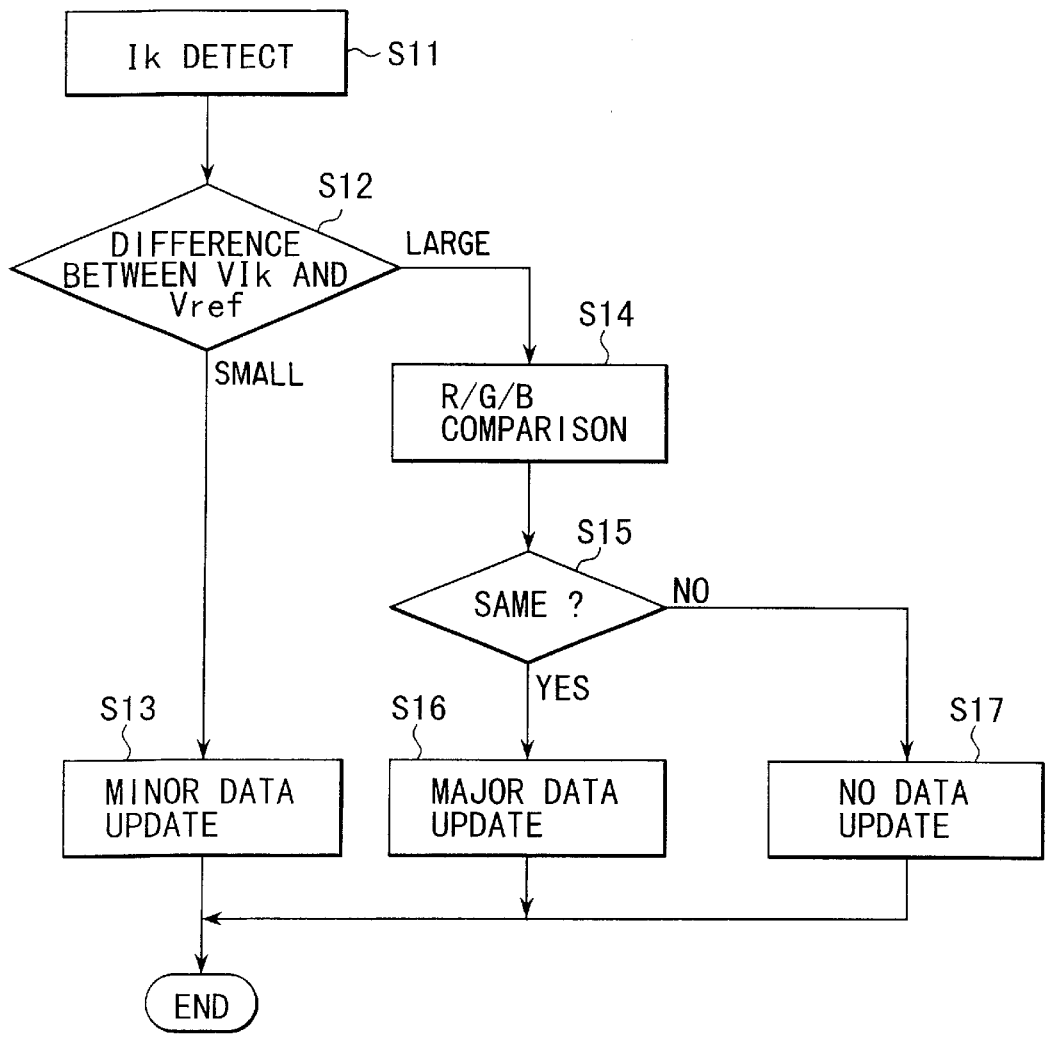
FIG. 36 is a flow chart showing a control example of the circuit according to the fifteenth embodiment.

FIG. 36 shows a control example of the apparatus according to the fifth embodiment by way of a flow chart. In step S11, a value of the cathode current Ik is detected during reference signal input, and then, in step S12 the converted voltage VIk and the reference voltage Vref are compared with each other. When the difference is small, data is updated in small variation quantity in step S13.

On the other hand, the difference is great as the result of the comparison in step S12, tendency of fluctuation is compared on the R, G, and B axes each in the next step S14.

When the tendency is judged to be identical in step P14, a high-voltage fluctuation is regarded as having occurred, and in the next step S16, data is updated in great variation quantity.

In addition, when the tendency is judged to be identical in step S14, an influence due to noise or surge is regarded instead of high-voltage fluctuation, and the data is not updated in the next step S17.

The circuit according to this embodiment is not always limited to a circuit structure as shown in FIG. 35 if it includes the function shown in each step as shown in FIG. 36.

Figure 37:
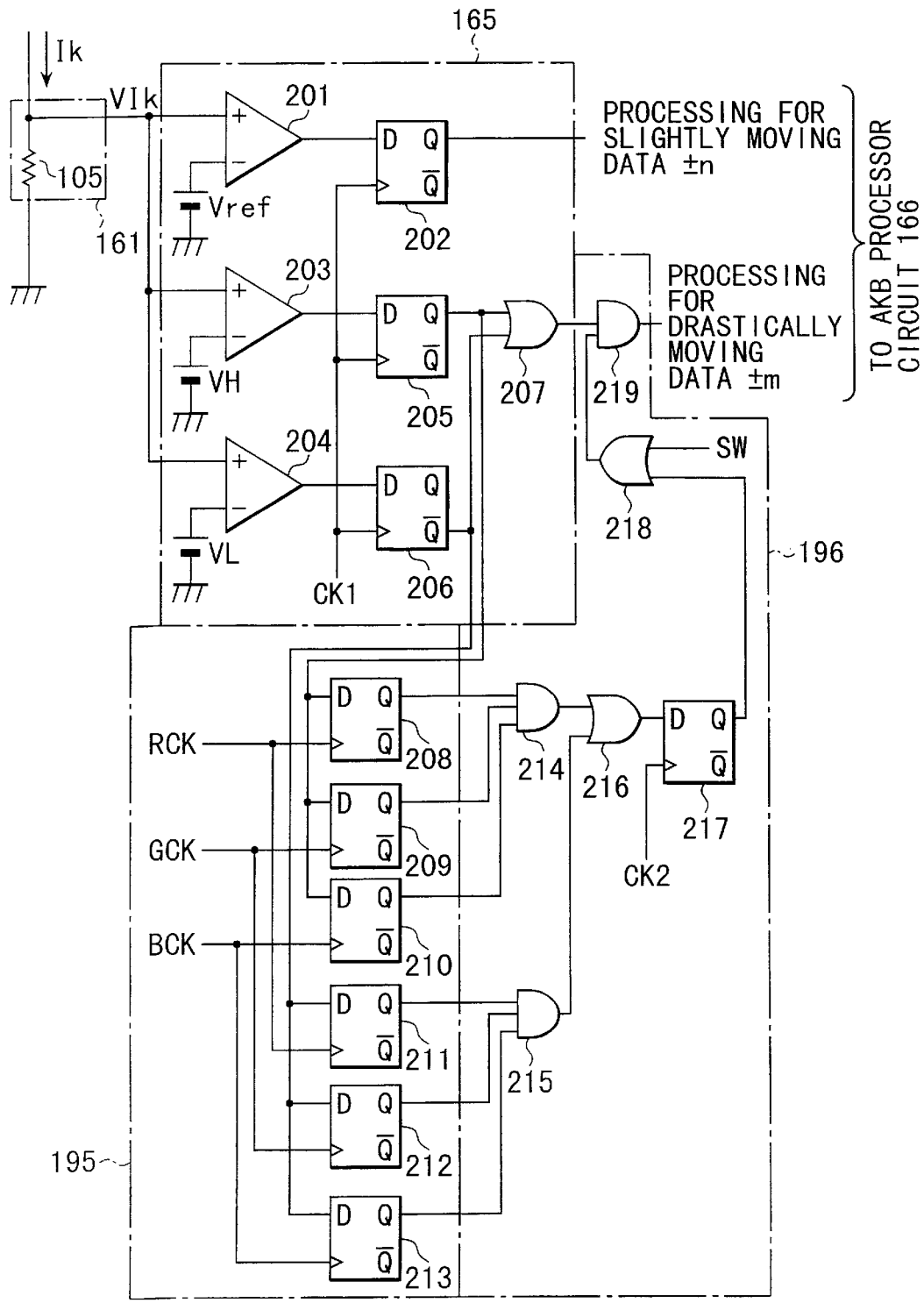
FIG. 37 is a view partially showing a detailed circuit structure of the circuit of FIG. 35.

FIG. 37 shows a specific example of a circuit structure of the current detector circuit 161, the comparator circuit 165, a latch circuit 195, and the comparator circuit 196 in the embodied circuit of FIG. 35.

The current detector circuit 161 is structured in a manner similar to that of FIG. 31, and thus a description of the circuit is omitted.

A comparator circuit 165 is composed of a comparator 201 for comparing the converted voltage Vk from the current detector circuit 161 and the reference voltage Vref, a latch circuit 202 in which an output of the comparator 201 is supplied to a data (D) input terminal, and a clock signal CK is supplied to a clock input terminal, a comparator 203 for comparing the converted voltage Vk with a reference voltage VH being a voltage higher than the reference voltage Vref, a comparator 204 for comparing the converted voltage Vk with a reference voltage VL being a voltage lower than the reference voltage Vref, a latch circuit 202 in which an output of the comparator 203 is supplied to the data (D) input terminal, and the clock signal CK is supplied to the clock input terminal, a latch circuit 206 in which an output of the comparator 204 is supplied to the data (D) input terminal, and the clock signal CK is supplied to the clock input terminal, and an OR circuit 207 in which an output (Q) of the latch circuit 205 and an inverting output (/Q) of the latch circuit 206 is supplied.

In the above comparator circuit 165, when a value of the converted voltage Vk is greater than the reference voltage Vref, the output of the comparator 201 is set to "0" level. The output of the comparator is latched by the latch circuit 202 in synchronism with the clock signal CK, and is supplied to the AKB processor circuit 166.

In addition, the value of the converted voltage Vk in the current detector circuit 161 is greater than the reference voltage VH due to an occurrence of a high-voltage fluctuation or generation of a noise or surge, an output of the comparator is set to "1" level. Then, an output state of the comparator 203 is latched by the latch circuit 205 in synchronism with the clock signal CK.

On the other hand, when the value of the converted voltage Vk in the current detector circuit 161 is smaller than the reference voltage due to an occurrence of a voltage fluctuation or generation of a noise or surge, an output of the comparator 204 is set to "0" level. Then, an output state of the comparator 204 is latched by the latch circuit 206 in synchronism with the clock signal CK.

Therefore, if the value of the converted Vk in the current detector circuit 161 is greater than the reference voltage VH or smaller than the reference voltage VL, either one of the output (Q) of the latch circuit 20 and the inverting output (/Q) of the latch circuit 206 is set to "1" level, and an output of the OR circuit 207 is set to "1" level.

The latch circuit 195 is composed of three latch circuits 208 to 210 in which output of the latch circuit 205 is inputted to the data (D) input terminals, respectively, and different clock signals RCK, GCK, and BCK are supplied to the data (D) input terminals, respectively, and three latch circuits 211 to 213 in which the clock signals RCK, GCK, and BCK are supplied to the clock input terminals, respectively.

These three latch circuits 208 to 210 latch the latch output of the latch circuit 205 on the R, G, and B axes each in synchronism with clock signals RCK, GCK, and BCK, respectively, three latch circuits 211 to 213 latches the latch output (/Q) of the latch circuit 206 in synchronism with the clock signals RCK, GCK, and BCK, respectively.

The comparator circuit 196 is composed of an AND circuit 214 in which outputs of three latch circuits 208 to 210 in the latch circuit 195 are inputted, an AND circuit 215 in which outputs (Q) of latch circuits 211 to 213 in the latch circuit 195 are inputted, an OR circuit 216 in which outputs of these AND circuits 214 and 215 are inputted, a latch circuit 217 in which an output of the OR circuit 216 is supplied to the data (D) input terminal, and the clock signal CK2 is supplied to the clock input terminal, an OR circuit 217 in which a signal SW is inputted to be set to "1" during an initial state such as output (Q) of this latch circuit 217 and power supply and "0" level in other cases, and an AND circuit 219 in which an output of this OR circuit 217 and an output of the OR circuit 207 in the comparator circuit 165 are inputted.

If a high-voltage fluctuation occurs, and all of the outputs (Q) of the three latch circuits 208 to 210 in the latch circuit 195 is set to "1" level, an output of the AND circuit 214 is set to "1" level, and an output of the OR circuit 216 to which the output is inputted is set to "1" level. After the clock signal CK2 has been supplied, an output of the OR circuit 216 is latched by the latch circuit 217, thereby an output of the latch circuit 217 is set to "1" level, and further, is inputted to the AND circuit 219 via the OR circuit 218. Therefore, at this time the AND circuit 219 opens, and an output of the OR circuit 207 ("1" level if a high-voltage fluctuation occurs) is supplied to the AKB processor circuit 166.

At this time, "1" level signals are inputted from the comparator circuits 165 and 196 to the AKB processor circuit 166. In the AKB processor circuit 166, when both of these inputs are set to "1" level, as described previously, new digital data is produced in large steps of variation quantity (±m: m>n).

In addition, if a high-voltage fluctuation occurs, and all of the outputs (Q) of the other three latch circuits 211 to 213 in the latch circuit 195, new digital data is also produced.

On the other hand, if a noise or surge is generated instead of an occurrence of a high-voltage fluctuation, tendency of the fluctuation of the converted voltage on the R, G, and B axes each differs. Therefore, after data has been latched using the clock signals RCK, GCK, and BCK, all the outputs of the latch circuits 208 to 210 and the latch circuits 211 to 213, respectively, in the latch circuit 195 do not result in "1" level. If a noise or surge occurs, the outputs of the AND circuits 214 and 215 each in the comparator circuit 196 is set to "0" level, and the output of the OR circuit 216 to which the output is inputted also is set to "0" level. Thereafter, when the clock signal CK2 is supplied, and an output of this OR circuit 216 is latched by the latch circuit 217, an output of this latch circuit 217 is set to "0" level. If an initial state such as power supply is not entered, the signal SW is set to "0" level. Thus, an output of the OR circuit 218 is set to "0" level, and the AND circuit 219 does not open. That is, the output of the AND circuit 219 is set to "0" level irrespective of the output of the OR circuit 207.

At this time, if the converted voltage Vk does not converge, "1" level and "0" level signals are inputted to the AKB processing circuit 166 from the comparator circuits 165 and 196, respectively. At this time in the AKB circuit 166, as described previously, data is produced in small steps of variation quantity (±n).

In addition, when an initial state such as power supply is entered, the signal SW is set to "1" level, and an output of the AND circuit 218 is set to "1" level. At this time, when an output of the latch circuit 205 or 216 is set to "1" level, an output of the AND circuit 219 is set to "1" level. Then, as described previously, in the AKB processor circuit 166, new digital data is produced in large steps of variation quantity (±m: m>n).

Thus, in the AKB circuit according to the fifteenth embodiment as shown in FIG. 35, only when a high-voltage fluctuation occurs, new digital data is produced in large steps of variation quantity (±m: m>n) in the AKB processor circuit 166, and is stored again in the memory circuit. Therefore, malfunction due to noises can be prevented. Even if a DC level rapidly changes due to an occurrence of a high-voltage fluctuation, adjustment can be performed keeping track with this change.

Now, an embodiment of an AKB circuit capable of converging discrete data used for adjusting a DC level at one point without fluctuating this DC level will be described.

Figure 38:
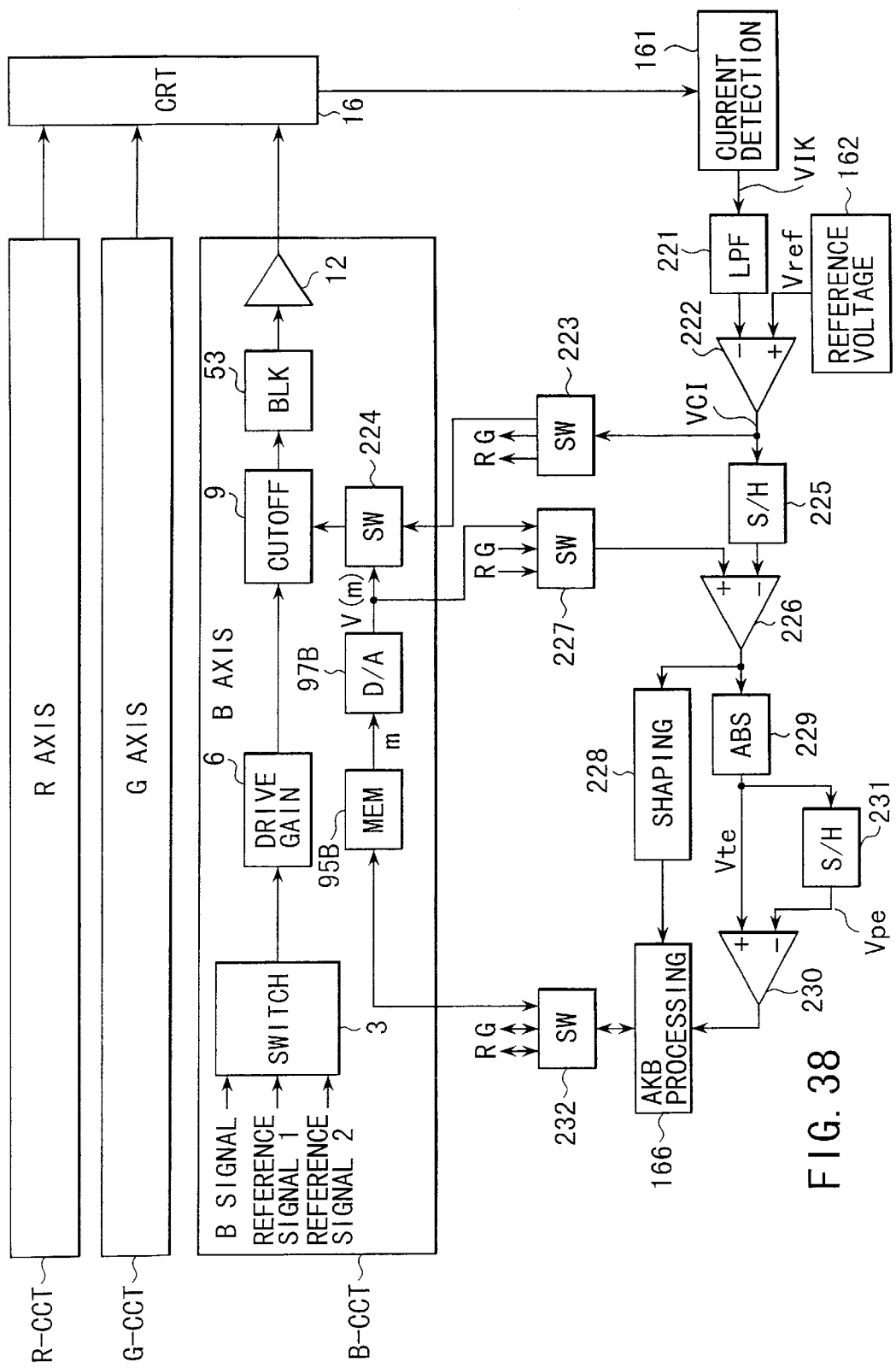
FIG. 38 is a block diagram showing an entire circuit structure of an AKB circuit according to a sixteenth embodiment of the present invention.

FIG. 38 is a block diagram showing an entire circuit structure of an AKB circuit according to a sixteenth embodiment of the present invention. In the case of FIG. 38 also, there is specifically shown only a B-axis related circuit B-CCT associated with the B axis of the R, G, and B axes of three-primary color video signals. However, the structures of the R-axis and G-axis related circuits R-CCT and G-CCT associated with the remaining R and G axes are similar to that of the shown B-axis circuit, and thus, a description of these two circuits is omitted.

In the CRT 16, a cathode current flows according to a voltage during a period when the reference signal 1 is applied to a cathode electrode. This cathode current is detected by the current detector circuit 161, and is converted into a voltage. This converted voltage is supplied to an inverting input terminal (−) of a differential amplifier 222 via a low pass filter circuit (LPF) 221 acting as a noise eliminator circuit.

The black level reference voltage Vref generated by the reference voltage circuit 162 is supplied to a non-inverting input terminal (+) of the above differential amplifier 222, and the above converted voltage and the reference voltage Vref are compared with each other by the differential amplifier 222.

The output voltage of the differential amplifier 222 is supplied to the cutoff adjusting circuit 9 via a switch circuit (SW) 223 provided in common on the R, G, and B axes each and a switch circuit (SW) 224 provided independently for the R, G, and B axes each, and then, is supplied to a sample hold circuit (S/H) 225 and is held therein. The held voltage of the sample hold circuit (S/H) 225 is supplied to an inverting input terminal (−) of a comparator circuit 226 as a subtractor circuit. The converted voltage by the D/A converter 97B is supplied to a non-inverting input terminal (+) of this comparator circuit 226 via a switch circuit (SW) 227 provided in common on the R, G, and B axes each, and a voltage of a difference between these voltages are generated by the comparator circuit 226. This voltage of difference is supplied to a shaping circuit 228, is converted into a "1" level or "0" level logic signal, and then, is supplied to the AKB processor circuit 166.

Further, the voltage of the difference generated by the comparator circuit 226 is supplied to an absolute value circuit (ABS) 229, and the absolute value is produced therein. An output of this absolute value circuit 229 is supplied to a non-inverting input terminal (+) of a comparator 230, and is supplied to a sample hold circuit (S/H) 231 and is held therein. Then, an output of this sample hold circuit 231 is supplied to an inverting input terminal (−) of the comparator 230, and further, an output of this comparator 230 is supplied to the AKB circuit 166. An output of the AKB processor circuit 166 is supplied to the memory circuit 95B via a switch circuit (SW) 232 provided in common on the R, G, and B axes each.

The above switch circuits 223, 227, and 232 are switch-controlled so that a signal or data is received between the corresponding circuits in the R-axis related circuit R-CCT when AKB processing is performed in the R-axis related circuit R-CCT associated with the R axis. In addition, when AKB processing is performed in the G-axis related G-CCT associated with the G axis, these switches 223, 227, and 232 are switch-controlled so that a signal or data is received between the corresponding circuits in the G-axis related circuit G-CCT. Further, when AKB processing is performed in the B-axis related B-CCT associated with the B axis, these switches 223, 227, and 232 are switch-controlled so that signal or data exchange is performed between the corresponding circuits in the B-axis related circuits B-CCT.

Now, an operation of the AKB circuit having the above structure will be described.

First, during a period when the reference signal 1 is selected in the switch circuit 3, an output voltage of the differential amplifier 222 is supplied to the cutoff adjusting circuit 9 via switch circuits 223 and 224. In addition, in a keyline period that is not an AKB period, a voltage from the D/A converter 97B is selected by the switch circuit 224, and is supplied to the cutoff adjusting circuit 9.

During an AKB period, there is formed a negative feedback loop consisting of the cutoff adjusting circuit 9, the driver circuit 12, the CRT 16, the current detector circuit 161, the low pass filter circuit 221, the differential amplifier 222, switch circuits 223 and 224, and the cutoff adjusting circuit 9. A value of the output voltage VCI of the differential amplifier 222 is controlled so that the detected voltage VIk in the current detector circuit 161 is substantially equal to the reference voltage Vref generated by the reference voltage circuit 162. At this time, the value of the output voltage VCI of the differential amplifier 222 corresponds to a convergence point in FIG. 28. Namely, a value of the control voltage outputted from the D/A converter 97B during a video period is an optimal value during adjustment at the closest point to this VCI. This voltage VCI is held by the sample hold circuit 225. Data 'm' stored in advance in the memory circuit 95B is read out so that a voltage value of the control signal outputted from the D/A converter 97B is set to this optimal value. The data is converted into an analog voltage by the D/A converter 97B. At this time, assuming that a voltage value is V(m), this value of voltage V(m) is presumed to be a value closer than a convergence point. In addition, in the previous keyline period of this AKB period, this voltage V(m) is used as a control signal for controlling the cutoff adjusting circuit 9.

Next, the above voltage V(m) is supplied to a comparator circuit 226 via the switch circuit 227, a difference between the voltage V(m) and a voltage VCI held in advance in the sample hold circuit 225 is produced by this comparator circuit 226, and further, an absolute value thereof is produced by the absolute value circuit 229, and this absolute value is held by the sample hold circuit 231. At this time, the held voltage of the sample hold circuit 231 is assumed to be Vpe.

In addition, a voltage of the difference compared and produced by the comparator circuit 226 is shaped into a logic signal by the shaping circuit 228, and is supplied to the AKB processor circuit 166. In this case, assuming that the voltage V(m) is a voltage lower than the voltage VCI, an output of the AKB processor circuit 166 is inputted to the memory circuit 95B via the switch circuit 232, and "1" is added to the previous storage data in this memory circuit 95B. In this manner, the storage data of the memory circuit 95B is updated to (m+1), and the updated data is read out again, and is converted into an analog voltage by the D/A converter 97B. At this time, a value of the converted voltage is assumed to be V(m+1).

Next, a difference between the above voltage V(m+1) and the voltage VCI held in advance by the sample hold circuit 225 is produced by the comparator circuit 226, and an absolute value thereof is produced by the absolute value circuit 229. At this time, assume that the absolute value is Vte. The above voltage Vte and the voltage Vpe held in advance by the sample hold circuit 231 are compared with each other, and the comparison results are supplied to the AKB processor circuit 166.

If Vte>Vpe, the original memory data "m" is closer to a convergence point than (m+1), and thus, the data of the memory circuit 95B is returned to the original "m" by the AKB processor circuit 166 based on the comparison output of the comparator circuit 226 at this time.

On the other hand, If Vte<Vpe, the memory data (m+1) is closer to a convergence point, the data of the memory circuit 95B is not updated by the AKB processor circuit 166 based on the comparison output of the comparator circuit 226 at this time.

AKB processing in 1 field has now been completed. During a keyline period up to the next AKB period, operation of the cutoff adjusting circuit 9 is controlled based on the data stored in the memory circuit 95B.

First, if the voltage V(m) is a voltage higher than the voltage VCI, the data of the memory circuit 95B is updated to (m−1), and similar operation is performed. Subsequently, the above operation is repeated by each AKB period, thereby the converted voltage by the D/A converter 97B finally converges to an optimal value.

Thus, according to the above embodiment, a voltage value of the control signal for controlling an operation of the cutoff adjusting circuit can be finally converged at one point, thereby making it possible to obtain the convergence at one point without fluctuating a DC level of a video signal.

In the foregoing description, memory circuit data is updated by each field, and comparison with the previous voltage is performed once after converting into an analog voltage. However, a time required for convergence can be reduced by increasing the data update counts in 1 field to the possible maximum.

In addition, in the foregoing description, a memory circuit data update quantity is set to "1" by each field. However, if the converted voltage by the D/A converter is significantly discrete from a convergence point, a time required to reach an optimal value can be reduced by increasing a data update unit to a value greater than "1". In this time, the discreteness from the convergence point can be monitored by the output voltage of the comparator circuit 226.

In the foregoing description, only a black level (dark matter) is adjusted, and a control circuit of a drive gain adjusting circuit for adjusting a white level (bright matter) is not shown. However, white level (bright matter) adjustment can be, of course, performed. In this case, the reference signal 2 for white level adjustment is selected by switch circuits 1, 2, and 3 each.

Figure 39:
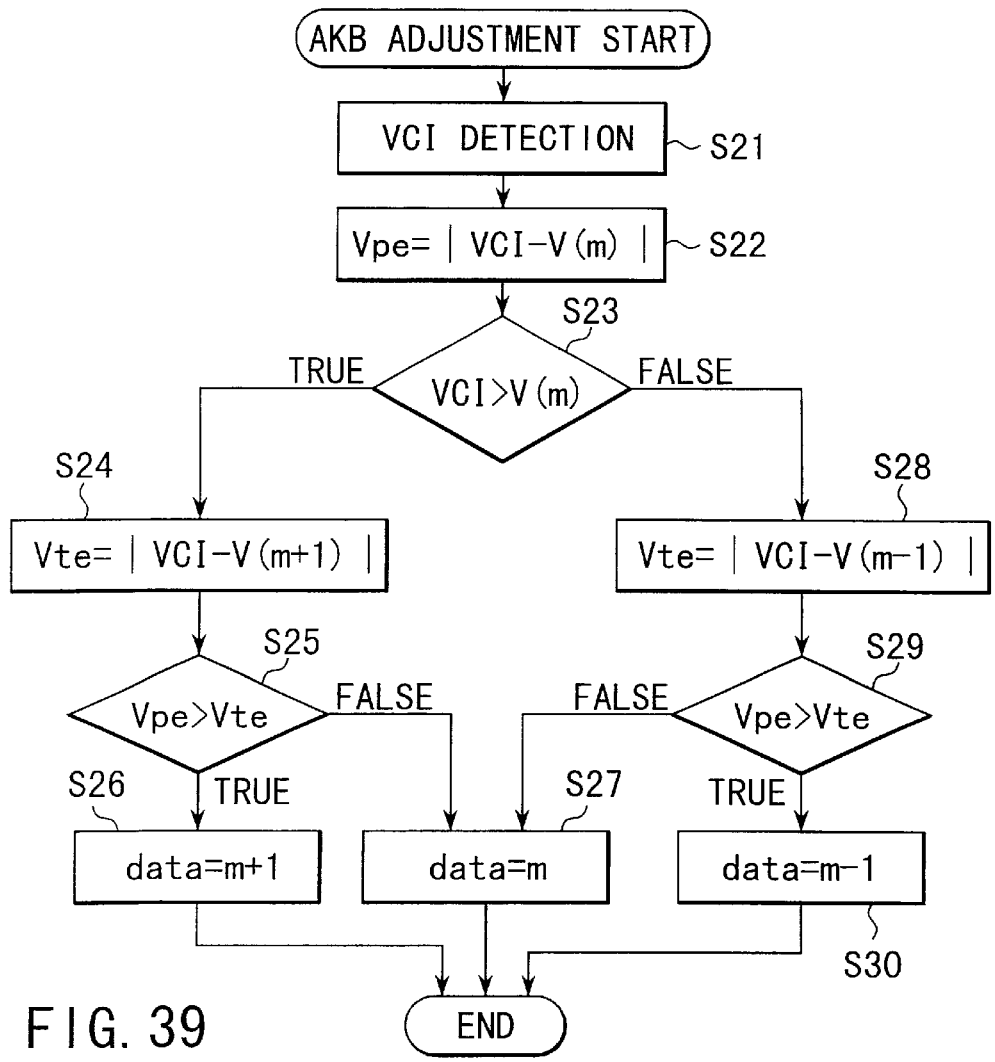
FIG. 39 is a flow chart showing a control example of the circuit according to the sixteenth embodiment.

FIG. 39 shows a control example of the circuit according to the sixteenth embodiment by way of a flow chart. In step S21, a voltage VCI that will be an optimal value during adjustment is detected. In the next step S22, an absolute value |VCI−V(m)| of a voltage indicative of a difference between the above voltage VCI and the voltage V(m) obtained by D/A converting the data "m" stored in advance in the memory circuit 95B is produced as the voltage Vpe. Next, in step S23, the voltages VCI and V(m) are compared with each other in terms of scale.

If VC1>V(m), the D/A converted voltage V(m) is required to be smaller than the convergence voltage VCI, and the D/A converted voltage is required to be increased. In the next step S24, an absolute value |VCI−V(m+1)| of a voltage indicative of a difference between the above voltage VCI and the voltage V(m+1) obtained by D/A converting data (m+1) having 1 added to data "m" stored in advance in the memory circuit 95B is produced as the voltage Vte. Next, in step S25, voltages Vte and Vpe are compared with each other in terms of scale.

When the voltage Vpe is greater than the voltage Vte, the data is maintained to "m+1" in step S26. In contrast, if the voltage Vpe is smaller than the voltage Vte, the data is returned to "m" in step S27.

On the other hand, when the result is not judged to be VC>V(m), the D/A converted voltage V(m) is required to be greater than the convergence voltage VCI, and the D/A converted voltage is required to be reduced. In the next step S28, an absolute value |VC−V(m+1)| of a voltage indicative of a difference between the above voltage VCI and the voltage V(m−1) obtained by D/A converting data (m−1) having −1 subtracted from the data "m" stored in advance in the memory circuit 95B is produced as the voltage Vte. Next, in step S29, the voltages Vte and Vpe are compared with each other in terms of scale.

When the voltage Vpe is greater than the voltage Vte, the data is maintained to "m−1" in the next step S30. In contrast, when the voltage Vpe is smaller than the voltage Vte, data is returned to "m" in step S27.

The circuit according to this embodiment is not always limited to a circuit structure as shown in FIG. 38 if it includes the function shown in each step as shown in FIG. 39. For example, a circuit using a program controlled CPU or the like may be employed.

Figure 40:
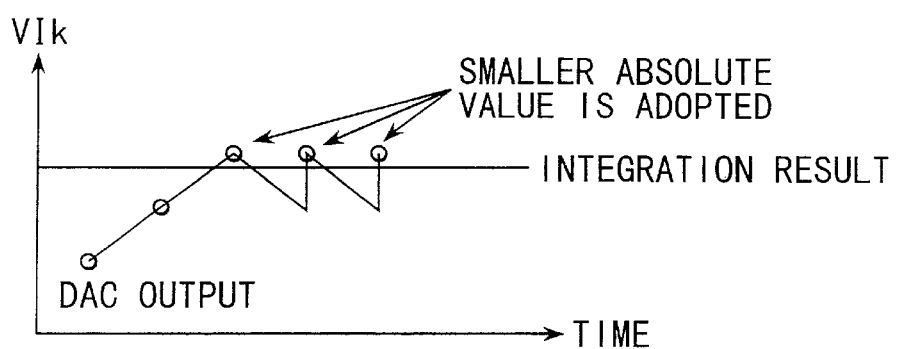
FIG. 40 is a view showing a state in which a conversion voltage of a D/A converter is finally converged at an optimal value in the sixteenth embodiment.

FIG. 40 shows a state when the converted voltage (control signal) of the D/A converted finally converges to an optimal value. In FIG. 40, of two values sandwiching a value displayed as an integration result, an output of the D/A converter corresponding to a value closer to the integration results (absolute value is small) is adopted as a control signal voltage.

Figure 41:
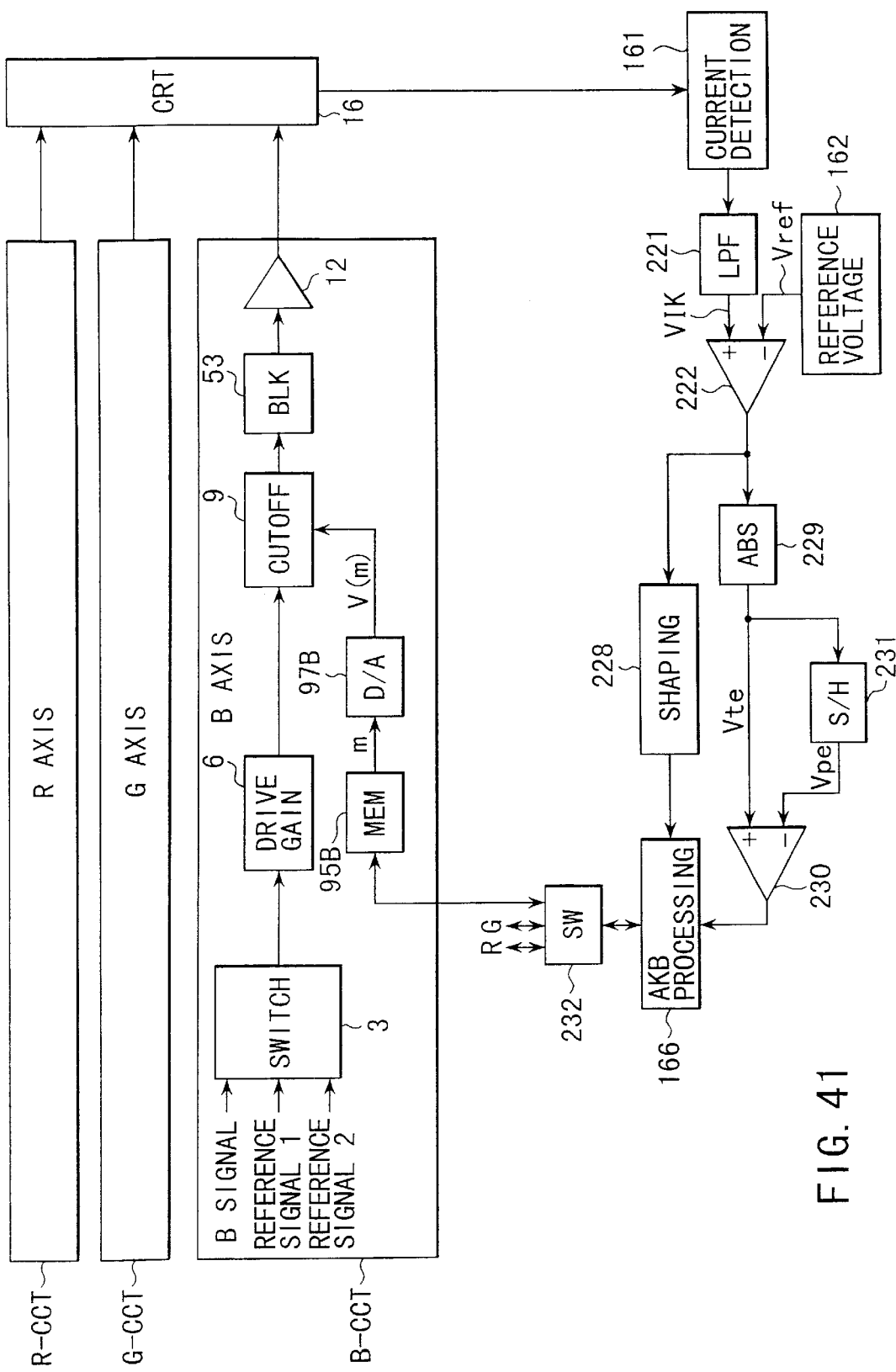
FIG. 41 is a view showing an entire circuit structure of an AKB circuit according to a seventeenth embodiment of the present invention.

FIG. 41 is a block diagram showing an entire circuit structure of an AKB circuit according to a seventeenth embodiment of the present invention, wherein even if discrete data is used to adjust a DC level, the data can be converged at one point without fluctuating this DC level.

In the case of FIG. 41 also, there is shown an extracted circuit portion associated with the B axis of a three-primary color video signal.

The circuit according to this embodiment is different from that of FIG. 38 according to the sixteenth embodiment in that the switch circuit (SW) 224 is eliminated for the R, G, and B axes each, and converted voltages by D/A converters 97R, 97G, and 97B are directly supplied to cutoff adjusting circuits 7, 8, and 9. Another difference is that the sample hold circuit 225, the comparator circuit 226, and the switch circuit (SW) 227 are eliminated, and outputs of the differential amplifier 222 is directly supplied to the amplifier circuit 228 and the absolute circuit 229, respectively.

In the circuit according to this embodiment, the current Ik flowing through the cathode electrode of the CRT 16 is detected by each field twice.

A description of operation will now be given below.

First, data "m" stored in advance in the memory circuit 95B is read out, and is converted into an analog voltage by the D/A converter 97B. Assuming that a voltage value at this time is V(m), the voltage V(m) is supplied to the cutoff adjusting circuit 9 as a control signal. The voltage VIk detected and converted voltage by the current detector circuit 161 is compared with the reference voltage Vref by the differential amplifier 222, and further, this absolute value is held by the sample hold circuit 231. The held voltage of the sample circuit 231 at this time is assumed to be Vpe.

In addition, a voltage of the compared and produced difference by the differential amplifier 222 is shaped into a logic signal by the shaping circuit 228, and is supplied to the AKB processor circuit 166. Then, the data of the memory circuit 95B is updated by the AKB processor circuit 166 according to the logic signal from this shaping circuit 228. For example, a logic signal outputted from the shaping circuit 228 is a signal corresponding to VIk>Vref, in the memory circuit 95B, the signal is updated to data (m−1) having "1" subtracted from the previous storage data. In contrast, when a logic signal outputted from the shaping circuit 228 is a signal corresponding to VIk<Vref, in the memory circuit 95B, the signal is updated to data having "1" added to the previous storage data.

Next, the converted control voltage by the D/A converter 97B is supplied to the cutoff adjusting circuit 9 according to the updated storage data of the memory circuit 95B, the second conversion voltage VIk detected and converted by the current detector circuit 161 is compared with the reference voltage Vref by the differential amplifier 222, and further, an absolute value is produced by the absolute value circuit 229. The second produced absolute value Vte is supplied to the comparator 230.

Then, the voltage Vte and the voltage Vpe held in advance by the sample hold circuit 231 are compared with each other, and the comparison results are supplied to the AKB processor circuit 166.

If Vte>Vpe, the original memory data is closer to a convergence point than (m+1) or (m−1). Thus, the data of the memory circuit 95B is returned to an original "m" in the AKB processor circuit 166 based on an output of the comparator 230 at this time.

On the other hand, If Vte <Vpe, memory data (m+1) or (m−1) is closer to a convergence point, the data of the memory 95B is not updated by the AKB processor circuit 166 based on the output of the comparator 230 at this time.

In this manner, AKB processing in 1 field is completed. During a video period up to the next AKB period, an operation of the cutoff adjusting circuit 9 is controlled based on the data stored in the memory circuit 95B.

Subsequently, the above operation is repeated by each AKB period, thereby the converted voltage by the D/A converter 97B finally converges to an optimal value.

Thus, in the case of the above embodiment also, a voltage value of a control signal for controlling an operation of the cutoff adjusting circuit can be finally converged at one point, thereby making it possible to obtain the convergence at one point without fluctuating a video signal DC level.

In the case of this embodiment, a memory circuit data update quantity is set to "1" by each field. If the converted voltage by the D/A converter is significantly discrete from a convergence point, a time required to reach an optimal value can be reduced more significantly by increasing a data update unit to a value greater than "1". In this case, the discreteness from the convergence point can be monitored by an output voltage of the differential amplifier 222, for example.

In addition, in the foregoing description, only a black level (dark matter) is adjusted, and a control circuit of the drive gain adjusting circuit for white level (bright matter) adjustment is not shown. White level (bright matter) adjustment can be, of course, perform similarly, and in this case, the reference signal 2 for white level adjustment is selected by means of the switch circuits 1, 2, and 3 each.

Figure 42:
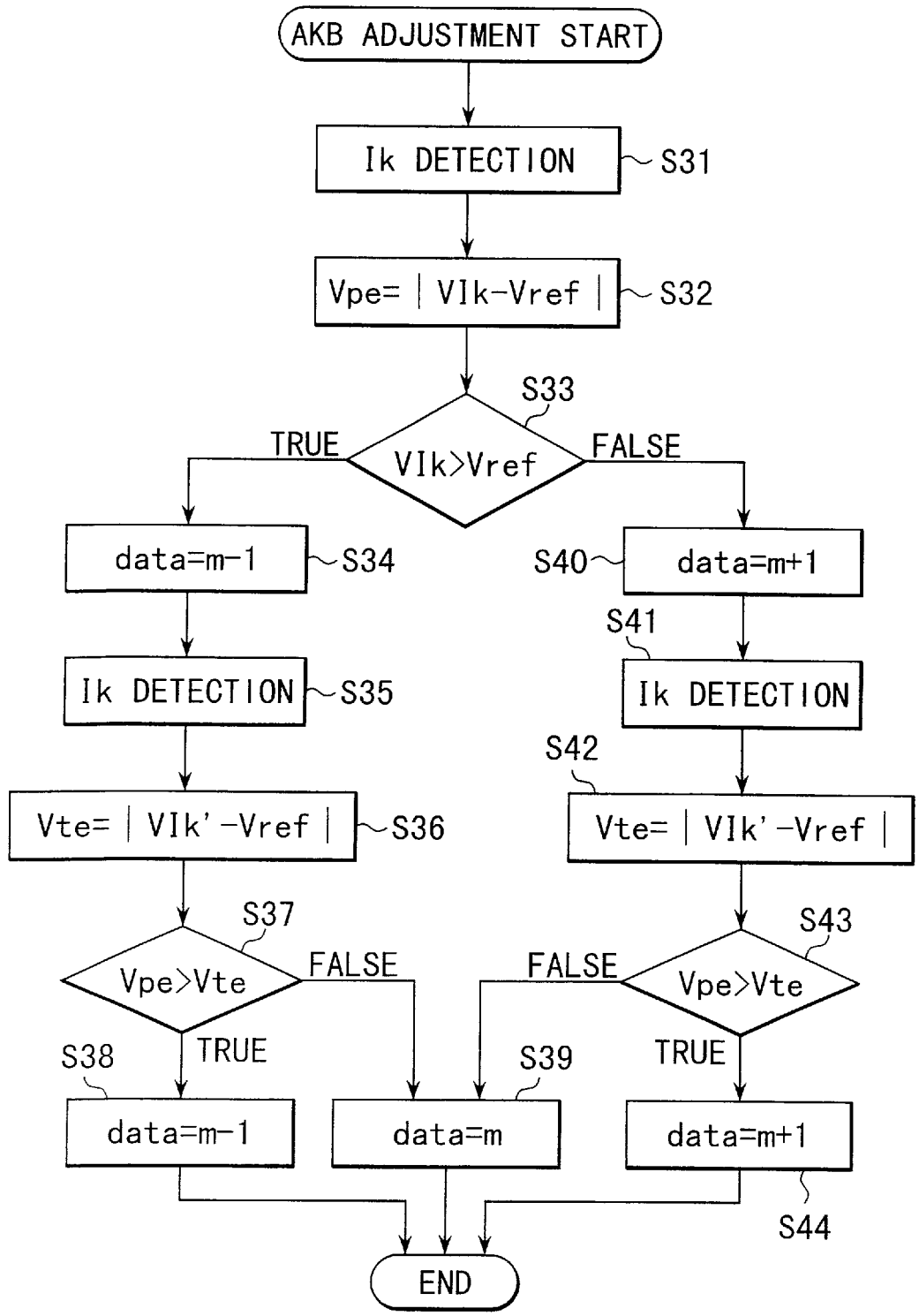
FIG. 42 is a flow chart showing a control example of the circuit according to the seventeenth embodiment.

FIG. 42 shows a control example of the circuit according to the seventeenth embodiment by way of a flow chart. In step S31, a current Ik is detected. Next, in step S32, an absolute value |VIk−Vref| of a voltage indicative of a difference between the voltage VIk having the current Ik converted and the reference voltage Vref is generated as a voltage Vpe. Then, in step S33, the voltages VIk and Vref are compared with each other in terms of scale.

If VIk>Vref, the voltage VIk is required to be reduced, and in the next step 534, "1" is subtracted from the data "m" stored in advance in the memory circuit 95B, and the data is updated to (m−1). Then, in step S35, the current Ik is detected again. At this time, when the current Ik is assumed to be Ik', in the next step S36, an absolute value |VIk'−Vref| of a voltage indicative of a difference between the current Ik' converted voltage VIk' and the reference voltage Vref is generated as Vte. Then, in step S37, the voltages Vte and Vpe are compared with each other in terms of scale.

When the voltage Vpe is greater than the voltage Vte, the data is maintained to "m−1" in step S38. In contrast, when the voltage Vpe is smaller than Vte, the data is returned to "m" in step S39.

On the other hand, in step S33, If VIk<Vref, the voltage VIk is required to be increased. In the next step S40, "1" is added to the data "m" stored in advance in the memory circuit 95B, and the data is updated to (m+1). Then, in step S41, the current Ik is detected again. At this time, assuming that the current Ik is Ik', in the next step S42, an absolute value |VIk'−Vref| of a voltage indicative of a difference between the current Ik' converted voltage VIk' and the reference voltage Vref is produced as a voltage Vte. Then, in step S43, the voltages Vte and Vpe are compared with each other in terms of scale.

When the voltage Vte is greater than the voltage Vpe, the data is returned to "m" in the previous step S39. In contrast, when the voltage Vte is smaller than the voltage Vpe, the data is maintained to (m+1) in step S44.

The circuit according to this embodiment is not always limited to a circuit structure as shown in FIG. 42 if it includes the function as shown in each step. For example, a circuit using a program controlled CPU or the like may be employed.

Figure 43:
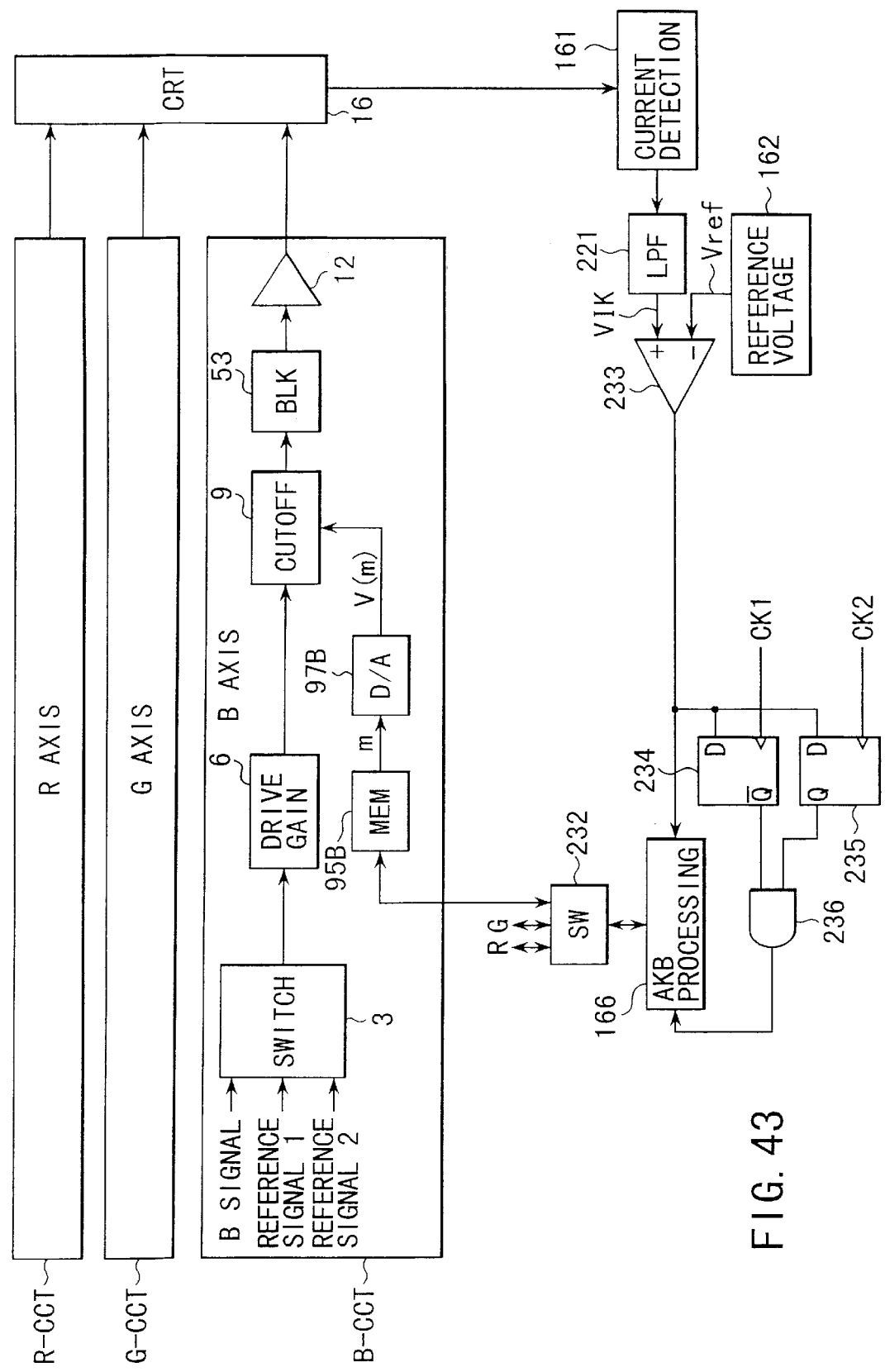
FIG. 43 is a block diagram showing an entire circuit structure of an AKB circuit according to an eighteenth embodiment of the present invention.

FIG. 43 is a block diagram showing an entire circuit structure of an AKB circuit according to an eighteenth embodiment of the present invention, wherein even if discrete data is used to adjust a DC level, the data can be converged at one point without fluctuating this DC level.

The circuit according to this embodiment simplifies a circuit structure more significantly than the circuit of FIG. 41 according to the seventeenth embodiment. In the above circuit, unlike a case of the seventeenth embodiment, the data closer to a convergence point of the data on two points sandwiching a convergence point is not adopted. Instead, the data that is the closest to the convergence point, and that does not exceed the convergence point is adopted.

Therefore, like elements corresponding to those shown in FIG. 41 are designated by same reference numerals, and a description of these elements is omitted. A description of only differences from those shown in FIG. 41 will be given here.

In the circuit according to this embodiment, a comparator 233 is employed instead of the differential amplifier 222. That is, this comparator circuit 233 compares the converted voltage VIk in the current detector circuit 161 with the reference voltage Vref, and outputs a logic signal.

In addition, the shaping circuit 288, the absolute value circuit 299, the sample hold circuit 231, and the comparator 230 are eliminated. Instead of these circuits, two latch circuits 234 and 235 and one AND circuit 236 are provided.

Output of the comparator 233 is supplied to the AKB processor circuit 166 and the data (D) input terminals of the two latch circuits 234 and 235. A clock signal CK1 is supplied to an clock terminal of the latch circuit 234, and a clock signal CK2 is supplied to a clock terminal of the latch circuit 235, respectively. An inverting output (/Q) of the latch circuit 234 and an output (Q) of the latch circuit 235 are supplied to the AND circuit 236.

Now, a description of operation will be given below.

First, the data "m" stored in advance in the memory circuit 95B is read out, and is converted into an analog signal by the D/A circuit 97B. At this time, assuming that the voltage value is V(m), the voltage V(m) is supplied to the cutoff adjusting circuit 9 as a control voltage. The voltage VIk detected and converted by the current detector circuit 161 is compared with the reference voltage Vref by the comparator 233. Then, an output of this comparator 233 is latched by the latch circuit 234 in synchronism with the clock signal CK1.

In addition, the output of the comparator 233 is supplied to the AKB processor circuit 166. The data of the memory circuit 95B is updated by the AKB processor circuit 166 according to the output of this comparator 233. For example, when the output of the comparator 233 is a signal ("1" level) corresponding to VIk<Vref, the data in the memory circuit 95B is updated to data (m−1) having "1" subtracted from the previous storage data. In contrast, when the output of the comparator 233 is a signal ("0" level) corresponding to VIk<Vref, the data in the memory circuit 95B is updated to data (m+1) having "1" added to the previous storage data.

Next, a control voltage controlled by the D/A converter 97B is supplied to the cutoff adjusting circuit 9 according to the updated storage data of the memory circuit 95B, and the second conversion voltage VIk detected and converted by the current detector circuit 161 is compared with the reference voltage Vref. At this time, the output of the comparator 233 is latched by the latch circuit 235 in synchronism with the clock signal CK2.

After the output of the comparator 233 has been latched by these two latch circuits 234 and 235, an output of the AND circuit 236 is supplied to the AKB processor circuit 166.

When the output of the comparator 233 during first Ik detection is a signal ("1" level) corresponding to VIk>Vref, and the output of the comparator 233 during second Ik detection is a signal ("1" level) corresponding to VIk>Vref, the inverting output (/Q) of the latch circuit 234 and the output (Q) of the latch circuit 235 are set to "0" level and "1" level, respectively after these signals have been latched. Therefore, the output of the AND circuit 236 after the second Ik detection is set to "0" level, and in the AKB processor circuit 166, the data of the memory circuit 95B is maintained to (m−1) as is.

When the output of the comparator 233 during first Ik detection is a signal ("1" level) corresponding to VIk>Vref, and the output of the comparator 233 during second Ik detection is a signal ("0" level) corresponding to VIk<Vref, the inverting output (/Q) of the latch circuit 234 and the output (Q) of the latch circuit 235 are set to "0" level, respectively after these signals have been latched. Therefore, the output of the AND circuit 236 after the second Ik detection is set to "0" level, and in the AKB processor circuit 166, the data of the memory circuit 95B is maintained to (m−1) as is.

In addition, when the output of the comparator 233 during first Ik detection is a signal ("0" level) corresponding to VIk<Vref, and the output of the comparator 233 during second Ik detection is a signal ("1" level) corresponding to VIk>Vref, the inverting output (/Q) of the latch circuit 234 and the output (Q) of the latch circuit 235 are set to "1" level, respectively after these signals have been latched. Therefore, the output of the AND circuit 236 after the second Ik detection is set to "1" level, and in the AKB processor circuit 166, the data of the memory circuit 95B is returned to the original "m".

On the other hand, when the output of the comparator 233 during first Ik detection is a signal ("0" level) corresponding to VIk<Vref, and the output of the comparator 233 during second Ik detection is a signal ("0" level) corresponding to VIk<Vref, the inverting output (/Q) of the latch circuit 234 and the output (Q) of the latch circuit 235 are set to "1" level and "0" level, respectively after these signals have been latched. Therefore, the output of the AND circuit 236 after the second Ik detection is set to "0" level, and in the AKB processor circuit 166, the data of the memory circuit 95B is maintained to (m+1) as is.

AKB processing in 1 field has now been completed. During a video period up to the next AKB period, an operation of the cutoff adjusting circuit 9 is controlled based on the data stored in the memory circuit 95B.

Subsequently, the converted voltage by the D/A converter 97B is finally converged at an optimal value by repeating the above operation by each AKB period. In this case, a convergence point is always a closer value of the two values sandwiching a value displayed as a result of integration in FIG. 40. Then, the output of the D/A converter 97B corresponding to this value is adopted as a control signal value.

Thus, in the circuit according to the above embodiment also, a voltage value of a control signal for controlling an operation of the cutoff adjusting circuit can be finally converged at one point, thereby making it possible to obtain the convergence at one point without fluctuating a DC level of a video signal.

In the case of this embodiment also, a memory circuit data update quantity is set to "1" by each field. If the converted voltage by the D/A converter is significantly discrete from a convergence point, a time required to reach an optimal value can be reduced more significantly by increasing a data update unit to a value greater than "1". In this case, the discreteness from the convergence point can be monitored by the output voltage of the comparator 233. In addition, in FIG. 40, although there has been described a case when an always low value is adopted of the two values sandwiching a value displayed as the result of integration, it is possible to change this value to a higher value of the two value sandwiching a value displayed as the result of integration.

In addition, in the foregoing description, only a black level (dark matter) is adjusted, and a control circuit of the drive gain adjusting circuit 6 for adjusting a white level (bright matter) is not shown. However, the white level (bright matter) can be, of course, performed similarly. The reference signal 2 selected by the switch circuits 1, 2, and 3 are employed to control the drive gain adjusting circuits 4, 5, and 6.

Figure 44:
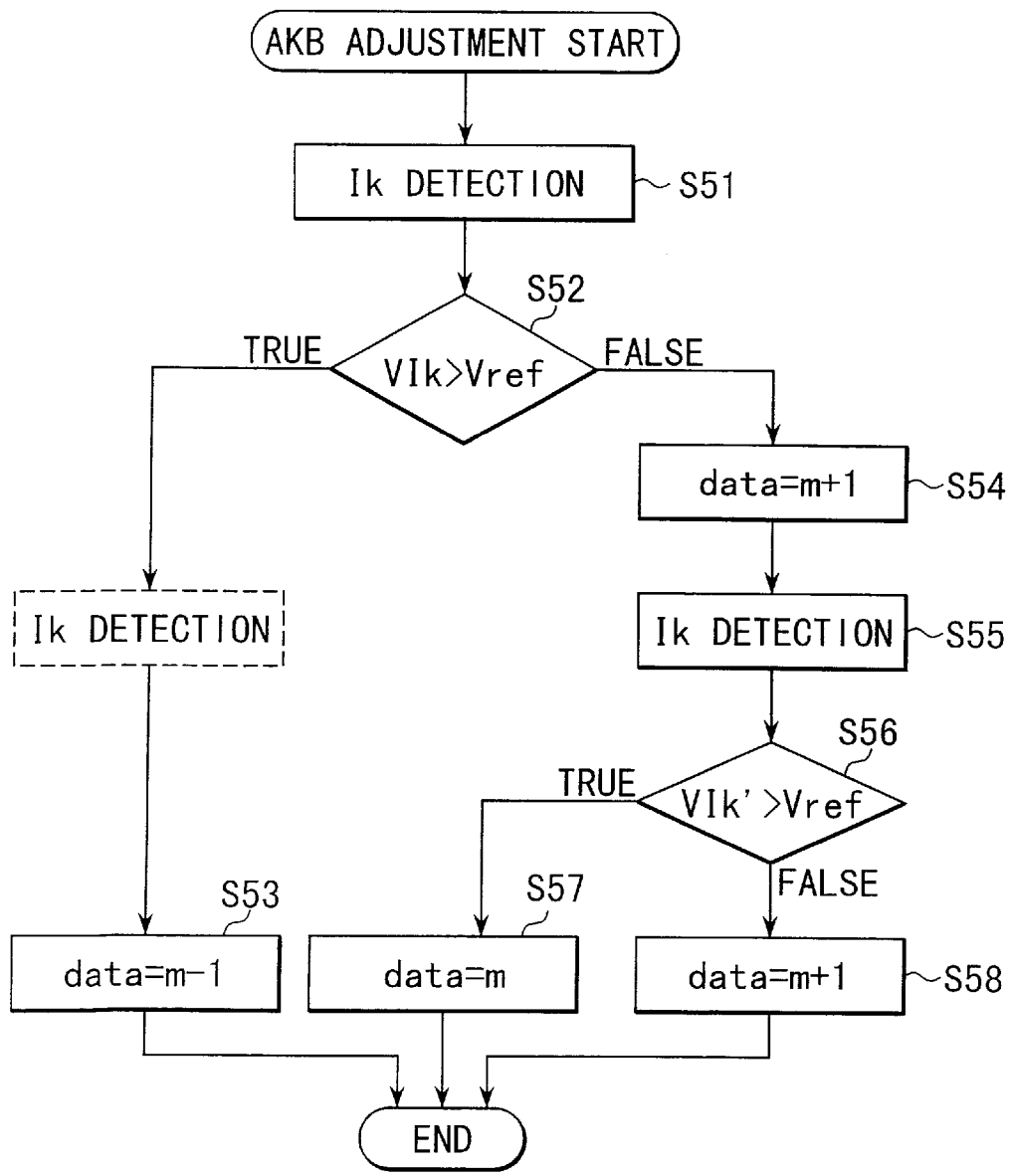
FIG. 44 is a flow chart showing a control example of the circuit according to the eighteenth embodiment.

FIG. 44 shows a control example of a circuit according to the eighteenth embodiment by way of a flow chart. In step S51, a current Ik is detected. Next, in step S52, the voltage VIk having the current Ik converted and the reference voltage Vref are compared with each other. At this time, If VIk>Vref, in the case of this control example in FIG. 44, data is updated to (m−1) in the next step S53.

On the other hand, when the judgment result of the next step S52 is VIk<Vref, the data is updated to (m+1) in the next step S54. Then, in step S55, the current Ik is detected again, and further, in the next step S56, the second converted voltage VIk (hereinafter, referred to as VIk') and the reference voltage Vref are compared with each other. At this time, If VIk'>Vref, the data is returned to the original "m" in the next step S57. On the other hand, If VIk'<Vref, the data is maintained to (m+1) in the next step S58.

The circuit according to this embodiment is not always limited to a circuit structure as shown in FIG. 43 if it includes the function as shown in FIG. 43.

Figure 45:
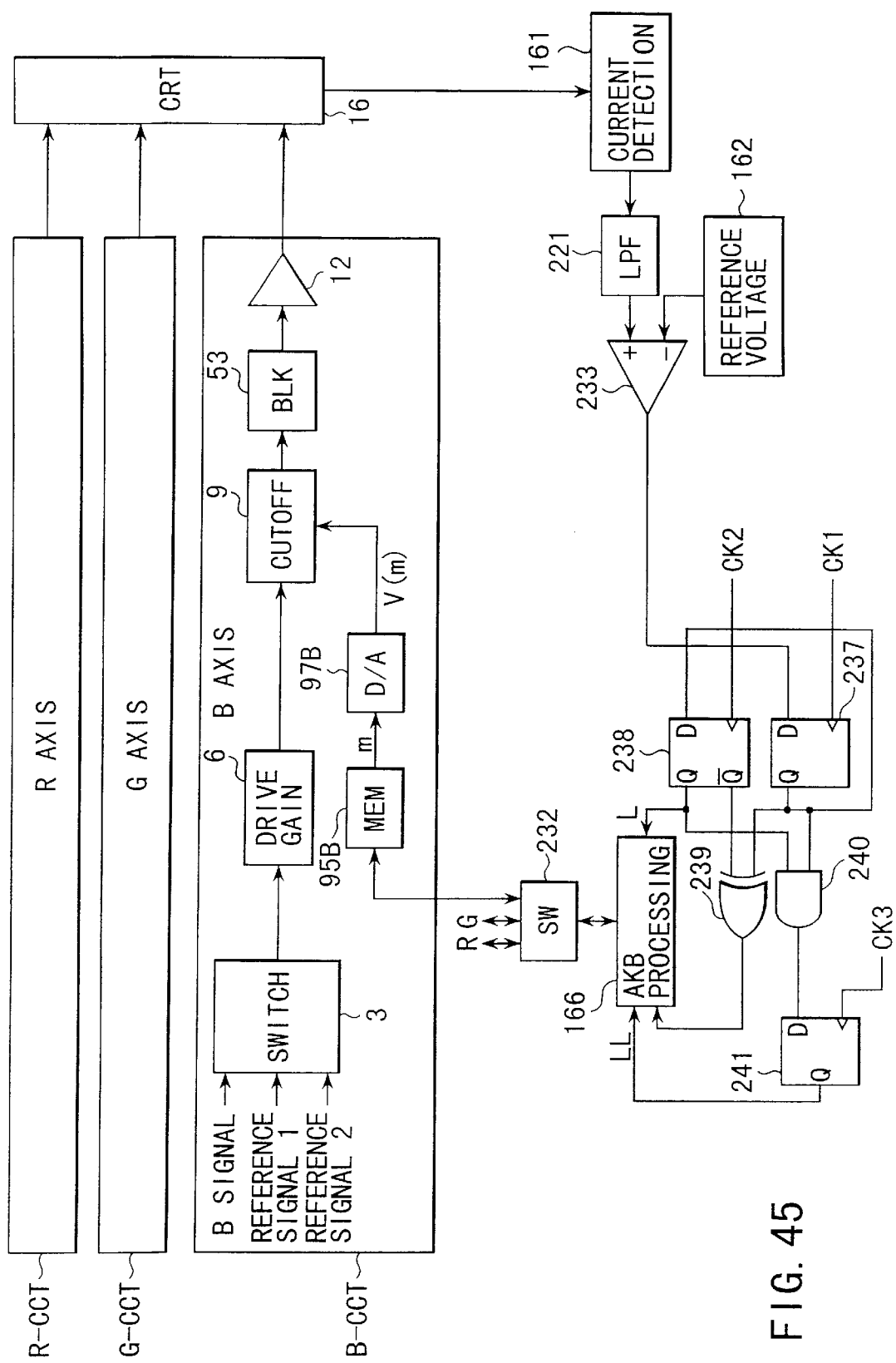
FIG. 45 is a block diagram showing an entire circuit structure of an AKB circuit according to a nineteenth embodiment of the present invention.

FIG. 45 is a block diagram showing an entire circuit structure of an AKB circuit according to a nineteenth embodiment of the present invention, wherein even if discrete data is used to adjust a DC level, the data can be converged at one point without fluctuating this DC level.

The circuit according to this embodiment is different from the circuit of FIG. 43 as follows:

In the circuit of FIG. 43, a cathode current (Ik) is detected twice by each field, whereas, in the nineteenth embodiment, such detection is performed only once so as to utilize the detection results in the previous field for AKB adjustment in the next field.

Like elements corresponding to those shown in FIG. 43 are designated by same reference numerals, and a description of these elements is omitted. A description of only differences from those shown in FIG. 43 will be given here.

In the circuit according to this embodiment, there are provided two latch circuits 237 and 238, an exclusive OR (EX-OR) circuit 239, an AND circuit 240, and a latch circuit 241 instead of these two latch circuits 234 and 235 and one AND circuit 236.

Further, unlike FIG. 43, an output of the comparator circuit 233 is not supplied to the AKB processor circuit 166, and is supplied only to a data (D) input terminal of the latch circuit 237. An output (Q) of the latch circuit 237 is supplied to the data (D) input terminal of the latch circuit 238. In addition, a clock signal CK1 is supplied to a clock terminal of the latch circuit 237, and a clock signal CK2 is supplied to a clock signal of the latch circuit 235, respectively.

An output (Q) of the latch circuit 238 is supplied to the AKB processor circuit 166 as a control signal L, and the output (Q) of the latch circuit 237 and the inverting output (/Q) of the latch circuit 238 are supplied to the exclusive OR circuit 239. The outputs of the latch circuits 237 and 238 are supplied to the AND circuit 240. The output of the exclusive OR circuit 239 is supplied to the AKB processor circuit 166, and the output of the AND circuit 240 is supplied to the data (D) input terminal of the latch circuit 241. A clock signal CK3 is supplied to a clock terminal of this latch circuit 241. An output (Q) of this latch circuit 241 is supplied to the AKB processor circuit 166 as a control signal LL.

Now, a description of operation will be given below.

First, the data "m" stored in advance in the memory circuit 95B is read out, and is converted into an analog voltage by the D/A converter 97B. At this time, assuming that a voltage value is V(m), this voltage V(m) is supplied to the cutoff adjusting signal 9 as a control signal. In addition, assume that the detection results of the cathode current in the previous field are latched by the latch circuit 238. A control signal L is supplied to the AKB processor circuit 166 according to latch data of the latch circuit 238. For example, when this control signal L is set to "1" level, the data of the memory circuit 95B is updated to (m−1) by the AKB processor circuit 166. In contrast, when the control signal L is set to "0" level, the data of the memory circuit 95B is updated to (m+1).

On the other hand, when the voltage V(m) is supplied to the cutoff circuit 9 as a control voltage, the current flowing through the cathode electrode of the CRT 16 is detected by the current detector circuit 161, and is converted into a voltage. At this time, the voltage VIk detected and converted by the current detector circuit 161 is compared with the reference voltage Vref by the comparator circuit 233. Then, the output of the voltage comparator 233 is latched by the latch circuit 237 in synchronism with the clock signal CK1. The Ik detection results in the previous field have already been latched by the latch circuit 238. These latch data of these latch circuits 237 and 238 are supplied to the exclusive OR circuit 239, and it is detected by this exclusive OR circuit 239 as to whether or not these data matches each other. For example, when either one of the outputs of these latch circuits 237 and 238 is set to "1" level, and the other is set to "0" level, an unmatched state is detected, and the output of the exclusive OR circuit 239 is set to "1" level. In this case, as is the case with the eighteenth embodiment, the first updated data (m−1) or (m+1) is returned to the original data "m". On the other hand, when outputs of these latch circuits 237 and 238 are set to "1" level or at "0" level, a matched state is detected, and the output of the exclusive OR circuit 239 is set to "0" level. In this case also, as is the case with the eighteenth embodiment, the first updated data is maintained to (m−1) or (m+1).

Figure 46:
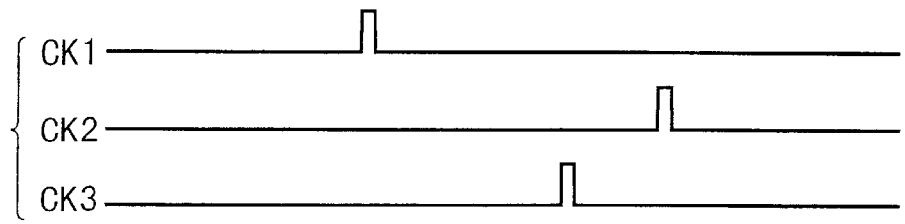
FIG. 46 is a timing chart of clock signals used in the embodied circuit of FIG. 45.

On the other hand, the outputs (Q) of these latch circuits 237 and 238 are inputted to the AND circuit 240. Thus, the output of the AND circuit 240 is set to "1" level only when the outputs (Q) of these latch circuits 237 and 238 are set to "1" level. Thereafter, as shown in a timing chart of FIG. 46, these outputs are latched by the latch circuit 214 at a timing of the clock signal CK3, and are inputted to the AKB processor circuit 166 as a control signal LL.

Then, the output of the latch circuit 237 is latched by the latch circuit 238 at a timing of the clock signal CK2.

AKB processing in 1 field has now been completed. During a video period up to the next AKB period, an operation of the cutoff adjusting circuit 9 is controlled based on the data stored in the memory circuit 95B. Subsequently, the above operation is repeated by each AKB period, thereby the converted voltage of the D/A converter 97B is finally converged at an optimal value. Although a description of how the control signal LL is used in the AKB processor circuit 166 has not been given, this control signal LL is a signal indicating that the converted voltage of the current detector circuit 161 falls before and after continuous 2 fields.

Thus, in the above embodiment also, a voltage value of a control signal for controlling an operation of the cutoff adjusting circuit can be finally converged at one point, thereby making it possible to obtain convergence at one point without a DC level of a video signal.

In the case of this embodiment also, a memory circuit data update quantity is set to "1" by each field. However, if the converted voltage of the D/A converter is significantly discrete from a convergence point, the data update unit is set to a value greater than "1", thereby making it possible to reduce a time required to reach an optimal value more significantly. In this case, the discreteness from the convergence point can be monitored by the output voltage of the voltage comparator 233, for example.

In addition, in the foregoing description, only a black level (dark matter) is adjusted, and a control circuit for a drive gain adjusting circuit for adjusting a white level (bright matter) is not shown. However, white level (bright matter) adjustment can be, of course, performed, and in this case, the reference signals 2 selected by the switch circuits 1, 2, and 3, respectively is used.

Figure 47:
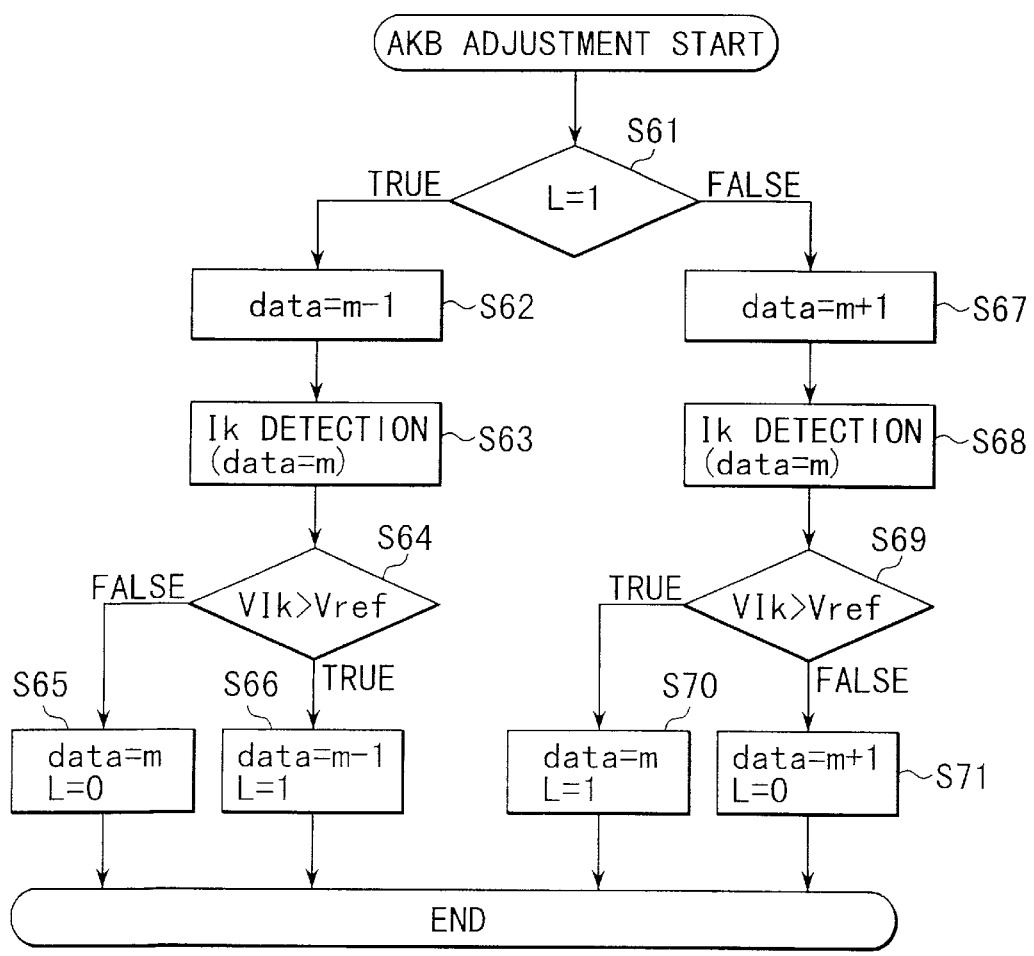
FIG. 47 is a flow chart showing a control example of the circuit according to the nineteenth embodiment.

FIG. 47 shows a control example of the circuit according to the nineteenth embodiment by way of a flow chart. That is, when this level is set to "1" level, data is updated to (m−1) in the next step S62. Then, a current Ik is detected in step S63. Next, in step S64, the voltage VIk have the above current converted and a reference voltage Vref are compared with each other. At this time, If VIk<Vref, the data is returned to "m" in the next step S65, and the control signal L is set to "0" level.

On the other hand, If VIk>Vref in the previous step S64, the data is fixed to (m−1), and the control signal L is set to "1" level in the next step S66.

In addition, the control signal L in the previous step S61 is judged to be at "0" level, the data is updated to (m+1) in the next step S67. On the other hand, a current Ik is detected in step S68. Next, in step S69, the voltage VIk have the above current converted and a reference voltage Vref are compared with each other. At this time, If VIk>Vref, the data is returned to "m", and the control signal L is set to "L" level in the next step S70.

On the other hand, If VIk<Vref in the previous step S69, the data is fixed to (m+1), and the control signal L is set to "0" level in the next step S71.

In the meantime, in the circuit having the control functions shown by a flow chart of FIG. 47, two stable points sandwiching a, convergence point can be adjusted.

Figure 48:
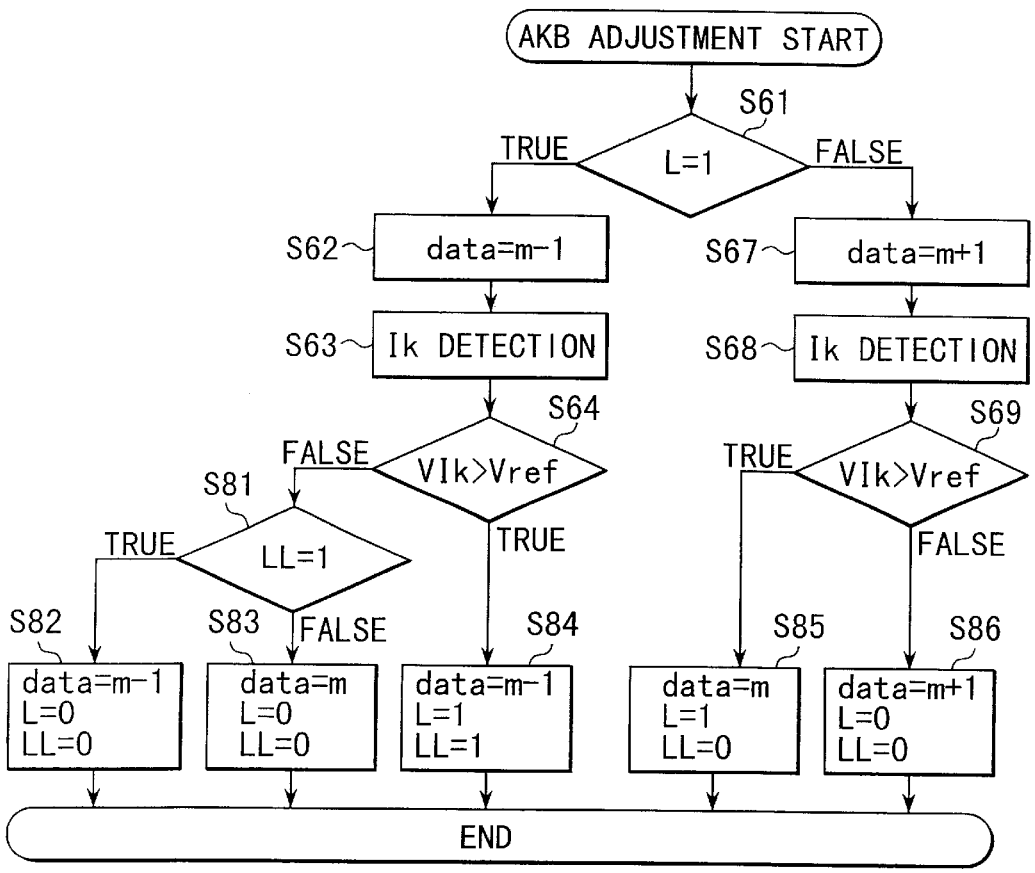
FIG. 48 is a flow chart showing another control example of the circuit according to the nineteenth embodiment.

Next, another control example of the circuit according to the nineteenth embodiment, in which a point that is the closet to a convergence point, and that does not exceed the convergence point can be defined as a stable point is shown by a flow chart of FIG. 48. In this case, the control signal LL to be outputted from the latch circuit 214 shown in FIG. 45 is used.

In this case, an operation from step S61 to S64 is the same as that shown in FIG. 47, and thus a description of operation is omitted here. As a result of comparison between the converted voltage VIk and the reference voltage Vref in step S64, If VIk<Vref, the level of the control signal LL is judged in the next step S81. At this time, when the signal LL is set to "1" level, the data is maintained to (m−1), and the control signals L and LL are set to "0" level, respectively in the next step S82. On the other hand, when the control signal is set to "0" level, the data is returned to the original "m", and the control signals L and LL are set to "0" level, respectively in the next step S83.

If VIk>Vref in the precious step S64, the data is maintained to (m−1), and the control signals L and LL are set to "1" level, respectively in the next step S84.

In addition, when the control signal L is judged to be at "0" level in the previous step S61, an operation from step S67 to S69 is similar to that shown in FIG. 47, and thus, a description of operation is omitted. When the comparison result between the converted voltage VIk and the reference voltage Vref in step S69 is VIk>Vref, the data is returned to "m", and the control signals L and LL are set to "0" level, respectively in the next step S85. On the other hand, If VIk<vref, the data is maintained to (m+1), and the control signals L and LL are set to "0" level, respectively in the next step S86.

The circuit according to this embodiment is not always limited to a circuit structure as shown in FIG. 45 if it includes the functions shown in each step as shown in FIG. 47 or 48. For example, a circuit using a program controlled CPU may be employed.

Figure 49:
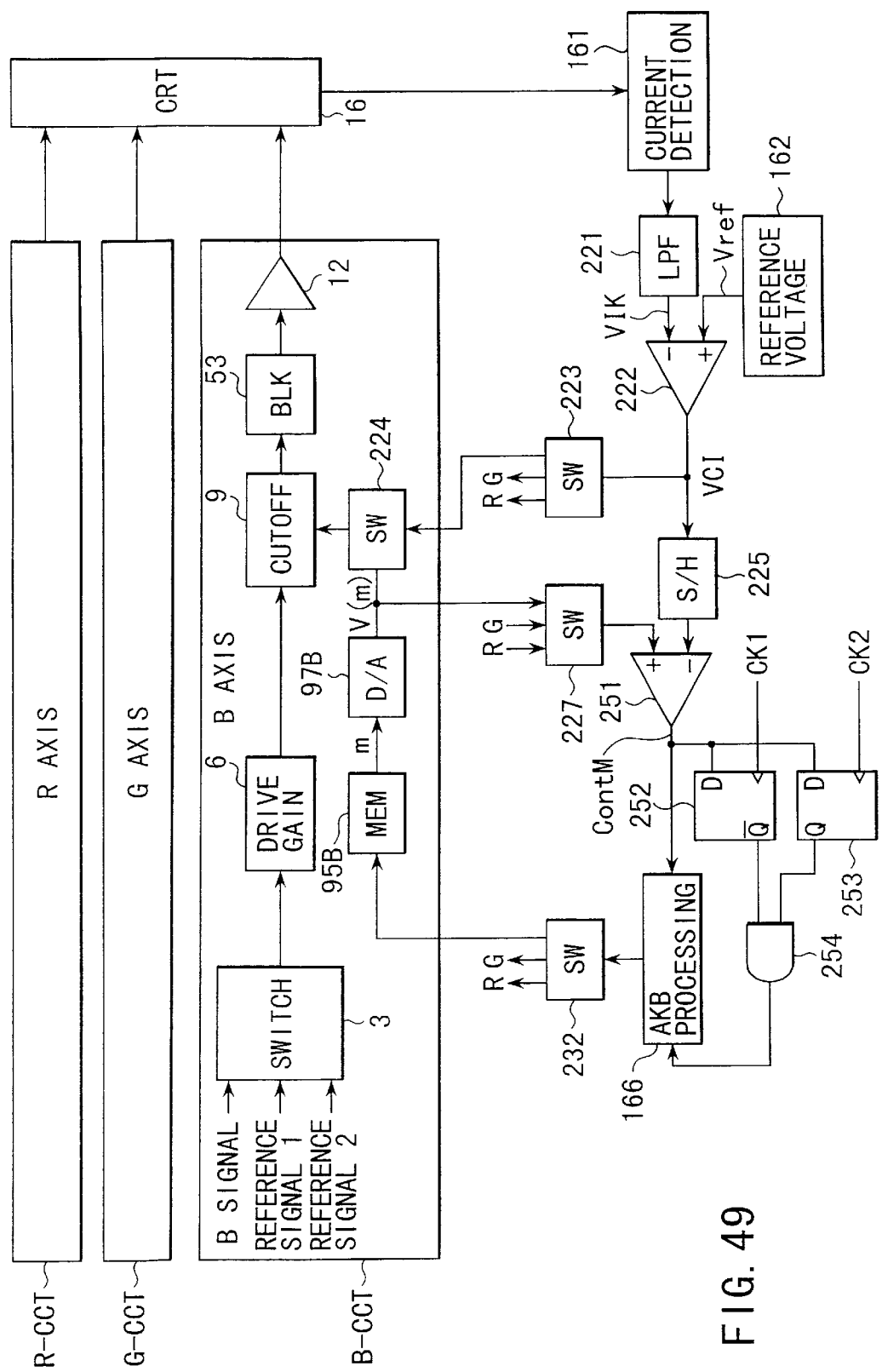
FIG. 49 is a block diagram showing an entire circuit structure of an AKB circuit according to a twentieth embodiment of the present invention.

FIG. 49 is a block diagram showing an entire circuit structure of an AKB circuit according to a twentieth embodiment of the present invention. The circuit according to this embodiment has a more simplified circuit structure than that of FIG. 38 according to the sixteenth embodiment. Therefore, like elements corresponding to those shown in FIG. 38 are designated by same reference numerals, and a description of these elements is omitted only differences from those shown in FIG. 38 will be described here.

In addition, in the circuit according to this embodiment, the closer data of the data of two points sandwiching a convergence point is not adopted. Instead, the data that is the closest to the convergence point and that does not exceed the convergence point is adopted.

In the circuit according to this embodiment, the comparator circuit 226, the shaping circuit 228, the absolute value circuit 229, the sample hold circuit 231, and the comparator 230 shown in FIG. 38 is omitted, and a comparator 251, two latch circuits 252 and 253, and an AND circuit 254 are newly provided.

The above comparator 251 is provided instead of the comparator 226, the converted voltage from the D/A converter 97B is supplied to a non-inverting input terminal (+) of the comparator 251 via the switch circuit 227, and the held voltage by the sample hold circuit 225 is supplied to an inverting input terminal (−) of the comparator 251. An output ContM of this comparator 251 is supplied to the AKB processor circuit 166, and is supplied to data (D) input terminal of the two latch circuits 252 and 253 each. An inverting output (/Q) of the latch circuit 252 and an output (Q) of the latch circuit 253 are supplied to the AND circuit 254 together. An output of this AND circuit 254 is supplied to the AKB processor circuit 166.

Now, an operation of the circuit having the above structure will be described below.

An operation of a negative feedback loop consisting of the cutoff adjusting circuit 9 in the AKB period, the driver circuit 12, the CRT 16, the low pass filter circuit 221, the differential amplifier 222, and switch circuits 223 and 224 is similar to that shown in FIG. 38, this negative feedback loop operates, thereby a voltage VCI expressed by VIk=Vref is held by the sample hold circuit 225.

Next, the data "m" stored in advance in the memory circuit 95B is read out, and is converted into an analog voltage by the D/A converter 97B. At this time, assume that the voltage value is V(m). The converted voltage V(m) by this D/A converter 97B is inputted to the comparator 251 via the switch circuit 227. Then, the above voltage V(m) and the held voltage VCI in the sample hold circuit 225 are compared with each other by the comparator 251, the comparison results are supplied to the AKB processor circuit 166 as a control signal ContM, and the control signal is latched by the latch circuit 252 in synchronism with a clock signal CK1.

If V(m)<VCI, and the above control signal ContM is set to "0" level, "1" is added to the previous storage data in the memory circuit 95B by the AKB processor circuit 166. On the other hand, If V(m)>VCI, and the above control signal ContM is set to "1" level, "1" is subtracted from the previous storage data in the memory circuit 95B by the AKB processor circuit 166.

In addition, the thus updated data is read out again from the memory circuit 95B, and is converted into an analog voltage by the D/A converter 97B. At this time, the value of the converted voltage is V(m+1) or V(m−1).

Next, the voltage V(m+1) or V(m−1) and the voltage VCI are compared with each other by the comparator 251, and the control signal ContM outputted according to the comparison results is latched by the latch circuit 253 in synchronism with a clock signal CK2.

For example, when the first outputted control signal ContM is set to "0" level, and the second outputted control signal ContM is set to "0" level, the outputs of these latch circuits 252 and 253 after latching are set to "1" level and "0" level, respectively, and output of the AND circuit 254 is set to "0" level. In this case, since a control voltage V(m+1) is still low, the data is maintained to the previous data (m+1) in the memory circuit 95B by the AKB processor circuit 166.

In addition, when the first outputted control signal ContM is set to "0" level, and the second outputted control signal Contm is set to "1" level, the outputs of these latch circuits 252 and 253 after latching are set to "1" level, respectively, and the output of the AND circuit is set to "1" level. In this case, the control voltage V(m+1) increases excessively, the contents of the memory circuit 95B are returned to the original data "m" by the AKB processor circuit 166.

Further, when the first outputted control signal ContM is set to "1" level, and the second outputted control signal ContM is set to "1" level, the outputs of these latch circuits 252 and 253 after latching are set to "0" level and "1" level, respectively, and the output of the AND circuit 254 is set to "0" level. In this case, since the value of the control voltage V(m−1) is still high, the data is maintained to the previous data (m−1).

In addition, when the first outputted control signal ContM is set to "1" level, and the second outputted control signal ContM is set to "0" level, the output of the AND circuit 254 is set to "0" level. In this case, the data maintained to the previous data (m−1).

AKB processing in 1 field has now been completed. During a video period up to the next AKB period, an operation of the cutoff adjusting circuit 9 is controlled based on the data stored in the memory circuit 95B.

Subsequently, the above operation is repeated by each AKB period, thereby the converted voltage of the D/A converter 97B finally converges an optimal value.

Thus, according to the above embodiment, a voltage value of a control signal for controlling an operation of the cutoff adjusting circuit can be finally conversed at one point, thereby making it possible to obtain convergence at one point without fluctuating a DC level of a video signal.

In the foregoing description, there has been described a case when memory circuit data is updated by each field, and is converted into an analog voltage, and the converted voltage is compared with the previous voltage. However, a time required for convergence can be reduced more significantly by increasing the data update count during 1 field to the possible maximum.

In addition, in the foregoing description, the data update quantity in the memory circuit is set to "1". However, if the converted voltage in the D/A converter is significantly discrete from a convergence point, a time required to reach an optimal value can be reduced by increasing the data update unit to a value greater than "1". In this case, the discreteness from the convergence can be monitored by the output voltage of the differential amplifier 222, for example.

In addition, in the foregoing description, only a black level (dark matter) is adjusted, and a circuit for adjusting a white level (bright matter) is neither shown nor described. However, white level (bright matter) adjustment can be, of course, performed similarly, and in this case, the reference signal 2 selected by the switch circuits 1, 2, and 3, respectively is employed.

Figure 50:
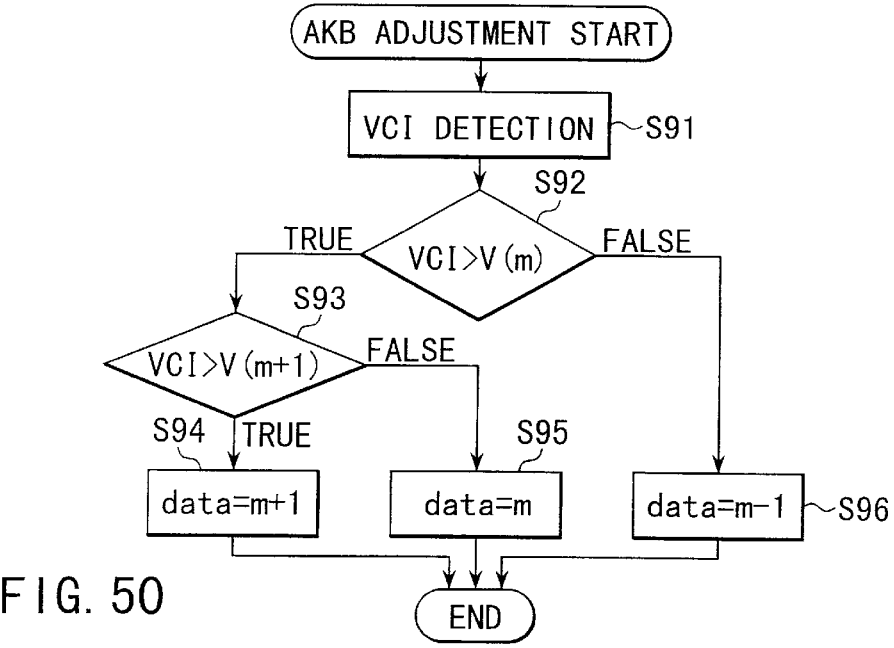
FIG. 50 is a flow chart showing a control example of the circuit according to the twentieth embodiment.

FIG. 50 shows a control example of the circuit according to the twentieth embodiment by way of a flow chart. In step S91, a voltage VCI being an optimal value during adjustment is detected. Next, in step S92, the voltage VC1 and the voltage V(m) are compared with each other.

Here, If VCI>V(m), the converted voltage V(m) is smaller than the convergence voltage VCI. In this case, the D/A converted voltage is required to be increased. In the next step S93, the above voltage VCI is compared with the voltage V(m+1) obtained by D/A converting the data (m+1) having +1 added to the data "m" stored in advance in the memory circuit 95B. If VCI>V(m+1), the data is maintained to "m+1" in the next step S94. In contrast, if VCI<V(m+1), the data is returned to "m" in the next step S95.

On the other hand, in step S92, if it is not judged to be VCI>V(m), the D/A converted voltage V(m) is greater than the convergence voltage VCI. In, this case, the D/A converted voltage is required to be reduced. In the next step S96, the data is updated to data (m−1) having "1" subtracted from the data "m" stored in advance in the memory circuit 95B.

The circuit according to this embodiment is not always limited to a circuit structure as shown in FIG. 49 if it includes the functions as shown in each step shown in FIG. 50. For example, a CPU using a program controlled CPU or the like may be employed.

Figure 51:
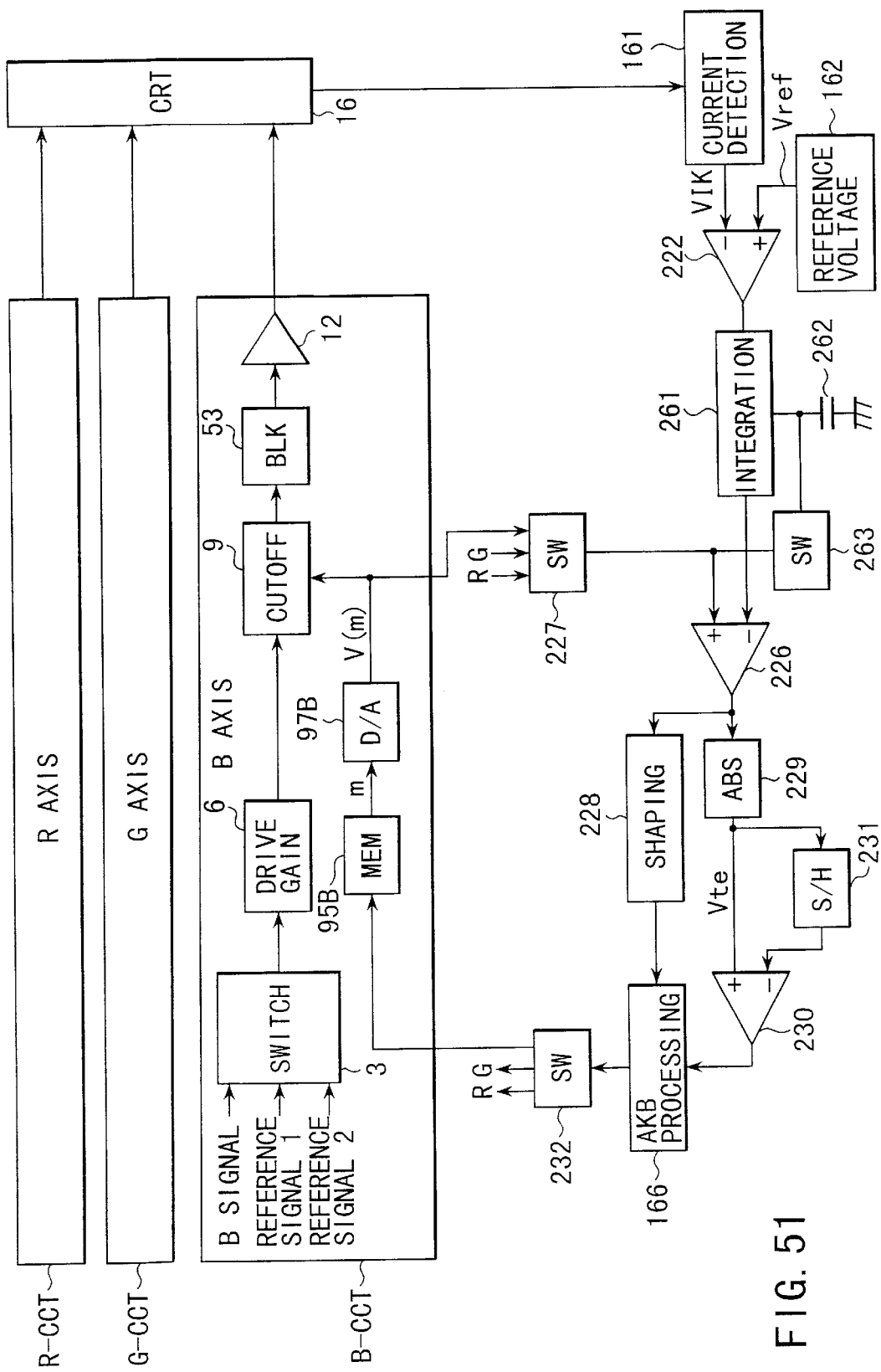
FIG. 51 is a block diagram showing an entire circuit structure of an AKB circuit according to a twenty first embodiment of the present invention.

FIG. 51 is a block diagram showing an entire circuit structure of an AKB circuit according to a twenty first embodiment of the present invention. The circuit according to this embodiment is intended for reducing a time required to reach a convergence point more significantly than the circuit of FIG. 38 according to the sixteenth embodiment. Therefore, like elements corresponding to those shown in FIG. 38 are designated by same reference numerals, and a description of these elements is omitted here. Only differences from those shown in FIG. 38 will be described here.

In the circuit according to this embodiment, an output of the differential amplifier 222 is supplied to a comparator circuit 226 via an integral network comprising an integrator 261 and an integral capacitor 262 instead of being supplied to a comparator circuit 226 via the sample hold circuit 225. In addition, a switch circuit 263 is provided between the switch circuit 227 and the integral capacitor 262 so that the converted voltage in the D/A converter 97B is supplied to the integral capacitor 262 instead of the switch circuits 223 and 224.

The integrator 261 acts to eliminate a noise included in the output of the differential amplifier 222. In addition, the converted voltage in the D/A converter 97B is applied in advance to the integral capacitor 262, thereby reducing a time required for convergence.

As has been described above, according to the sixteenth to twenty one embodiments each, even if discrete data is used to adjust a DC level, the data can be converged at one point without fluctuating this DC level.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic white balance adjusting circuit for automatically adjusting a white balance of a color image display tube having at least one cathode electrode, comprising:

a selector circuit for receiving a color video signal having a vertical blanking period and at least one reference signal, selecting the color video signal, and selecting and outputting the at least one reference signal during a partial period of the vertical blanking period;

an adjusting circuit for receiving a signal outputted from the selector circuit, adjusting at least one of a DC level and an AC amplitude of the signal in accordance with a control signal, and outputting the signal thus adjusted;

a drive circuit for receiving the output signal of the adjusting circuit and outputting a driving signal to be supplied to the at least one cathode electrode of the color image display tube according to the output signal;

a detector circuit connected to the color image display tube and detecting a voltage according to a current flowing through the cathode electrode of the color image display tube;

a first voltage hold circuit for receiving a voltage detected by the detector circuit and holding the voltage;

an arithmetic circuit for receiving a voltage detected by the detector circuit during a period in which the reference signal is selected by the selector circuit and a voltage held by the first voltage hold circuit during a period in which neither of the color video signal and reference signal are selected, and obtaining a voltage in difference between these voltages; and a comparator circuit for receiving a voltage in difference obtained by the arithmetic circuit, comparing the voltage in difference with a reference voltage, and generating the control signal to control an operation of the adjusting circuit according to the comparison result.

2. The circuit according to claim 1, further comprising a second voltage hold circuit for receiving a voltage detected by the detector circuit during a period in which the reference signal is selected by the selector circuit, and holding the voltage.

3. The circuit according to claim 2, wherein the first and second voltage hold circuits are sample hold circuits, respectively.

4. The circuit according to claim 1, wherein the adjusting circuit comprises a first adjusting circuit for receiving a signal outputted from the selector circuit, and adjusting an AC amplitude of the signal and outputting a signal; and a second adjusting circuit for receiving the signal outputted from the first adjusting circuit, and adjusting a DC level of the signal and outputting a signal.

5. An automatic white balance adjusting circuit for automatically adjusting a white balance of a color image display tube having at least one cathode electrode, comprising:

a selector circuit for receiving a color video signal having a vertical blanking period and at least one reference signal, selecting the color video signal, and selecting and outputting the at least one reference signal during a partial period of the vertical blanking period;

an adjusting circuit for receiving a signal outputted from the selector circuit, adjusting at least one of a DC level and an AC amplitude of the signal in accordance with a control signal, and outputting the signal thus adjusted;

a drive circuit for receiving the output signal of the adjusting circuit, and outputting a driving signal to be supplied to the at least one cathode electrode of the color image display tube according to the output signal;

a detector circuit connected to the color image display tube and detecting a voltage according to a current flowing through the at least one cathode electrode of the color image display tube;

a voltage hold circuit for receiving a voltage detected by the detector circuit during a period in which neither of the color video signal and the at least one reference signal are selected, and holding the voltage;

a comparator circuit having a pair of input nodes, the voltage detected by the detector circuit being supplied to one input node during a period in which the at least one reference signal is selected by the selector circuit, a reference voltage being supplied to the other input node, the comparator circuit comparing these two voltages supplied to the pair of input nodes, and generating the control signal for controlling an operation of the adjusting circuit according to the comparison result; and a reference voltage generator circuit for generating the reference voltage, receiving a voltage held by the voltage hold circuit, and changing a value of the reference voltage according to the voltage.

6. The circuit according to claim 5, wherein the reference voltage generator circuit include: a constant current source having one end and the other end, and connected to a supply node at a predetermined potential at one end and connected to the other input node of the comparator circuit at the other end; and a resistor having one end and the other end, and connected to the other end of the constant current source at one end, and a voltage held by the voltage hold circuit being supplied to the other end.

7. The circuit according to claim 5, wherein the reference voltage generator circuit includes a constant voltage source having one end and the other end, and connected to:the other input node of the comparator circuit at one end, and a voltage held by the voltage hold circuit being supplied to the other end.

8. The circuit according to claim 5, wherein the adjusting circuit comprises: a first adjusting circuit for receiving a signal outputted from the selector circuit, and adjusting an AC amplitude of the signal and outputting a signal; and a second adjusting circuit for receiving the signal outputted from the first adjusting circuit, and adjusting a DC level of the signal and outputting a signal.

9. The circuit according to claim 5, wherein the voltage hold circuit is a sample hold circuit.

* * * * *